United States Patent
Petro et al.

(10) Patent No.: US 9,093,874 B2
(45) Date of Patent: Jul. 28, 2015

(54) SCULPTED FIELD POLE MEMBERS AND METHODS OF FORMING THE SAME FOR ELECTRODYNAMIC MACHINES

(71) Applicant: NovaTorque, Inc., Fremont, CA (US)

(72) Inventors: John Patrick Petro, Los Altos, CA (US); Ken George Wasson, Foster City, CA (US); Jeremy Franz Mayer, Santa Clara, CA (US)

(73) Assignee: Novatorque, Inc., Fremont, CA (US)

( * ) Notice: Subject to any disclaimer, the term of this patent is extended or adjusted under 35 U.S.C. 154(b) by 194 days.

(21) Appl. No.: 13/647,285

(22) Filed: Oct. 8, 2012

(65) Prior Publication Data

US 2013/0181565 A1 Jul. 18, 2013

Related U.S. Application Data

(63) Continuation-in-part of application No. 11/707,817, filed on Feb. 12, 2007, now Pat. No. 8,283,832, which is a continuation-in-part of application No. 11/255,404, filed on Oct. 20, 2005, now Pat. No.7,294,948, application No. 13/647,285, which is a continuation-in-part of application No. 13/044,513, filed on Mar. 9, 2011, now Pat. No. 8,330,316, and a continuation-in-part of application No. 13/044,519, filed on Mar. 9, 2011, now Pat. No. 8,471,425, and a (Continued)

(51) Int. Cl.
*H02K 1/14* (2006.01)
*H02K 1/02* (2006.01)
*H02K 1/08* (2006.01)
*H02K 15/02* (2006.01)

(Continued)

(52) U.S. Cl.
CPC .. *H02K 1/14* (2013.01); *H02K 1/02* (2013.01); *H02K 1/08* (2013.01); *H02K 1/148* (2013.01); *H02K 15/022* (2013.01); *H02K 15/12* (2013.01); *H02K 21/12* (2013.01)

(58) Field of Classification Search
CPC .......... H02K 1/14; H02K 1/141; H02K 1/148
USPC .............................................. 310/254.1, 90.5
See application file for complete search history.

(56) References Cited

U.S. PATENT DOCUMENTS

| 414,659 A | 11/1889 | Seafert |
| 422,862 A | 3/1890 | Washburn |

(Continued)

FOREIGN PATENT DOCUMENTS

| CA | 2485765 A1 | 4/2005 |
| CH | 400323 | 4/1966 |

(Continued)

OTHER PUBLICATIONS

Beauchemin, George A., "A Practical Use of the Motor Constant Km", DC Motor/Generator Technical Note, 2002, 11 pgs. Available at http://www.dmicrotek.conn/servlet/com.itmr.waw.servlet.FileViewer?sprachid=1&kid=128948&fid=133820&kdid=541255.

(Continued)

*Primary Examiner* — Michael Andrews
(74) *Attorney, Agent, or Firm* — Cooley LLP

(57) ABSTRACT

A method, apparatus, article of manufacture and system for producing a field pole member for electrodynamic machinery are disclosed to, among other things, reduce magnetic flux path lengths and to eliminate back-iron for increasing torque and/or efficiency per unit size (or unit weight) and for reducing manufacturing costs. For example, a field pole member structure can either reduce the length of magnetic flux paths or substantially straighten those paths through the field pole members, or both. In one embodiment, a method provides for the construction of field pole members for electrodynamic machines.

6 Claims, 56 Drawing Sheets

Related U.S. Application Data continuation-in-part of application No. 13/044,527, filed on Mar. 9, 2011, now abandoned.

(60) Provisional application No. 60/622,258, filed on Oct. 25, 2004.

(51) Int. Cl.
*H02K 15/12* (2006.01)
*H02K 21/12* (2006.01)

(56) References Cited

U.S. PATENT DOCUMENTS

| | | |
|---|---|---|
| 439,102 A | 10/1890 | Bradley |
| 754,066 A | 3/1904 | Hoffman |
| 829,975 A | 9/1906 | Lincoln |
| 846,079 A | 3/1907 | Yost |
| 1,039,197 A | 9/1912 | Roth |
| 1,557,213 A | 10/1925 | Lee |
| 1,640,742 A | 8/1927 | Wallace |
| 1,763,104 A | 6/1930 | Shurtleff |
| 1,771,281 A | 7/1930 | Wilsing |
| 1,874,094 A | 8/1932 | Ford |
| 1,962,832 A | 6/1934 | Neureuther |
| 2,025,560 A | 12/1935 | Warren |
| 2,059,518 A | 11/1936 | Harley |
| 2,081,993 A | 6/1937 | Gebhardt |
| 2,141,681 A | 12/1938 | Brueck |
| 2,378,668 A | 6/1945 | Vickers |
| 2,480,825 A | 9/1949 | Adolsh |
| 2,484,001 A | 10/1949 | Raymond |
| 2,486,656 A | 11/1949 | Klinkhamer |
| 2,500,730 A | 3/1950 | Yonkers |
| 2,513,226 A | 6/1950 | Wylie |
| 2,513,227 A | 6/1950 | Wylie |
| 2,561,890 A | 7/1951 | Stoddard |
| 2,575,153 A | 11/1951 | Wightman |
| 2,669,687 A | 2/1954 | De Tastes |
| 2,677,256 A | 5/1954 | Donandt |
| 2,677,259 A | 5/1954 | Woodward |
| 2,694,781 A | 11/1954 | Hinz |
| 2,717,969 A | 9/1955 | Buchhold |
| 2,769,106 A | 10/1956 | Dembowski |
| 2,796,542 A | 6/1957 | Bekey |
| 2,802,959 A | 8/1957 | Powers |
| 2,824,272 A | 2/1958 | Delaporte |
| 2,927,229 A | 3/1960 | Merrill |
| 3,001,093 A | 9/1961 | Wilcox |
| 3,025,445 A | 3/1962 | Welch |
| 3,083,310 A | 3/1963 | Tweedy |
| 3,111,596 A | 11/1963 | Lovegrove |
| 3,153,157 A | 10/1964 | Rabe |
| 3,173,042 A | 3/1965 | Fodor |
| 3,175,111 A | 3/1965 | Orr |
| 3,205,384 A | 9/1965 | Sears |
| 3,210,582 A | 10/1965 | Miller |
| 3,223,866 A | 12/1965 | Tiltins |
| 3,241,111 A | 3/1966 | Sandstrom |
| 3,241,304 A | 3/1966 | Mattingly |
| 3,277,324 A | 10/1966 | Beauddin et al. |
| 3,309,547 A | 3/1967 | Woodward, Jr. |
| 3,319,100 A | 5/1967 | Erickson |
| 3,321,652 A | 5/1967 | Opel |
| 3,344,325 A | 9/1967 | Sklaroff |
| 3,356,425 A | 12/1967 | Carrierre |
| 3,360,667 A | 12/1967 | Gordon |
| 3,374,376 A | 3/1968 | Kromrey |
| 3,378,315 A | 4/1968 | Webb et al. |
| 3,396,291 A | 8/1968 | Somerville |
| 3,399,002 A | 8/1968 | Atkinson |
| 3,428,837 A | 2/1969 | Morreale et al. |
| 3,466,518 A | 9/1969 | Aylikci |
| 3,471,729 A | 10/1969 | Latta |
| 3,482,131 A | 12/1969 | Lytle |
| 3,490,816 A | 1/1970 | Lyman |
| 3,513,341 A | 5/1970 | Gratzmuller |
| 3,519,859 A | 7/1970 | Morreale |
| 3,529,191 A | 9/1970 | Henry-Baudot |
| 3,555,324 A | 1/1971 | Lovegrove |
| 3,565,495 A | 2/1971 | Lyman |
| 3,603,826 A | 9/1971 | Saretzky |
| 3,619,014 A | 11/1971 | Quick |
| 3,628,239 A | 12/1971 | Hunt et al. |
| 3,648,090 A | 3/1972 | Voin |
| 3,651,355 A | 3/1972 | Mason |
| 3,663,851 A | 5/1972 | Persson |
| 3,689,787 A | 9/1972 | Saretzky |
| 3,717,780 A | 2/1973 | Hohne, Jr. et al. |
| 3,723,796 A | 3/1973 | Mason |
| 3,787,100 A | 1/1974 | Habermann |
| 3,819,964 A | 6/1974 | Noodleman |
| 3,822,768 A | 7/1974 | Sebulke |
| 3,836,802 A | 9/1974 | Parker |
| 3,863,084 A | 1/1975 | Hasebe |
| 3,876,892 A | 4/1975 | Noodleman |
| 3,886,387 A | 5/1975 | Graham et al. |
| 3,892,987 A | 7/1975 | Noodleman |
| 3,936,680 A | 2/1976 | Kuwako |
| 3,937,993 A | 2/1976 | Noodleman |
| 3,947,155 A | 3/1976 | Bidol |
| 3,950,663 A | 4/1976 | Mead |
| 3,956,651 A | 5/1976 | Brammerlo |
| 3,979,821 A | 9/1976 | Noodleman |
| 3,991,331 A | 11/1976 | Noodleman |
| 4,031,421 A | 6/1977 | Geiger |
| 4,043,614 A | 8/1977 | Lyman |
| 4,045,696 A * | 8/1977 | Lutz et al. ............... 310/266 |
| 4,047,807 A | 9/1977 | Okano |
| 4,066,922 A | 1/1978 | Hennemann |
| 4,072,881 A | 2/1978 | Ban |
| 4,080,724 A | 3/1978 | Gillette |
| 4,117,359 A | 9/1978 | Wehde |
| 4,143,289 A | 3/1979 | Williams |
| 4,152,570 A | 5/1979 | Inoue |
| 4,153,851 A | 5/1979 | Hovorka |
| 4,156,817 A | 5/1979 | Preece et al. |
| 4,159,434 A | 6/1979 | Kalsi |
| D256,351 S | 8/1980 | Schulze |
| 4,216,263 A | 8/1980 | Otis et al. |
| 4,221,984 A | 9/1980 | Mason |
| 4,225,798 A | 9/1980 | Barrett |
| 4,259,603 A | 3/1981 | Uchiyama et al. |
| 4,307,310 A | 12/1981 | Wedman et al. |
| 4,310,768 A | 1/1982 | Colley |
| 4,321,495 A | 3/1982 | Kennedy |
| 4,327,302 A | 4/1982 | Hershberger |
| 4,328,411 A | 5/1982 | Haller et al. |
| 4,358,693 A | 11/1982 | Palmer et al. |
| 4,358,697 A | 11/1982 | Liu et al. |
| 4,363,988 A | 12/1982 | Kliman |
| 4,378,146 A | 3/1983 | Suzuki et al. |
| 4,390,262 A | 6/1983 | Hirohata et al. |
| 4,395,815 A | 8/1983 | Stanley et al. |
| 4,460,253 A | 7/1984 | Kawai et al. |
| 4,476,395 A | 10/1984 | Cronin |
| 4,480,208 A | 10/1984 | Logie et al. |
| 4,483,570 A | 11/1984 | Inoue |
| 4,491,401 A | 1/1985 | Inaba et al. |
| 4,503,349 A * | 3/1985 | Miller ............... 310/178 |
| 4,543,506 A | 9/1985 | Kawada et al. |
| 4,564,775 A | 1/1986 | Mazzorana |
| 4,577,129 A | 3/1986 | Bertram |
| 4,593,222 A | 6/1986 | Burkel |
| 4,594,539 A | 6/1986 | Michelson |
| 4,601,564 A | 7/1986 | Yamamoto |
| 4,614,888 A | 9/1986 | Mosher et al. |
| 4,628,220 A | 12/1986 | Flogvall |
| 4,631,807 A | 12/1986 | Kawada et al. |
| 4,658,228 A | 4/1987 | Leupold |
| 4,663,581 A | 5/1987 | Glennon |
| 4,674,178 A | 6/1987 | Patel |
| 4,710,667 A | 12/1987 | Whiteley |
| 4,713,569 A | 12/1987 | Schwartz |
| 4,725,750 A | 2/1988 | Welch |

(56) References Cited

U.S. PATENT DOCUMENTS

| | | | |
|---|---|---|---|
| 4,731,626 A | 3/1988 | Kawamoto |
| 4,734,604 A | 3/1988 | Sontheimer et al. |
| 4,741,094 A | 5/1988 | Denk et al. |
| 4,745,345 A | 5/1988 | Petersen |
| 4,748,359 A | 5/1988 | Yahara et al. |
| 4,748,361 A | 5/1988 | Ohnishi et al. |
| 4,757,224 A | 7/1988 | McGee et al. |
| 4,759,186 A | 7/1988 | Sugden |
| 4,760,314 A | 7/1988 | Mohri et al. |
| 4,763,150 A | 8/1988 | Sumi |
| 4,777,397 A | 10/1988 | Parshall |
| 4,788,369 A | 11/1988 | Marsh |
| 4,788,465 A | 11/1988 | Hertrich |
| 4,802,347 A | 2/1989 | Nystuen |
| 4,879,484 A | 11/1989 | Huss |
| 4,883,996 A | 11/1989 | Aoki |
| 4,885,489 A | 12/1989 | Stuhr |
| 4,908,347 A | 3/1990 | Denk |
| 4,918,802 A | 4/1990 | Schaefer |
| 4,920,295 A | 4/1990 | Holden et al. |
| 4,939,397 A | 7/1990 | Morrill |
| 4,949,000 A | 8/1990 | Petersen |
| 4,956,571 A | 9/1990 | Gordon |
| 4,962,583 A | 10/1990 | Yang |
| 4,983,870 A | 1/1991 | McSparran |
| 4,984,972 A | 1/1991 | Clausen et al. |
| 5,033,265 A | 7/1991 | Sugden |
| 5,036,235 A | 7/1991 | Kleckner |
| 5,045,741 A | 9/1991 | Dvorsky |
| 5,047,682 A | 9/1991 | Burgbacher |
| 5,049,771 A | 9/1991 | Challita et al. |
| 5,081,387 A | 1/1992 | Nystuen |
| 5,091,668 A | 2/1992 | Cuenot et al. |
| 5,130,592 A | 7/1992 | Bitsch et al. |
| 5,140,211 A | 8/1992 | Ucida |
| 5,140,212 A | 8/1992 | Iwasaki et al. |
| 5,157,297 A | 10/1992 | Uchida |
| 5,168,187 A | 12/1992 | Baer et al. |
| 5,191,256 A | 3/1993 | Reiter, Jr. et al. |
| 5,200,662 A | 4/1993 | Tagami et al. |
| 5,204,572 A | 4/1993 | Fierreira |
| 5,212,418 A | 5/1993 | Mason |
| 5,216,308 A | 6/1993 | Meeks |
| 5,233,254 A | 8/1993 | Fisher et al. |
| 5,237,229 A | 8/1993 | Ohishi |
| 5,258,677 A | 11/1993 | Mason |
| 5,283,492 A | 2/1994 | Mason |
| 5,300,848 A | 4/1994 | Huss et al. |
| 5,386,161 A | 1/1995 | Sakamoto |
| 5,406,157 A | 4/1995 | New |
| 5,436,518 A | 7/1995 | Kawai |
| 5,463,262 A | 10/1995 | Uchida |
| 5,486,730 A | 1/1996 | Ludwig et al. |
| 5,514,924 A | 5/1996 | McMullen et al. |
| 5,536,985 A | 7/1996 | Ward et al. |
| 5,610,460 A | 3/1997 | Jacobson et al. |
| 5,627,419 A | 5/1997 | Miller |
| 5,642,009 A | 6/1997 | McCleer et al. |
| 5,656,880 A | 8/1997 | Clark |
| 5,659,217 A | 8/1997 | Petersen |
| 5,674,169 A | 10/1997 | Yang |
| 5,731,641 A | 3/1998 | Botos et al. |
| 5,744,887 A | 4/1998 | Itoh |
| 5,751,086 A | 5/1998 | Taghezout |
| 5,753,989 A | 5/1998 | Syverson et al. |
| 5,767,597 A | 6/1998 | Gondhalekar |
| 5,777,421 A | 7/1998 | Woodward, Jr. |
| 5,780,950 A | 7/1998 | Yang |
| 5,789,841 A | 8/1998 | Wang |
| 5,844,345 A | 12/1998 | Hsu |
| 5,955,806 A | 9/1999 | Devenyi |
| 5,955,811 A | 9/1999 | Chiba et al. |
| 5,962,948 A | 10/1999 | Hakala et al. |
| 6,013,693 A | 1/2000 | Takahashi |
| 6,025,769 A | 2/2000 | Chu |
| 6,049,148 A | 4/2000 | Nichols et al. |
| 6,057,613 A | 5/2000 | Trago |
| 6,104,115 A | 8/2000 | Offringa et al. |
| 6,114,788 A | 9/2000 | Vuillemin et al. |
| 6,157,109 A | 12/2000 | Schiferl et al. |
| 6,175,177 B1 | 1/2001 | Sabinski et al. |
| 6,177,746 B1 | 1/2001 | Tupper et al. |
| 6,188,159 B1 | 2/2001 | Fan |
| 6,194,797 B1 | 2/2001 | Simon et al. |
| 6,236,124 B1 | 5/2001 | Sekiyama et al. |
| 6,246,146 B1 | 6/2001 | Schiller |
| 6,346,755 B1 | 2/2002 | Tong et al. |
| 6,359,357 B1 * | 3/2002 | Blumenstock ............... 310/90.5 |
| 6,417,596 B1 | 7/2002 | Schurter et al. |
| 6,437,474 B1 | 8/2002 | Chu |
| 6,455,975 B1 * | 9/2002 | Raad et al. .................. 310/254.1 |
| 6,492,751 B1 | 12/2002 | Ineson et al. |
| 6,492,753 B2 | 12/2002 | Zepp et al. |
| 6,590,312 B1 | 7/2003 | Seguchi et al. |
| 6,700,280 B1 | 3/2004 | Geiger et al. |
| 6,707,209 B2 | 3/2004 | Crapo et al. |
| 6,707,221 B2 | 3/2004 | Carl |
| 6,707,224 B1 | 3/2004 | Petersen |
| 6,720,688 B1 | 4/2004 | Schiller |
| 6,745,972 B2 | 6/2004 | Takano et al. |
| 6,762,525 B1 | 7/2004 | Maslove et al. |
| 6,784,582 B1 | 8/2004 | Kolomeitseve et al. |
| 6,836,388 B2 | 12/2004 | Nishimura et al. |
| 6,844,656 B1 | 1/2005 | Larsen et al. |
| 6,889,419 B2 | 5/2005 | Reiter, Jr. et al. |
| 6,897,596 B2 | 5/2005 | Laing |
| 6,903,471 B2 | 6/2005 | Arimitsu et al. |
| 6,952,064 B2 | 10/2005 | Hiwaki et al. |
| 7,061,152 B2 | 6/2006 | Petro et al. |
| 7,105,974 B2 | 9/2006 | Nashiki |
| 7,135,800 B2 | 11/2006 | Yamada et al. |
| 7,205,693 B2 | 4/2007 | Petro et al. |
| 7,239,058 B2 | 7/2007 | Petro et al. |
| 7,294,948 B2 | 11/2007 | Wasson et al. |
| 7,474,027 B2 | 1/2009 | Kikuchi et al. |
| 7,719,159 B2 | 5/2010 | Petro et al. |
| 7,884,522 B1 | 2/2011 | Petro et al. |
| 7,982,350 B2 | 7/2011 | Burch et al. |
| 7,982,352 B2 | 7/2011 | Nymann et al. |
| 8,072,106 B2 | 12/2011 | Petro et al. |
| 8,072,115 B2 | 12/2011 | Burch et al. |
| 2002/0047426 A1 | 4/2002 | Pop, Sr. |
| 2002/0192103 A1 | 12/2002 | Barber et al. |
| 2003/0051614 A1 | 3/2003 | Knoth et al. |
| 2003/0062792 A1 | 4/2003 | Reiter, Jr. et al. |
| 2003/0067236 A1 | 4/2003 | Takahata et al. |
| 2003/0102769 A1 | 6/2003 | Calley |
| 2003/0214194 A1 | 11/2003 | Carl, Jr. et al. |
| 2004/0004407 A1 | 1/2004 | Laurent et al. |
| 2004/0090140 A1 | 5/2004 | Lai et al. |
| 2004/0119371 A1 | 6/2004 | Laing |
| 2004/0155547 A1 | 8/2004 | Islam et al. |
| 2004/0232800 A1 | 11/2004 | Seguchi et al. |
| 2005/0017591 A1 | 1/2005 | Brewster et al. |
| 2005/0088052 A1 | 4/2005 | Ionel et al. |
| 2005/0264118 A1 * | 12/2005 | Kascak et al. ............... 310/90.5 |
| 2006/0001328 A1 | 1/2006 | Rau et al. |
| 2006/0028093 A1 | 2/2006 | Minagawa et al. |
| 2006/0087186 A1 | 4/2006 | Wasson et al. |
| 2006/0131976 A1 | 6/2006 | Kikuchi et al. |
| 2006/0152099 A1 | 7/2006 | Petro et al. |
| 2006/0238053 A1 | 10/2006 | Kascak et al. |
| 2007/0085442 A1 | 4/2007 | Petro et al. |
| 2007/0197899 A1 | 8/2007 | Ritter et al. |
| 2007/0205675 A1 | 9/2007 | Petro et al. |
| 2008/0278022 A1 | 11/2008 | Burch et al. |
| 2009/0251023 A1 | 10/2009 | Nakano et al. |

FOREIGN PATENT DOCUMENTS

| | | |
|---|---|---|
| CN | 1340238 | 3/2002 |
| DE | 2433809 | 2/1978 |
| DE | 3742502 | 6/1989 |
| DE | 4223836 | 1/1994 |

(56) References Cited

FOREIGN PATENT DOCUMENTS

| | | |
|---|---|---|
| DE | 19545680 | 12/1995 |
| DE | 19954196 | 6/2000 |
| DE | 10140362 | 3/2003 |
| EP | 0162927 | 12/1985 |
| EP | 0208124 | 1/1987 |
| EP | 0251350 | 1/1988 |
| EP | 0627805 | 12/1994 |
| GB | 960879 | 6/1964 |
| JP | 57160357 | 10/1982 |
| JP | 60066658 | 4/1985 |
| JP | 61189142 | 8/1986 |
| JP | 61185279 | 11/1986 |
| JP | 6369442 | 3/1988 |
| JP | 61289889 | 7/1988 |
| JP | 6450403 | 2/1989 |
| JP | 0416841 | 1/1992 |
| JP | 04026350 | 1/1992 |
| JP | 05062179 | 3/1993 |
| JP | 06014521 | 1/1994 |
| JP | 06038415 | 2/1994 |
| JP | 06141527 | 5/1994 |
| JP | 06351212 | 12/1994 |
| JP | 06511132 | 12/1994 |
| JP | 07203643 | 8/1995 |
| JP | 0833245 | 2/1996 |
| JP | 08080019 | 3/1996 |
| JP | 08223832 | 8/1996 |
| JP | 10174395 | 6/1998 |
| JP | 10174399 | 6/1998 |
| JP | 10174400 | 6/1998 |
| JP | 2000-152534 | 5/2000 |
| JP | 11222025 | 6/2000 |
| JP | 2001-037133 | 2/2001 |
| JP | 2001-251835 | 9/2001 |
| JP | 2002-165426 | 6/2002 |
| JP | 2003-88068 | 3/2003 |
| JP | 2004-282995 | 10/2004 |
| SU | 1096736 | 6/1984 |
| WO | WO 96/29774 | 9/1996 |
| WO | WO 99/35731 | 7/1999 |
| WO | WO 99/48187 | 9/1999 |
| WO | WO 00/48297 | 8/2000 |
| WO | WO 2004/004098 | 1/2004 |

OTHER PUBLICATIONS

European Search Opinion issued to European Application No. 05812165, Sep. 7, 2009, 4 pgs.
European Search Opinion issued to European Application No. 05813176, Sep. 7, 2009, 4 pgs.
European Search Report issued to US Patent No. 2,141,704, Feb. 9, 2005, 3 pgs.
Fu et al., "Modeling of Solid Conductors in Two-Dimensional Transient Finite-Element Analysis and Its Application to Electric Machines", Mar. 2004, IEEE Transactions on Magnetics, vol. 40, No. 2, pp. 426-434.
Industrial Circuits Application Note, "Drive Circuit Basics", pp. 1-7, 1998, available at http://www.solarbotics.net/library/pdflib/pdf/drive.pdf.
Industrial Circuits Application Note, Stepper Motor Basics, pp. 1-6, 1998, available at http://www.solarbotics.net/library/pdflib/pdf/motorbas.pdf.
International Preliminary Report on Patentability issued to PCT Application No. US05/38336, Mar. 10, 2009, 4 pages.
International Preliminary Report on Patentability issued to PCT Application No. US08/66072, Dec. 17, 2009, 6 pages.
International Search Report issued to PCT Application No. US05/38151, Oct. 10, 2006, 1 page.
International Search Report issued to PCT Application No. US05/38336, May 14, 2008, 1 page.
International Search Report issued to PCT Application No. US07/03734, Feb. 15, 2008, 3 pgs.
International Search Report issued to PCT Application No. US08/66072, Aug. 18, 2008, 3 pgs.
International Search Report and Written Opinion issued to PCT Application No. US12/66117, Sep. 2, 2008, 7 pgs.
International Search Report and Written Opinion issued to PCT Application No. US12/28648, Jul. 6, 2012, 9 pgs.
International Search Report and Written Opinion issued to PCT Application No. US12/28649, Apr. 6, 2012, 9 pgs.
International Search Report and Written Opinion issued to PCT Application No. US12/28651, Jun. 28, 2012, 9 pgs.
International Search Report and Written Opinion issued to PCT Application No. US12/28653, Jun. 28, 2012, 11 pgs.
Lin et al., "A Fully Integrated Simultation Package for Electric Machine Design", 2000, 7 pages, available at http://www.docstoc.com/docs/27650572/A-Fully-Integrated-Simulation-Package-for-Electric-Machine-Design.
Supplementary European Search Report issued to European Application No. 05 81 3176, Aug. 28, 2009, 2 pgs.
Supplementary European Search Report issued to European Application No. 05 81 2165, Aug. 28, 2009, 2 pgs.
Written Opinion issued to PCT Application No. US08/66072, Aug. 18, 2008, 4 pgs.

\* cited by examiner

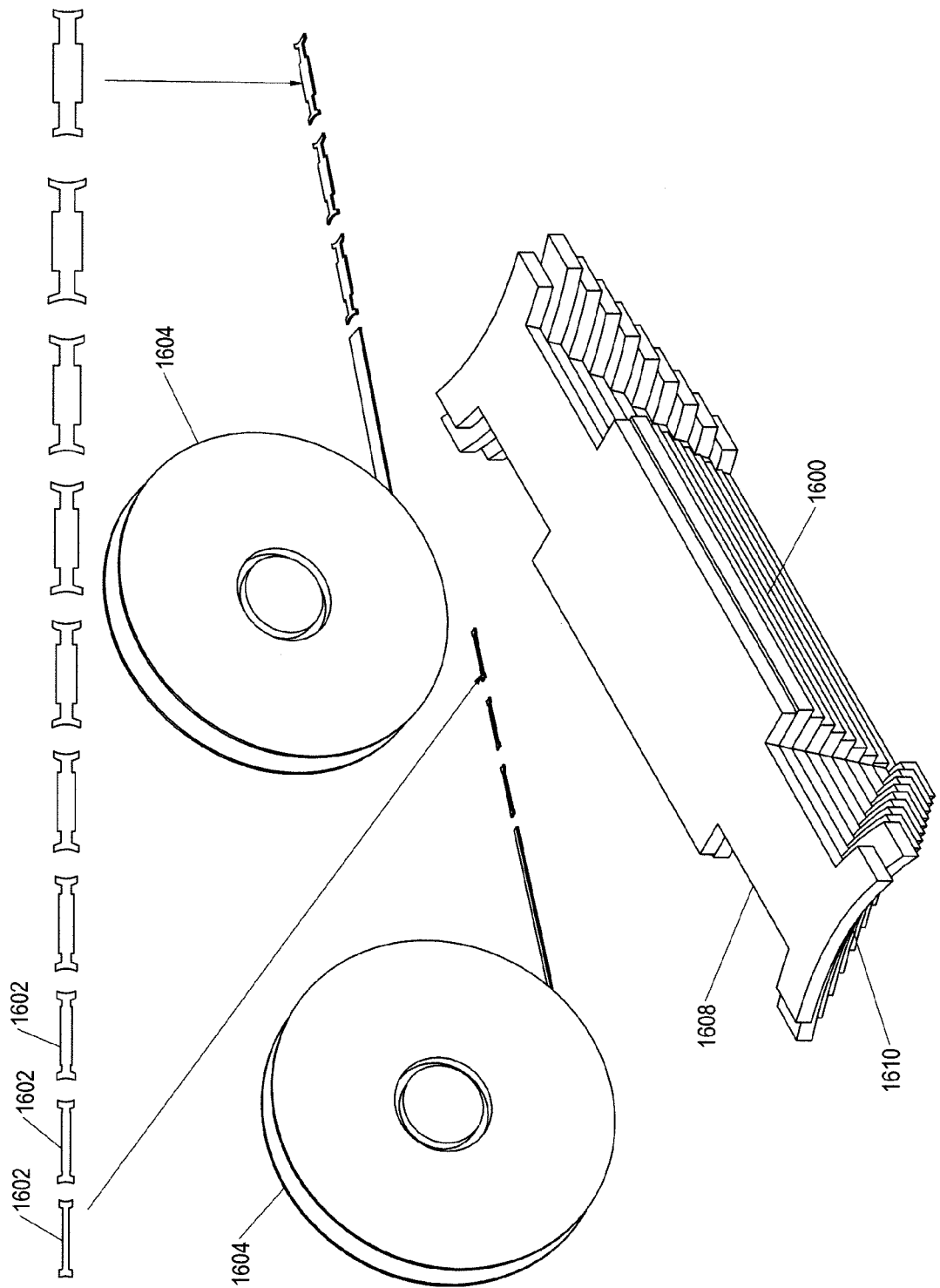

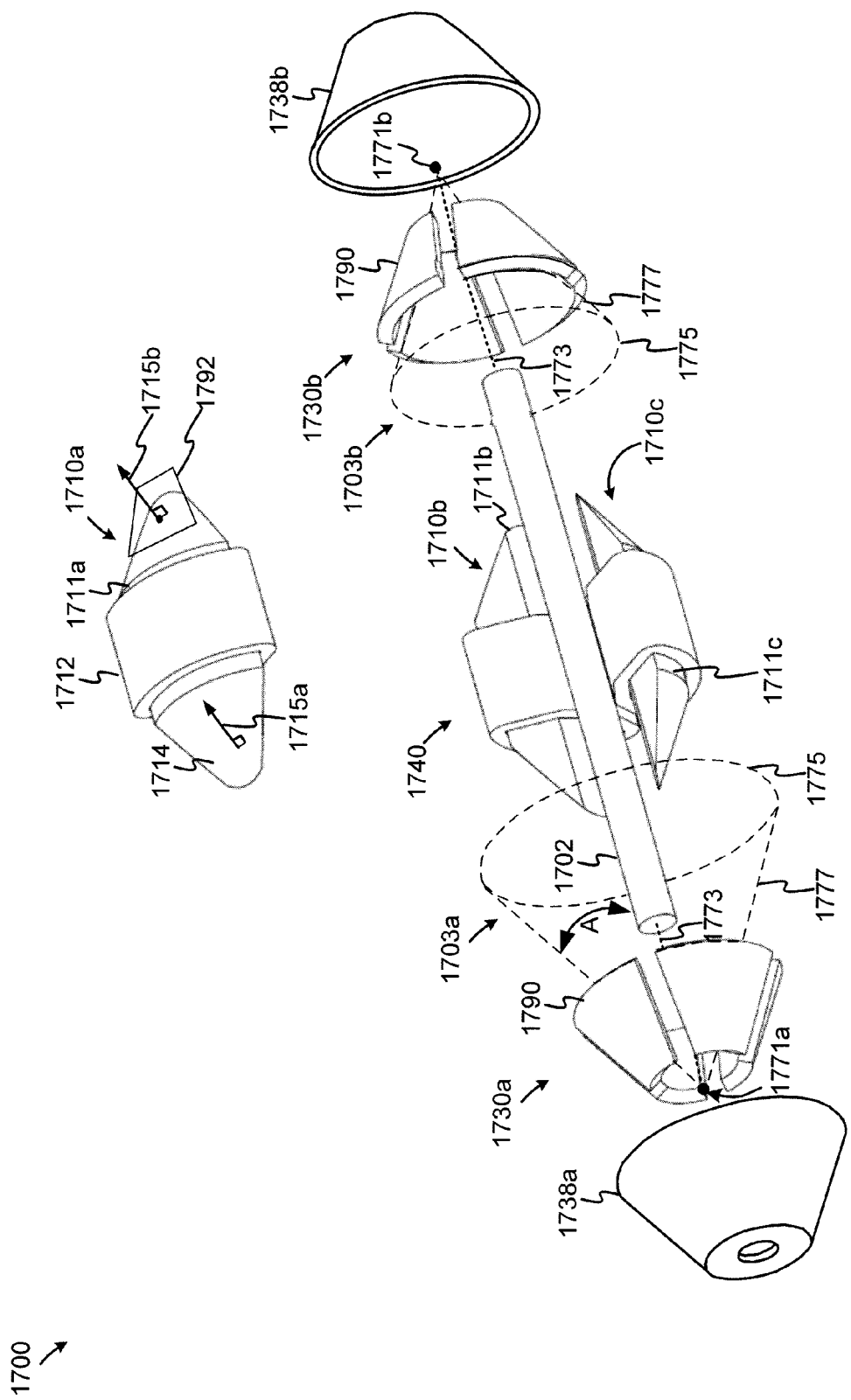

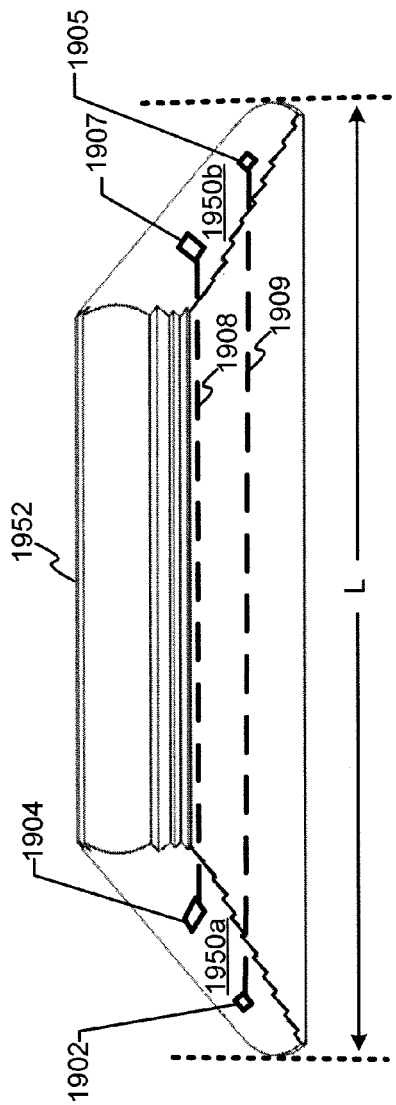
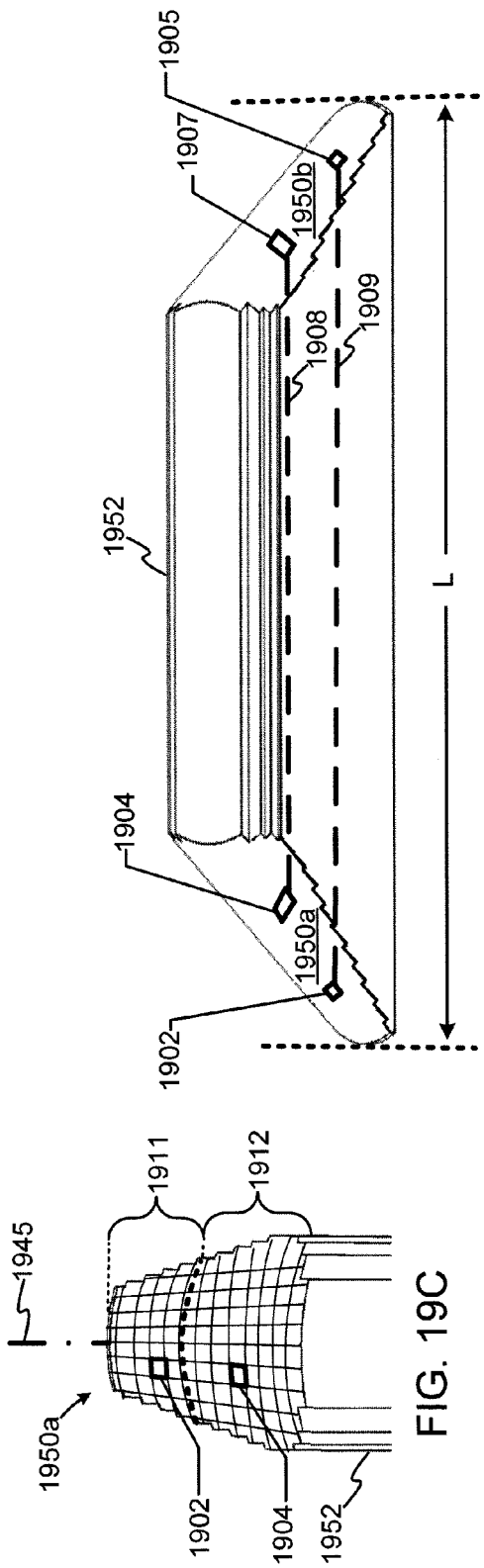
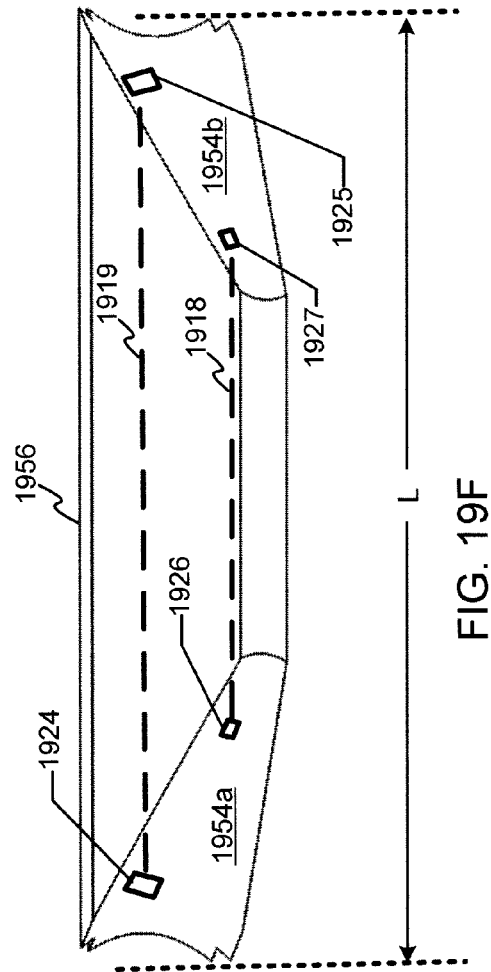
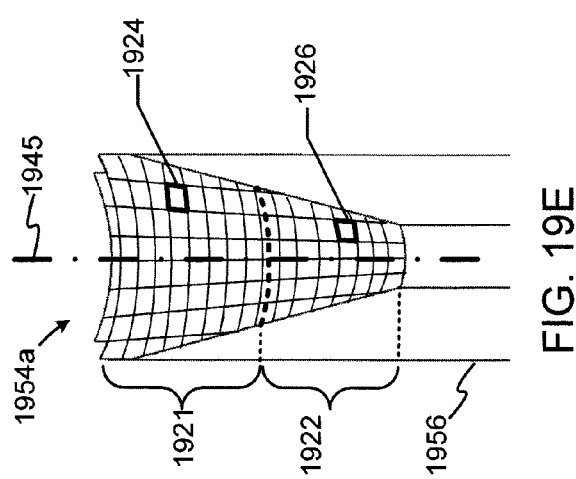

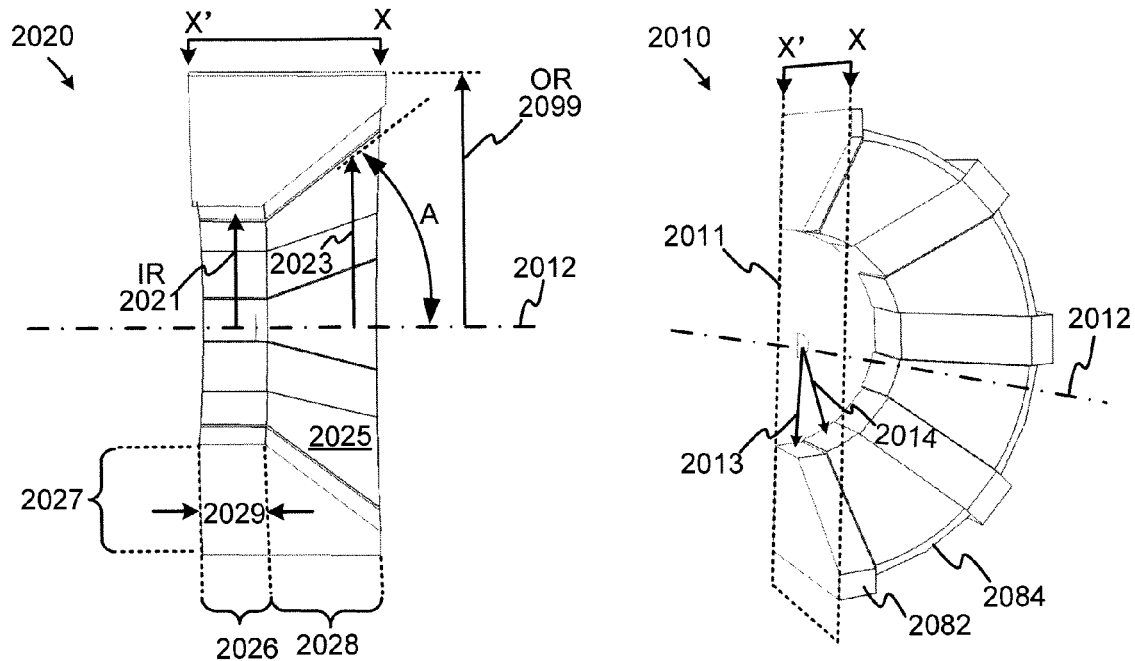
FIG. 20E
FIG. 20F
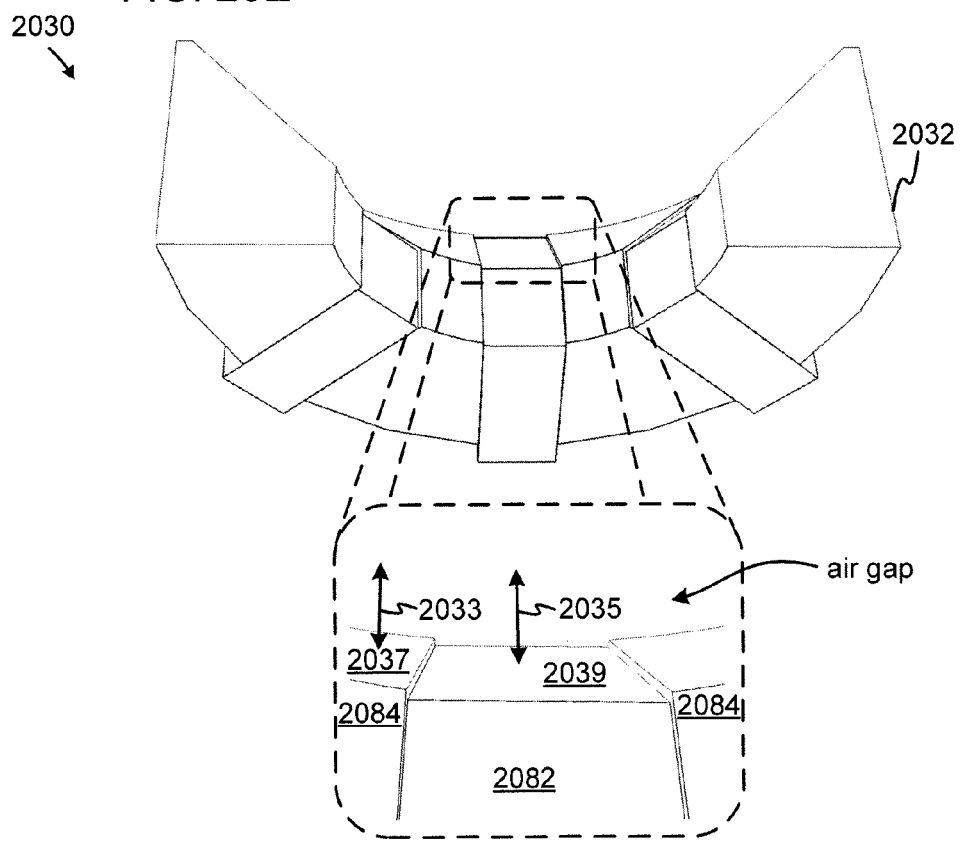
FIG. 20G

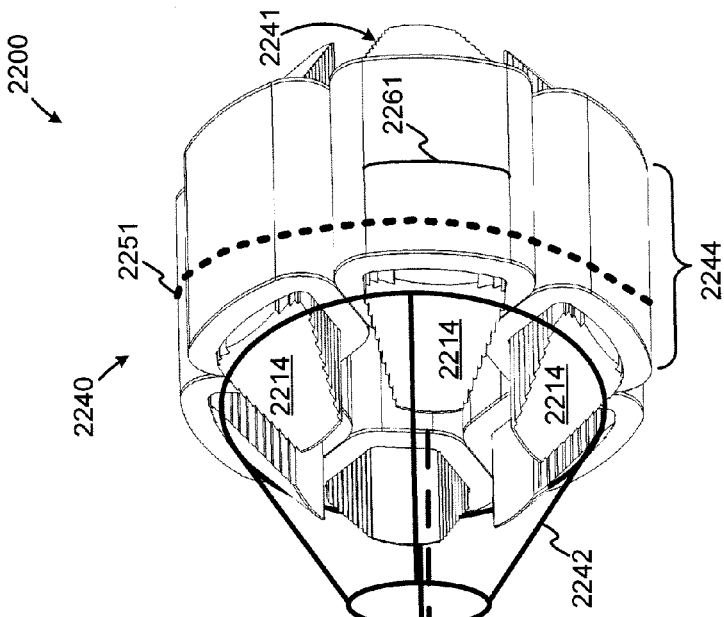
FIG. 22A
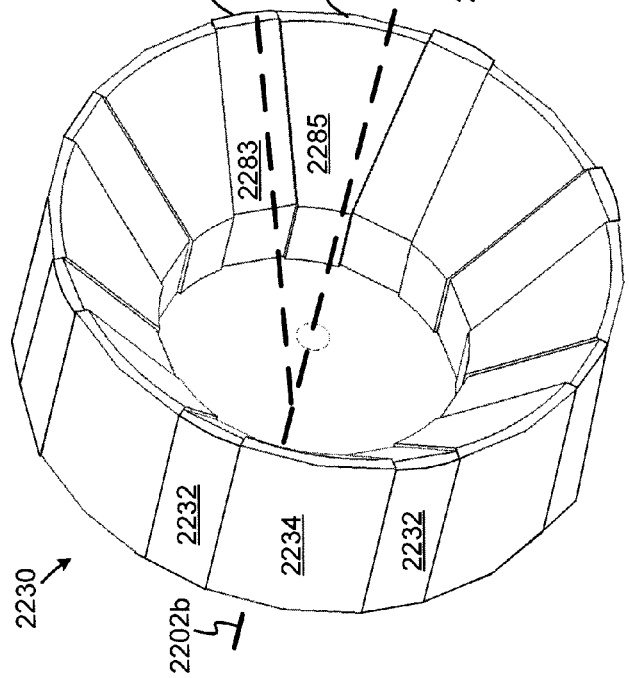
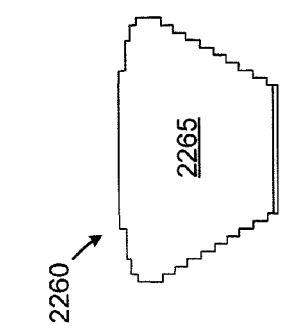
FIG. 22C
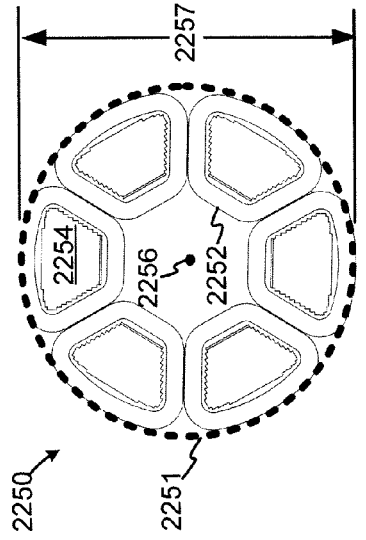
FIG. 22B
FIG. 22D

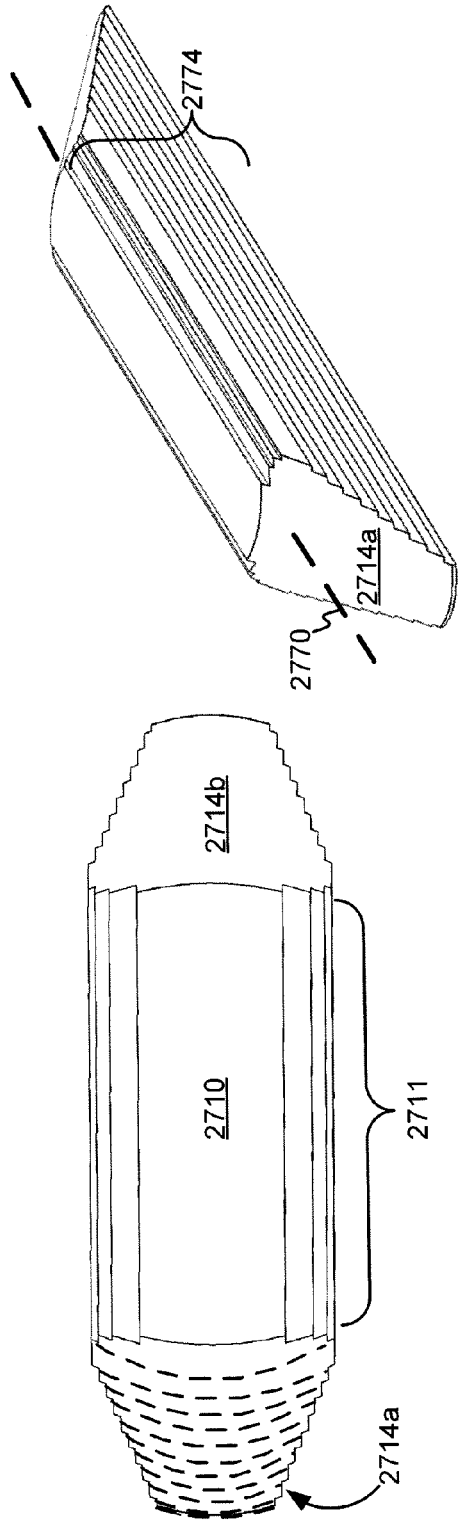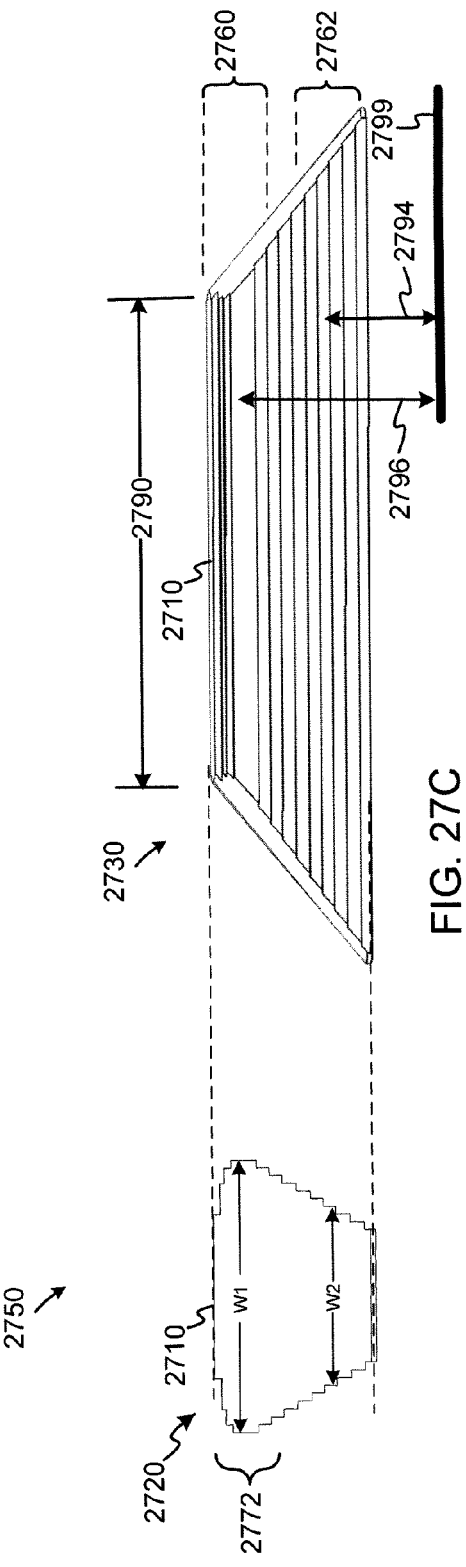
FIG. 27B
FIG. 27A
FIG. 27C

SCULPTED FIELD POLE MEMBERS AND METHODS OF FORMING THE SAME FOR ELECTRODYNAMIC MACHINES

CROSS REFERENCE TO RELATED APPLICATIONS

THIS application is a Continuation-in-Part of U.S. Nonprovisional application Ser. No. 11/707,817, filed on Feb. 12, 2007, which is a Continuation-in-Part of U.S. Nonprovisional application Ser. No. 11/255,404, filed on Oct. 20, 2005, which claims priority to U.S. Provisional Application No. 60/622,258, filed on Oct. 25, 2004, and THIS application is also a Continuation-in-Part of U.S. Nonprovisional application Ser. No. 13/044,513, filed on Mar. 9, 2011, and a Continuation-in-Part of U.S. Nonprovisional application Ser. No. 13/044,519, filed on Mar. 9, 2011, all of which are herein incorporated by reference, and a Continuation-in-Part of U.S. Nonprovisional application Ser. No. 13/044,527, filed on Mar. 9, 2011, all of which are herein incorporated by reference. Further, this application incorporates by reference the following: U.S. Pat. No. 7,061,152 B2, entitled "Rotor-Stator Structure for Electrodynamic Machines" and issued on Jun. 13, 2006.

BRIEF DESCRIPTION OF THE INVENTION

Embodiments of the invention relate generally to electric motors, alternators, generators and the like, and more particularly, to field pole member structures as well as methods of manufacture for forming such field pole member structures.

BACKGROUND OF THE INVENTION

In traditional stator and rotor structures for fractional and sub-fractional horsepower motors, permanent magnets are often integrated into a rotor assembly that typically rotates in the same plane as a ferromagnetic stator structure that provides magnetic return paths for magnet and current-generated flux. Current-generated flux, which is also referred to as Ampere Turn ("AT")-generated flux, is generated by passing a current through a coil winding that is wrapped about a pole region of a stator member structure. While functional, conventional stator and rotor structures of these and other electric motors have several drawbacks, as are discussed next.

FIG. 1A illustrates a traditional electric motor exemplifying commonly-used stator and rotor structures. Electric motor 100 is a cylindrical motor composed of a stator structure 104, a magnetic hub 106 and a shaft 102. The rotor structure of motor 100 includes one or more permanent magnets 110, all of which are attached via magnetic hub 106 to shaft 102 for rotation within stator structure 104. Stator structure 104 typically includes field poles 118, each having a coil winding 112 (only one is shown) that is wound about each field pole 118. Stator structure 104 includes slots 108 used in part to provide a wire passage for winding coil wire about stator field poles 118 during manufacturing. Slots 108 also provide magnetic separation between adjacent field poles 118. Stator structure 104 includes a peripheral flux-carrying segment 119 as part of magnetic return path 116. In many cases, stator structure 104 is composed of laminations 114, which typically are formed from isotropic (e.g., non-grain oriented), magnetically permeable material. Magnetic return path 116, which is one of a number of magnetic return paths in which permanent magnet-generated flux and AT-generated flux is present, is shown as being somewhat arcuate in nature at peripheral flux-carrying segment 119 but includes relatively sharp turns into the field pole regions 118.

One drawback of traditional electric motors, including electric motor 100, is that magnetic return path 116 requires a relatively long length for completing a magnetic circuit for flux emanating from one rotor magnet pole 110 and traversing via magnetic return path 116 to another rotor magnet pole 110. Furthermore, magnetic return path 116 is not a straight line, which is preferred for carrying magnetic flux. As shown, magnetic return path 116 has two ninety-degree turns in the stator path. Magnetic return path 116 turns once from field pole region 118 to peripheral flux-carrying segment 119, and then again from peripheral flux-carrying segment 119 to another field pole region 118. Both of these turns are suboptimal for carrying flux efficiently. As implemented, magnetic return path 116 requires more material, or "back-iron," than otherwise is necessary for carrying such flux between field poles. Consequently, magnetic return paths 116 add weight and size to traditional electric motors, thereby increasing the motor form factor as well as cost of materials to manufacture such motors.

Another drawback of conventional electric motors is that laminations 114 do not effectively use anisotropic materials to optimize the flux density and reduce hysteresis losses in flux-carrying poles, such as through field poles 118, and stator regions at peripheral flux-carrying segment 119. In particular, peripheral flux-carrying segment 119 includes a non-straight flux path, which limits the use of such anisotropic materials to reduce the hysteresis losses (or "iron losses"). Hysteresis is the tendency of a magnetic material to retain its magnetization. "Hysteresis loss" is the energy required to magnetize and demagnetize the magnetic material constituting the stator regions, wherein hysteresis losses increase as the amount of magnetic material increases. As magnetic return path 116 has one or more turns of ninety-degrees or greater, the use of anisotropic materials, such as grain-oriented materials, cannot effectively reduce hysteresis losses because the magnetic return path 116 in peripheral flux-carrying segment 119 would cut across the directional orientation of laminations 114. For example, if direction 120 represents the orientation of grains for laminations 114, then at least two portions of magnetic return path 116 traverse across direction 120 of the grain, thereby retarding the flux density capacity of those portions of stator peripheral flux-carrying segment 119. Consequently, anisotropic materials generally have not been implemented in structures similar to stator structure 104 since the flux paths are usually curvilinear rather than straight, which limits the benefits provided by using such materials.

Yet another drawback of conventional electric motors is the relatively long lengths of magnetic return path 116. Changing magnetic fields, such as those developed at motor commutation frequencies, can cause eddy currents to develop in laminations 114 in an orientation opposing the magnetic field inducing it. Eddy currents result in power losses that are roughly proportional to a power function of the rate at which the magnetic flux changes and roughly proportional to the volume of affected lamination material.

Other drawbacks of commonly-used electric motors include the implementation of specialized techniques for reducing "cogging," or detent torque, that are not well-suited for application with various types of electric motor designs. Cogging is a non-uniform angular torque resulting in "jerking" motions rather than a smooth rotational motion. This effect usually is most apparent at low speeds and applies additive and subtractive torque to the load when field poles 118 are at different angular positions relative to magnet poles.

Further, the inherent rotational accelerations and decelerations cause audible vibrations.

FIG. 1B illustrates an axial motor as another type of traditional electric motor exemplifying commonly-used stator and rotor structures. Conventional axial motor geometries have been used to overcome the disadvantages of other common motor technologies, including radial motors. But when axial motors are designed in accordance with conventional design tenets relating to radial geometries, inherent limitations can arise that restrict the number of applications for which axial motors can be used. As such, the use of axial motors has been somewhat limited to relatively specialized niches.

Further, axial motors are usually constructed with an array of longitudinal field poles having perpendicular field pole faces at each end. The perpendicular field pole faces are usually positioned to face single or dual rotating planar assemblies of magnets, as shown in FIG. 1B. Axial motor 121 is shown to include arrays of longitudinal field poles as stator assembly 126, which is in between two rotating planar assemblies of magnets 131, which are mounted on a front magnet disk 124 and a back magnet disk 128. Also shown, are a front cover plate 122 and a rear cover plate 130 that contain bearings to hold the motor shaft in position. The field poles of stator assembly 126 typically are made of assemblies of steel laminations with perpendicular field pole faces to maintain a constant air gap with the rotating magnets 131.

A traditional axial motor typically has a fixed number or area of pole faces that can confront an air gap area, and, thus, can produce torque that is limited to the relative strength of the magnet. This means that to make a high torque motor, high strength (and therefore high cost) magnets are generally required. This, among other things, reduces the attractiveness of the axial motor design.

In view of the foregoing, it would be desirable to provide a field pole member as a structure that reduces the above-mentioned drawbacks in electric motors and generators, and to, for example, increase output torque and efficiency either on a per unit size or per unit weight basis, or both, as well as to conserve resources during manufacturing and/or operation.

SUMMARY OF THE INVENTION

A method, apparatus, article of manufacture and system for producing a field pole member for electrodynamic machinery are disclosed to, among other things, reduce magnetic flux path lengths, and to eliminate back-iron for increasing torque and/or efficiency per unit size (or unit weight) as well as for reducing manufacturing costs. In one embodiment, a field pole member structure can be formed to, for example, either reduce the length of magnetic flux paths or substantially straighten those paths through the field pole members, or both. In another embodiment, a method provides for the construction of field pole members for electrodynamic machines. The method includes positioning a plurality of magnetic flux conductors for affixation, for example, together longitudinally to form at least a field pole core of a field pole member. The method also can include forming a pole face at an end of the field pole member. That is, the method can include forming one or more pole faces at the one or more ends of the field pole member. In one embodiment, the field pole core is a substantially straight field pole core to provide either a straight flux path or a substantially straight flux path between the pole face and another pole face or the other end of the field pole member. In some embodiments, the methods of manufacture provide for field pole member structure that, among other things, can enhance motor efficiencies, as well as conserve resources to reduce manufacturing costs by, for example, minimizing wastage. The various embodiments relating to field pole member manufacturing can configure the field pole members, for example, to accommodate single and multiple magnet rotors, whereby the magnets can have any type of shape.

BRIEF DESCRIPTION OF THE FIGURES

The invention is more fully appreciated in connection with the following detailed description taken in conjunction with the accompanying drawings, in which:

FIG. 16 illustrates a field pole member manufactured in accordance with at least one embodiment of the invention.

FIG. 17 is an exploded view of a rotor-stator structure including rotor assemblies in accordance with some embodiments;

FIGS. 19C to 19D depict an example of a field pole member configured to interoperate with outer rotor assemblies, according to some embodiments;

FIGS. 19E to 19F depict an example of a field pole member configured to interoperate with inner rotor assemblies, according to some embodiments;

FIGS. 20E to 20G depict cross-sectional views of an example of an outer rotor assembly, according to some embodiments;

FIG. 22A depicts an outer rotor assembly and a stator assembly configured to interact with each other, according to some embodiments;

FIGS. 22B to 22C depict cross-sections of field pole members for determining a surface area of a pole face, according to some embodiments;

FIG. 22D illustrates a surface area of a pole face determined as a function of the flux in a coil region and the flux density produced by at least one magnet, the surface area being oriented at angle from a reference line, according to some embodiments;

FIGS. 27A to 27C depict various views of a field pole member, according to some embodiments;

Like reference numerals refer to corresponding parts throughout the several views of the drawings. Note that in the specification most of the reference numerals include one or two left-most digits that generally identify the figure that first introduces that reference number.

DETAILED DESCRIPTION

Definitions

Figure 1A:
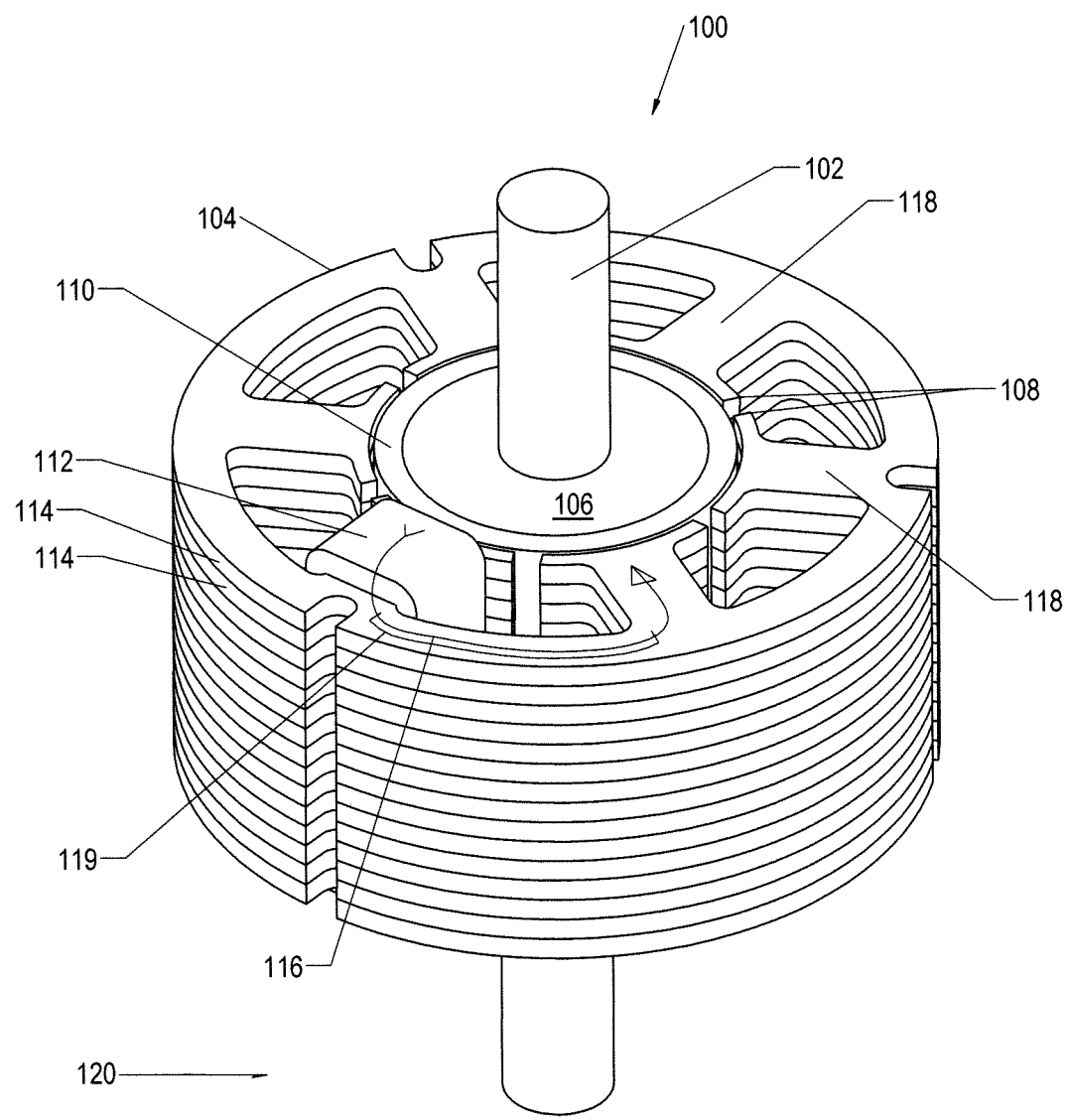
FIG. 1A illustrates a commonly-used radial stator structure implemented in a traditional electric motor.
Figure 1B:
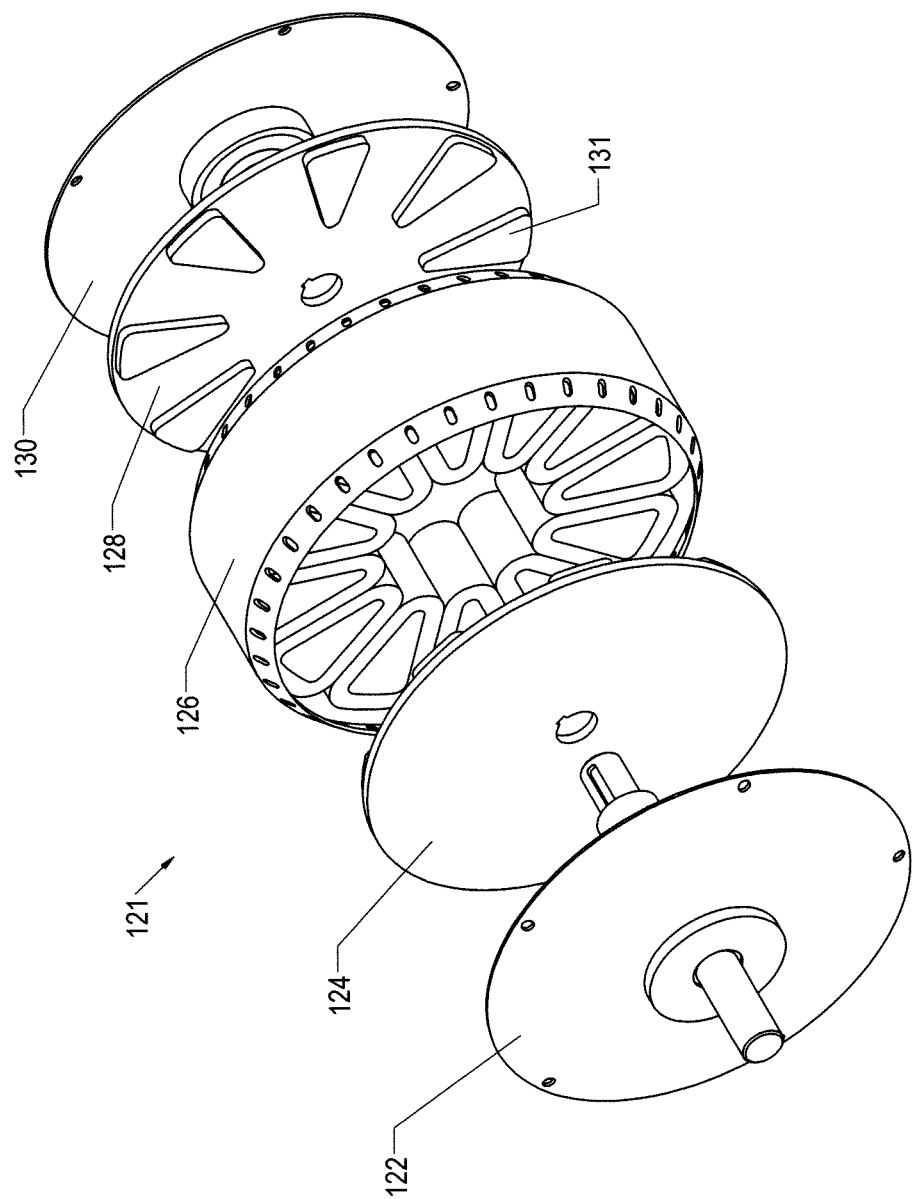
FIG. 1B illustrates an axial motor as another type of traditional electric motor.

The following definitions apply to some of the elements described with respect to some embodiments. These definitions may likewise be expanded upon herein.

As used herein, the term "air gap" refers, in at least one embodiment, to a space, or a gap, between a magnet surface and a confronting pole face. Examples of a magnet surface include any surface of magnetic material (e.g., a surface of permanent magnet), a surface of an internal permanent magnet ("IPM"), such as a magnetically permeable material through which flux passes (e.g., the flux being produced by a magnetic material), or any surface or surface portion of a "body that produces a magnetic field." Such a space can be physically described as a volume bounded at least by the areas of the magnet surface and the pole face. An air gap functions to enable relative motion between a rotor and a stator, and to define a flux interaction region. Although an air gap is typically filled with air, it need not be so limiting.

As used herein, the term "back-iron" commonly describes a physical structure (as well as the materials giving rise to that physical structure) that is often used to complete an otherwise open magnetic circuit (e.g., external to a rotor). In particular, back-iron structures are generally used only to transfer magnetic flux from one magnetic circuit element to another, such as either from one magnetically permeable field pole member to another, or from a magnet pole of a first rotor magnet (or first rotor assembly) to a magnet pole of a second rotor magnet (or second rotor assembly), or both, without an intervening ampere-turn generating element, such as coil, between the field pole members or the magnet poles. Furthermore, back-iron structures are not generally formed to accept an associated ampere-turn generating element, such as one or more coils.

As used herein, the term "coil" refers, in at least one embodiment, to an assemblage of successive convolutions of a conductor arranged to inductively couple to a magnetically permeable material to produce magnetic flux. In some embodiments, the term "coil" can be described as a "winding" or a "coil winding." The term "coil" also includes foil coils (i.e., planar-shaped conductors that are relatively flat).

As used herein, the term "coil region" refers generally, in at least one embodiment, to a portion of a field pole member around which a coil is wound.

As used herein, the term "core" refers to, in at least one embodiment, a portion of a field pole member where a coil is normally disposed between pole shoes and is generally composed of a magnetically permeable material for providing a part of a magnetic flux path. The term "core," in at least one embodiment, can refer, in the context of a rotor magnet, including conical magnets, to a structure configured to support magnetic regions. As such, the term core can be interchangeable with the term "hub" in the context of a rotor magnet, such as a conical magnet.

As used herein, the term "field pole member" refers generally, in at least one embodiment, to an element composed of a magnetically permeable material and being configured to provide a structure around which a coil can be wound (i.e., the element is configured to receive a coil for purposes of generating magnetic flux). In particular, a field pole member includes a core (i.e., core region) and at least one pole shoe, each of which is generally located near a respective end of the core. Without more (e.g., without a coil formed on thereon), a field pole member is not configured to generate ampere-turn flux. In some embodiments, the term "field pole member" can be described generally as a "stator-core."

As used herein, the term "active field pole member" refers, in at least one embodiment, to an assemblage of a core, one or more coils, and at least two pole shoes. In particular, an active field pole member can be described as a field pole member assembled with one or more coils for selectably generating ampere-turn flux. In some embodiments, the term "active field pole member" can be described generally as a "stator-core member."

As used herein, the term "ferromagnetic material" refers, in at least one embodiment, to a material that generally exhibits hysteresis phenomena and whose permeability is dependent on the magnetizing force. Also, the term "ferromagnetic material" can also refer to a magnetically permeable material whose relative permeability is greater than unity and depends upon the magnetizing force.

As used herein, the term "field interaction region" refers, in at least one embodiment, to a region where the magnetic flux developed from two or more sources interact vectorially in a manner that can produce mechanical force and/or torque relative to those sources. Generally, the term "flux interaction region" can be used interchangeably with the term "field interaction region." Examples of such sources include field pole members, active field pole members, and/or magnets, or portions thereof. Although a field interaction region is often referred to in rotating machinery parlance as an "air gap," a field interaction region is a broader term that describes a region in which magnetic flux from two or more sources interact vectorially to produce mechanical force and/or torque relative to those sources, and therefore is not limited to the definition of an air gap (i.e., not confined to a volume defined by the areas of the magnet surface and the pole face and planes extending from the peripheries between the two areas). For example, a field interaction region (or at least a portion thereof) can be located internal to a magnet.

As used herein, the term "generator" generally refers, in at least one embodiment, to an electrodynamic machine that is configured to convert mechanical energy into electrical energy regardless of, for example, its output voltage waveform. As an "alternator" can be defined similarly, the term generator includes alternators in its definition.

As used herein, the term "magnet" refers, in at least one embodiment, to a body that produces a magnetic field externally unto itself. As such, the term magnet includes permanent magnets, electromagnets, and the like. The term magnet can also refer to internal permanent magnets ("IPMs"), surface mounted permanent magnets ("SPMs"), and the like.

As used herein, the term "motor" generally refers, in at least one embodiment, to an electrodynamic machine that is configured to convert electrical energy into mechanical energy.

As used herein, the term "magnetically permeable" is a descriptive term that generally refers, in at least one embodiment, to those materials having a magnetically definable relationship between flux density ("B") and applied magnetic field ("H"). Further, the term "magnetically permeable" is intended to be a broad term that includes, without limitation, ferromagnetic materials such as common lamination steels, cold-rolled-grain-oriented (CRGO) steels, powder metals, soft magnetic composites ("SMCs"), and the like.

As used herein, the term "pole face" refers, in at least one embodiment, to a surface of a pole shoe that faces at least a portion of the flux interaction region (as well as the air gap), thereby forming one boundary of the flux interaction region (as well as the air gap). In some embodiments, the term "pole face" can be described generally as including a "flux interaction surface." In one embodiment, the term "pole face" can refer to a "stator surface."

As used herein, the term "pole shoe" refers, in at least one embodiment, to that portion of a field pole member that facilitates positioning a pole face so that it confronts a rotor (or a portion thereof), thereby serving to shape the air gap and control its reluctance. The pole shoes of a field pole member are generally located near one or more ends of the core starting at or near a coil region and terminating at the pole face. In some embodiments, the term "pole shoe" can be described generally as a "stator region."

As used herein, the term "soft magnetic composites" ("SMCs") refers, in at least one embodiment, to those materials that are comprised, in part, of insulated magnetic particles, such as insulation-coated ferrous powder metal materials that can be molded to form an element of the stator structure.

Discussion

Figure 2:
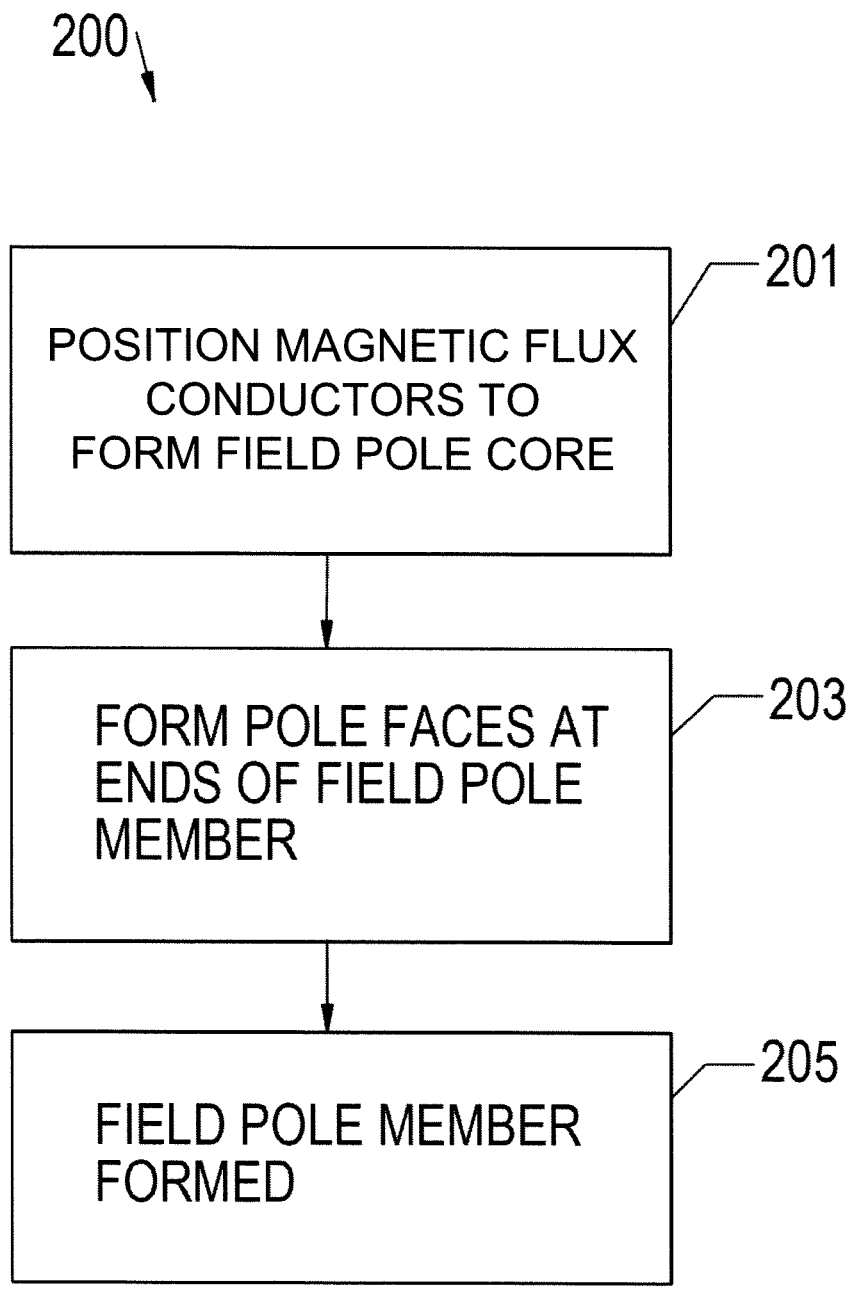
FIG. 2 is a generalized flow for producing a field pole member in accordance with a specific embodiment of the invention.

FIG. 2 is a generalized flow for producing a field pole member in accordance with a specific embodiment of the present invention. Flow 200 provides for a manufacturing technique to produce field pole member structures that can carry amounts of magnetic flux in, for example, unidirectional direction or a substantially unidirectional direction. These structures can provide for increased performance and economical manufacturing of electrodynamic machines, such as electric motors and generators, as well as electric solenoids and other applications. In one embodiment, flow 200 positions magnetic flux conductors in relatively close proximity for affixation together to form a field pole core of a field pole member at 201. Flow 200 also can be used to form the field pole member itself, according to some embodiments. As used herein, the term "magnetic flux conductor" in some embodiments describes an elongated structure composed of magnetically permeable material. Optionally, a magnetic flux conductor can have grain orientation along a longitudinal direction (i.e., lengthwise). Examples of magnetic flux conductors include wires and laminations composed of magnetically permeable material, such as silicon steel. At 203, pole faces can be formed with respect to the field pole cores to provide flux interaction surfaces. These pole faces can be configured to confront, for example, conical-shaped or cylindrical-shaped magnets as described in U.S. Pat. No. 7,061,152 B2 and U.S. patent application Ser. No. 11/255,404, respectively. In one embodiment the pole faces can be sculpted to form sculpted pole faces to confront conical-shaped, cylindrical-shaped magnets, or the like. In various other embodiments, the pole faces can be configured to confront other magnets having any other kind of shapes, such as trapezoidal magnets in the case of linear and/or rotary motors. A field pole member is produced at 205. In various embodiments, flow 200 can affix magnetic flux conductors together at 201 prior to or subsequent to forming pole faces at 203. In one embodiment, flow 200 can affix magnetic flux conductors together at 201 at the same time or at substantially the same time as forming pole faces at 203.

Figure 3:
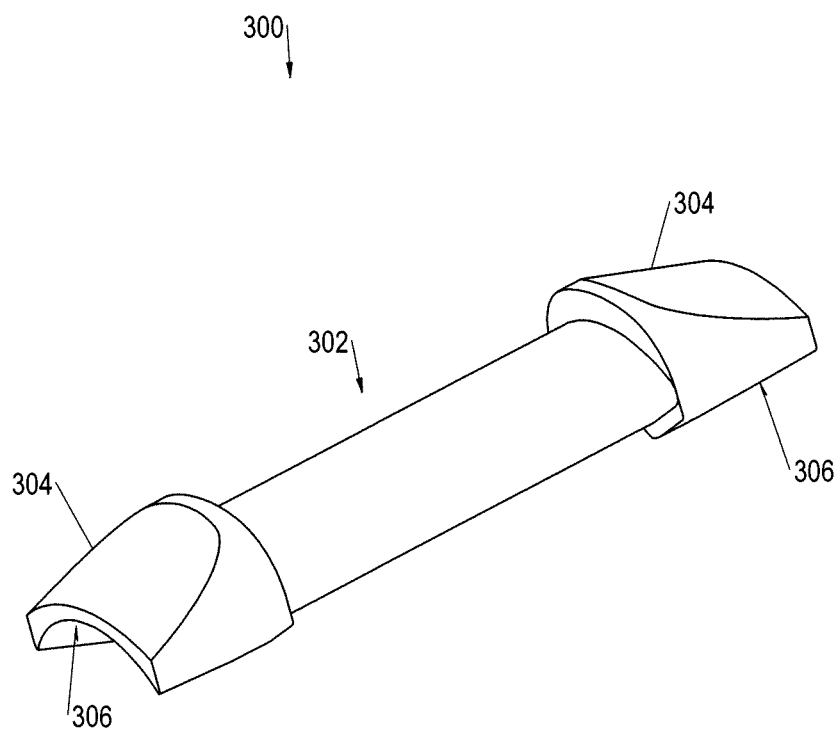
FIG. 3 illustrates an example of a field pole member produced by a specific embodiment of the invention.
Figure 10:
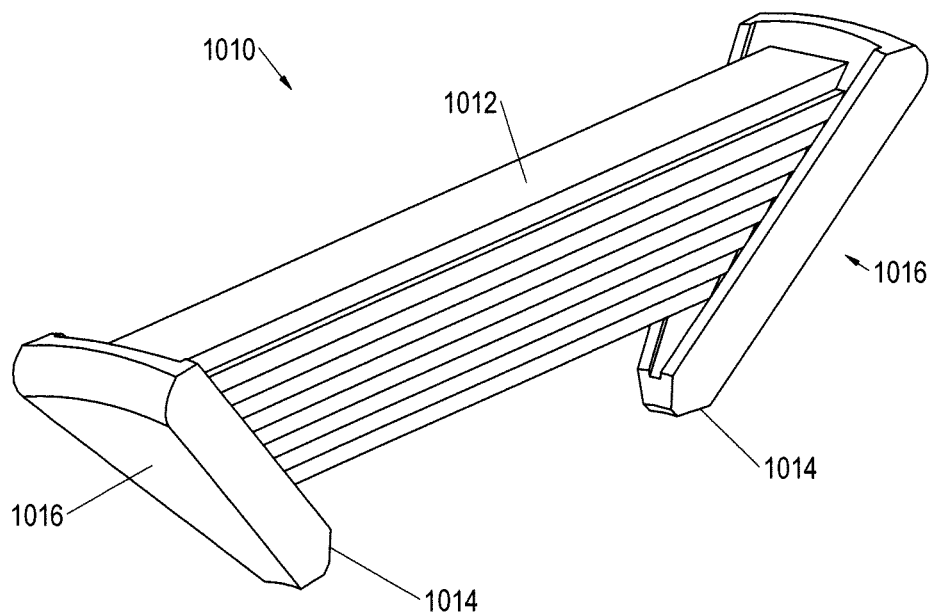
FIG. 10 illustrates an integrating process to form pole shoe faces in accordance with an embodiment of the invention.

FIG. 3 illustrates an example of a field pole member produced by a specific embodiment of the present invention. Field pole member 300 includes a field pole core 302 and pole shoe members 304. Each pole shoe member 304 includes an example of a pole face, which is pole face 306. In one embodiment, field pole core 302 is over-molded to form pole shoe members 304. In some cases, over-molding also encapsulates the magnetic flux conductors constituting field pole core 302. In other cases, over-molding only forms pole shoe members 304. As used herein, the term "cap" in some embodiments refers to pole shoe members 304. In at least one embodiment, field pole core 302 is a straight or a substantially straight field pole core and provides a substantially straight flux path between pole faces 306. In other embodiments, field pole core 302 can include or can be coupled to transition regions. In a specific embodiment, pole shoe members 304 are formed as "caps" composed of magnetically permeable material. As such, pole shoe members 304 can be formed by pressing magnetic powders into a specific shape that defines the contours of pole faces 306. The individual magnetic powder particles that are used to form pole shoe member 304 can, at least in some cases, have an insulation coating, which improves the loss characteristics of field pole member 300. One example of implementing caps as pole shoe members 304 is shown in FIG. 10. In as least one embodiment, field pole member 300 has substantially the same desirable magnetic properties and low loss characteristics found in field pole members produced with laminations alone (i.e., with pole faces being formed in the laminations). Pressed end-caps and over-molding allow designers additional freedom to create field pole member and stator end-geometries using laminations, wires, or any other type of magnetic flux conductor.

Figure 4:
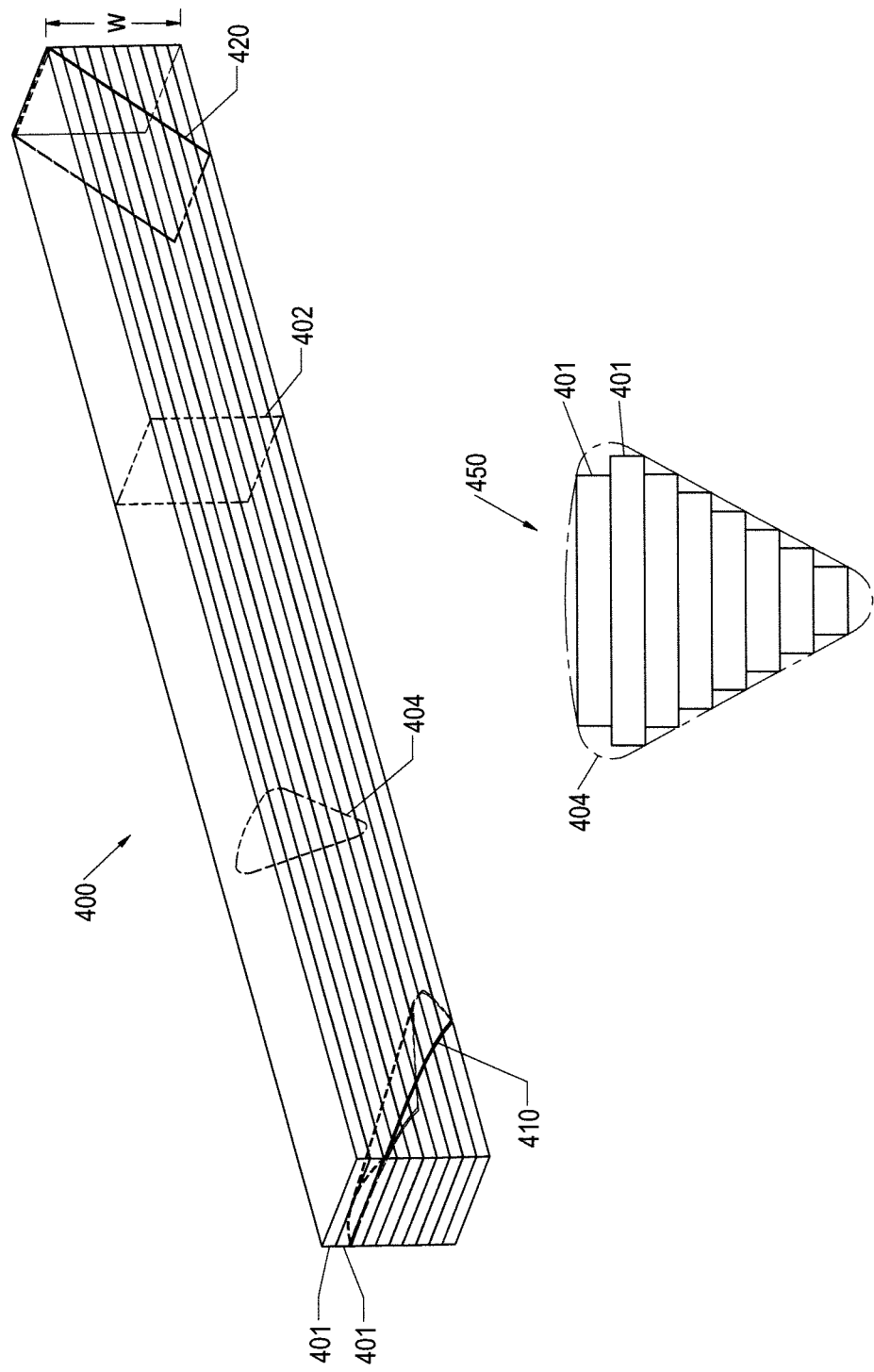
FIG. 4 depicts an example of a field pole core produced by a specific embodiment of the invention.

FIG. 4 depicts an example of a field pole core produced by a specific embodiment of the invention. As shown in this example, field pole core 400 includes a number of laminations 401. In one embodiment, field pole core 400 has a square-shaped cross-section 402 if each of laminations 401 has the same width, "W." In at least one embodiment, one or more laminations 401 have varying widths, W. For example, by varying widths of lamination 401, a teardrop-shaped cross-section 404 can be formed for field pole core 400. In at least one embodiment, laminations 401 are can be isolated (e.g., electrically, magnetically, etc.) from each other by, for example, being coated with an electrically-insulating material, such as an oxide, glass coating or the like. One example of an electrically-insulating material is black oxide. In a specific embodiment, laminations 401 can be affixed to each other with a bonding agent. In various embodiments of the invention, the orientation of the lamination widths, W, can be either radial (or substantially radial) or concentric (substantially concentric), or in any other orientation, relative to an axis of rotation. According to one embodiment, the shape of the field pole core and/or the manufacturing process cost, in whole or in part, can determine the orientation in which to stack laminations 401.

Cross-section 450 of an envelope 404 is shown in FIG. 4, which shows laminations 401 having varying widths, W. The varying widths can produce field pole core 400 having teardrop-shaped cross-section 450 for envelop 404. In one embodiment, one or both ends of field pole core 400 can include a pole face 410 formed to provide a uniform air gap or a substantially uniform air gap. Or, in some embodiments, pole face 410 is formed to mate with a cap (not shown) having, for example, a sculpted mating surface. In various embodiments, pole face 410 is formed by, for example, sculpting one or more ends of field pole core 400 (to form a field pole member), or sculpting a cap for a pole shoe. As used herein, the term "sculpted pole face" can generally refer, at least in one embodiment, to a "contoured" pole face or an "angled" pole face. Note that in at least one embodiment, pole face 410 can be formed as a contoured pole face, which includes a contoured surface. The contoured surface can be substantially coextensive with a curved surface, whereby the degree of curvature can be fixed or variable over the surface of pole face 410. As such, pole face 410 can be referred to as a contoured pole face 410, according to at least one embodiment. In some cases, the curved surface can include a portion that is coextensive with an arc that lies on a surface of, for example, a cone or a cylinder. Further, the contoured surface can be a concave surface in one embodiment. In another embodiment, one or both ends of field pole core 400 can include a flat or a substantially flat, but angled pole face 420. This angled pole face can be formed by cutting field pole member 400 at its ends so that each of the pole faces is contoured either to confront a permanent magnet or to readily mate with a cap, or both. In some embodiments, the terms "cut" and "cutting," as applied to field pole members, refer to the separation of magnetic flux conductors from a main body of starting material, such as from rolls of slitted laminations or from rolls of wires. Thus, cutting field pole members can form "sculpted" pole faces in some embodiments. Generally, such "cuts" are lateral in nature (i.e., generally occurring along a width of a magnetic flux conductor) rather than longitudinal. As used herein, the term "angled," in at least one embodiment, refers to a characteristic of a surface (or a portion thereof) that faces at least a portion of the flux interaction region (as well as the air gap). The surface can be a flux interaction surface of a pole shoe (e.g., a pole face) or a surface of a magnet. According to various embodiments, angled pole face 420 can be adapted to confront, for example, an angled surface of a trapezoidal magnet implemented in, for example, a linear or a rotary motor.

Figure 5:
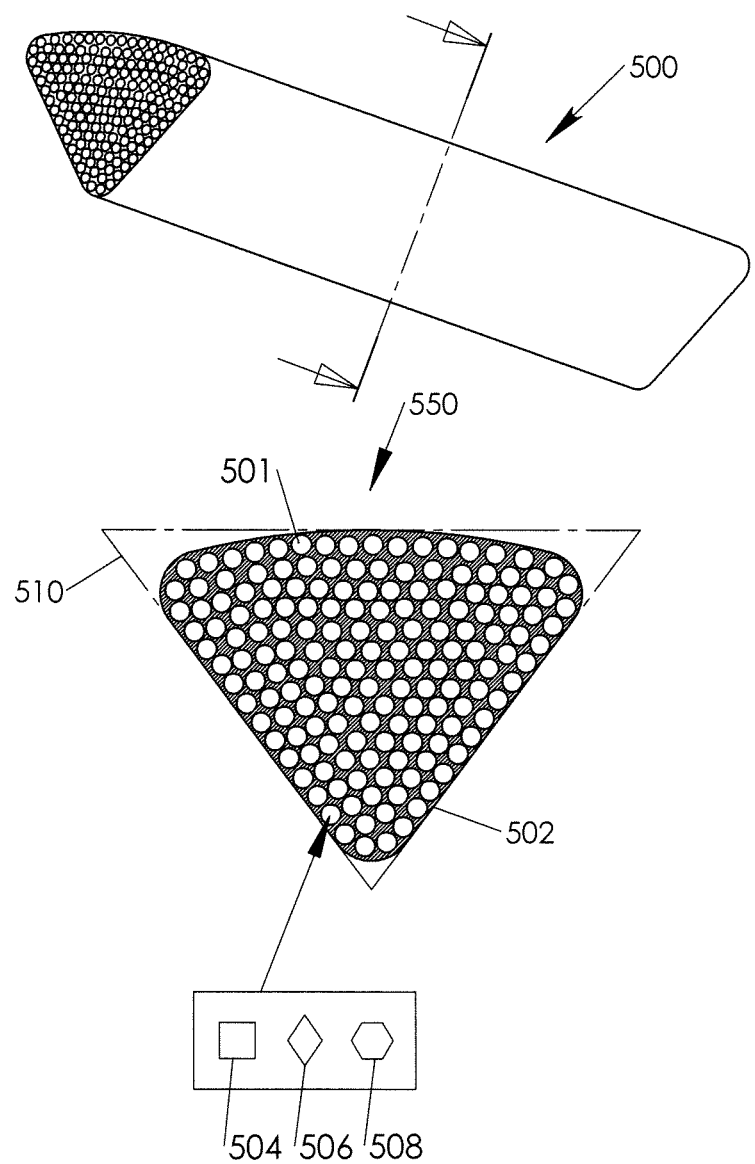
FIG. 5 depicts an example of another field pole core produced by another specific embodiment of the invention.

FIG. 5 depicts an example of another field pole core produced by another specific embodiment of the invention. Field pole core 500 includes a number of wires as magnetic flux conductors. As cross-sectional view ("A-A") 550 depicts, field pole core 500 includes a number of wires 501 and interstitial material 502. In the example shown, wires 501 have circular cross-sections. Wires 501 can provide relatively high magnetic flux carrying capabilities for field pole core 500 similar to field pole cores constructed of magnetic steel laminations. As such, wires 501 allow a variety of field pole core shapes that generally might otherwise be difficult and/or expensive to create with other techniques, such as with laminations, according to some embodiments. For example, FIG. 5 shows that wires 501 can be aggregated to form a triangular cross-section shape 510 for field pole core 500. Wires 501 can also be used to form other shapes, such as oval or tear-drop cross-section shapes, for field pole core 500. As used herein, the term "envelope" can refer generally, at least in some embodiments, to one or more surfaces that, as boundaries, encompass magnetic flux conductors. An envelope can have a cross-section shaped as either a square, a circle, a tear drop, an oval, or any other shape that can be produced by a mold, a die, a compaction wheel, or the like. In at least one instance, the cross-section for an envelop lies in a plane substantially perpendicular to a line parallel to the length of a magnetic flux conductor. In at least one embodiment, wires 501 can be isolated from each other by implementing, for example, a coating that includes an electrically-insulating material, such as oxide or the like.

Wires 501 can lower losses generally associated with, for example, laminations because wires 501 can provide reduced cross sections and cross-sectional area therein, thereby reducing the eddy currents therein. In various embodiments, wires 501 can have square-shaped cross sections 504, diamond-shaped cross sections 506, and hexagonal-shaped cross-sections 508, among other types of shapes for cross-sections of wires 501. Cross-sections 504 and 506 can, for example, reduce the volume of interstitial material 502. In a specific embodiment, interstitial material 502 can include a bonding agent and/or magnetic particles. The bonding agent can affix wires 501 to each other, whereas the magnetic particles can enhance the flux-carrying capabilities of field pole core 500 by filling what otherwise may be voids among wires 501 with flux-carrying material. Examples of magnetic particles include powders composed of soft magnetic composites ("SMCs") as "magnetic powder." Note that use of composite material, such as SMC, can, at least in one embodiment, be used to manufacture complex field pole member structures that can have negligible or no material waste of wire 501, as well as relatively very little amount of magnetic powder in interstitial material 502. In some cases, magnetic particles can have an insulating exterior shell around each powder particle, such iron oxide. In one embodiment, interstitial material 502 excludes magnetic particles and only includes binding agent. In other embodiments, interstitial material 502 can include either magnetic particles or binding agents, or both.

Figure 6:
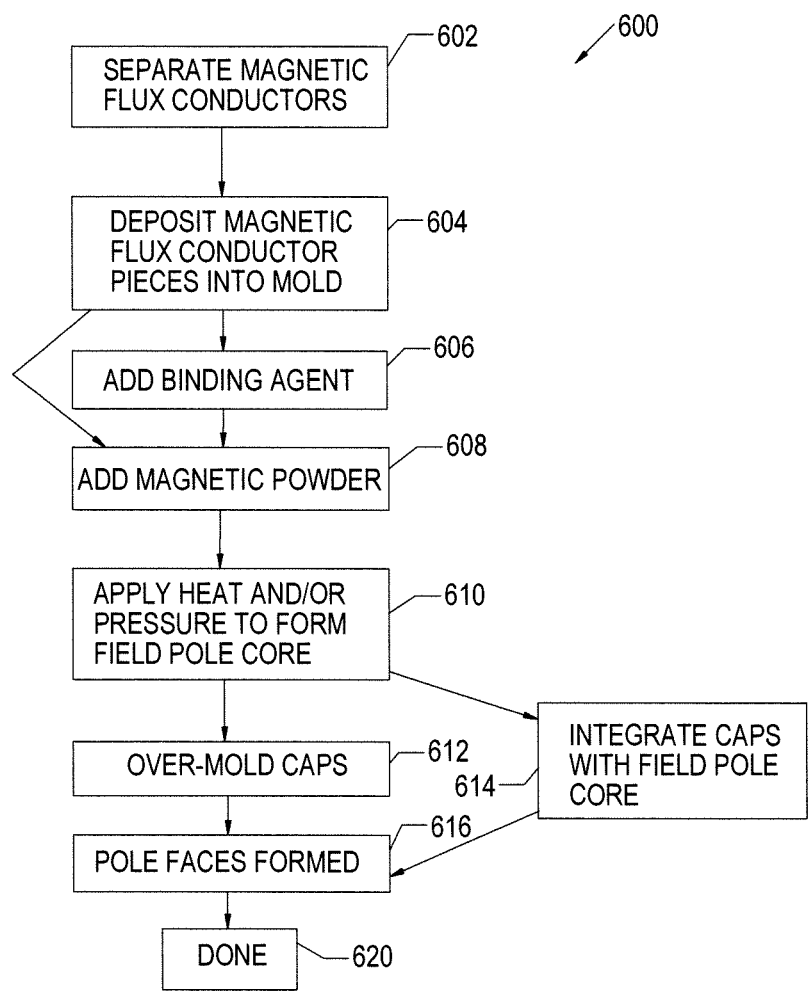
FIG. 6 is a flow diagram illustrating an example of a manufacturing flow for producing a field pole member, according to an embodiment of the invention.

FIG. 6 is a flow diagram illustrating an example of a manufacturing flow for producing a field pole member, according to an embodiment of the invention. At 602, a number of magnetic flux conductors are cut to a length that generally approximates the length of the finally manufactured field pole core. In some embodiments, each magnetic flux conductors are cut at an identical length (e.g., when implementing caps), wherein in other embodiments, each of the magnetic flux conductor can be cut to a length that approximates the distance between pole faces. In at least one embodiment, the lengths of the magnetic flux conductors can vary to accommodate the varying distance between the pole faces. At 604, the number of magnetic flux conductors can be deposited into a mold, which can be described as a location or as an approximate location at which affixation of magnetic flux conductors occurs. At least one example of a mold can form additional structural and/or functional features for a field pole member, such as sculptured pole faces and/or locating features. Optionally, a binding (or bonding) agent can be introduced into the mold at 606 if such an agent has yet to be applied either to the magnetic flux conductors or to the starting material (e.g., a steel coil) from which the magnetic flux conductors are formed. A binding agent can be used to hold the field pole member assembly together. Optionally, the binding agent can be a powdered material mixed with the magnetic powder at 608, and heated and/or pressurized at 610 to cure the bonding agent. Alternatively the binding agent can be a penetrating adhesive having a relatively low viscosity, which is applied at 606 once the mold has been packed with wires at 604 and magnetic powder at 608. Note that when the magnetic flux conductors are laminations, then adding magnetic powder at 608 can be omitted as there can be negligible or no voids in the interfaces between laminations.

In some embodiments, the introduction of a binding agent occurring at 606 can be performed prior to the separation (e.g., cutting) of magnetic flux conductors from that material from which they originate. For example, if magnetic flux conductors are laminations, then the binding agent can be applied to a roll (or coil) of starting material (e.g., a pre-cut roll). In this case, the binding agent can be applied as a coating prior to slitting (e.g., shear slitting) or any other form of longitudinally-oriented cutting. In at least one embodiment, flow 600 applies the binding agent between 602 and 604. That is, a binding agent, such as a thin film adhesive, can be applied onto elongated strips after slitting process has formed the strips from the starting material.

Flow 600 continues from 610 to form pole shoe members 304 (FIG. 3) or "caps." In one embodiment, flow 600 moves to 612 to form pole shoe members as caps by using an over-molding technique. Here, an over-molding operation can use an adhesive (e.g., glue) combined with insulated magnetic powder material to form a desired shape for the pole faces at 616. By over-molding at least the ends of the field pole core, the pole faces can be shaped in a controlled manner for producing flux interaction surfaces that can have characteristics for forming an air gap with a magnet, such as a conical or cylindrical magnet. In another embodiment, flow 600 moves from 610 to 614. Here, pole shoe members 304 (FIG. 3) or "caps" can be integrated with a field pole core ("F.P. core") to form a field pole member having pole faces. At 614, the integration of the pole shoe members to, for example, the ends of a field pole core can include applying a binding adhesive with or without a soft magnetic composite powder to the ends of the field pole core, and pressing the pole shoe members to the ends of the field pole to form a specific shape for a pole face at 616. As such, the pole face formed at 616 can be a sculpted pole face. Thus, a motor manufacturer can reduce an inventory of field pole members for electrodynamic machines requiring either conical or cylindrical magnets, for example. Interchangeable caps adapted for the conical and cylindrical magnets can be integrated with a common field pole core as needed, thereby preventing build up unnecessary inventory. When integrating (e.g., by fastening) the pole shoe members to the field pole core, a combination of a binding adhesive and a magnetic powder filler can be used. While the magnetic flux carrying capability of the pole shoe members and the magnetically-filled binding adhesive may differ from those field pole cores composed of laminations, the relatively short flux travel distance across the binding adhesive minimally might affect the flux-carrying capability of the field pole member. At 620, flow 600 concludes ("done") by producing a field pole member. In some embodiments, flow 600 can form transitions regions with respect to the field pole members.

Figure 7:
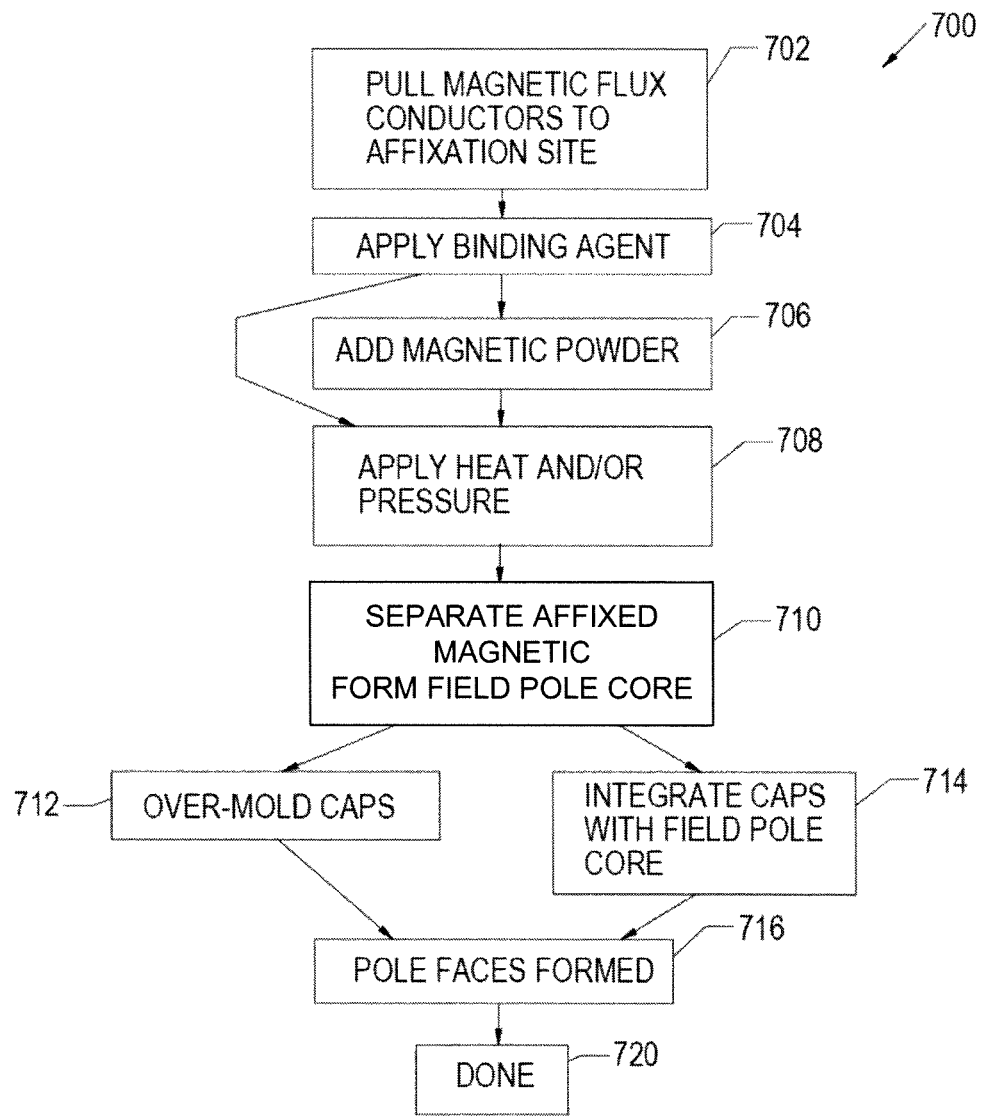
FIG. 7 is a flow diagram illustrating another example of a manufacturing flow for producing a field pole member, according to another embodiment of the invention.

FIG. 7 is a flow diagram illustrating another example of a manufacturing flow for producing a field pole member, according to another embodiment of the invention. At 702, a number of magnetic flux conductors are pulled to an affixation site at which the magnetic flux conductors can be affixed to each other. For instance, an affixation site can include a die. In other instances, the affixation site can include shaping members, such as a set of mating wheels (e.g., shaped mating wheels). An example of such wheels are described in FIG. 8B as compaction wheels. The die and/or mating wheels maintain a cross-sectional shape for the field pole core. As such, mating wheels can form a number of cross-sectional shapes, such as a round, oval and tear drop shapes. So at 702, the magnetic flux conductors are each of pulled from a supply of elongated magnetic flux conductors, such as from a number of spools. Generally, magnetic flux conductors are pulled as elongated magnetic flux conductors having lengths that are greater than the length of the field pole core. As used herein, the term "elongated magnetic flux conductors" refers in some embodiments to magnetic flux conductors that have yet to be cut to form a field pole member of the embodiments of the invention.

At 704, a binding agent is applied to the magnetic flux conductors. For example, the binding agent can be aerosolized and deposited on (i.e., sprayed on) each of the magnetic flux conductors as they are pulled from the supply of elongated magnetic flux conductors to a die (i.e., the affixation site). Applying the binding agent in an aerosol form is well-suited for application with laminations. As another example, the binding agent can be rolled onto the magnetic flux conductors. In alternative embodiments, the introduction of a binding agent at 704 can be implemented prior to pulling magnetic flux conductors to the affixation site at 702. For example, a binding agent can be applied to either a steel coil prior to slitting of laminates, or to a wire before it is rolled onto a spool.

If the magnetic flux conductors are laminations, then flow 700 moves to 708. But if the magnetic flux conductors are wires, then flow 700 moves to 706. Magnetic powder is applied to the wires at 706 to fill the voids. In one embodiment, both the binding agent and the magnetic powder can be applied at the same time by transferring (e.g., by brushing) the combination of binding agent-magnetic powder onto the wires. At 708, a die is either heated or activated to apply pressure, or both, to cure the binding agent to form bar stock (e.g., metal bars). Alternatively, a heater can perform the curing process separate from the die. In some embodiments, a mating wheel at 708 heats and/or applies pressure to cure the binding agent to form the bar stock. At 710, the affixed magnetic flux conductors are cut to form field pole cores. That is, each of the plurality of magnetic flux conductors is cut at a length approximate to the length of the field pole core after affixing the plurality of magnetic flux conductors together to form affixed magnetic flux conductors. Then, flow 700 proceeds from 710 to 720, wherein 712, 714, 716 and 720 are similar in functionality as respective 612, 614, 616 and 620 of FIG. 6. Flow 700 can provide a cost-effective, constant cross-section process that continually forms field pole members. In one embodiment, flow 700 is similar to a pultrusion process. In some embodiments, flow 700 forms transitions regions with respect to the field pole members.

Figure 8A:
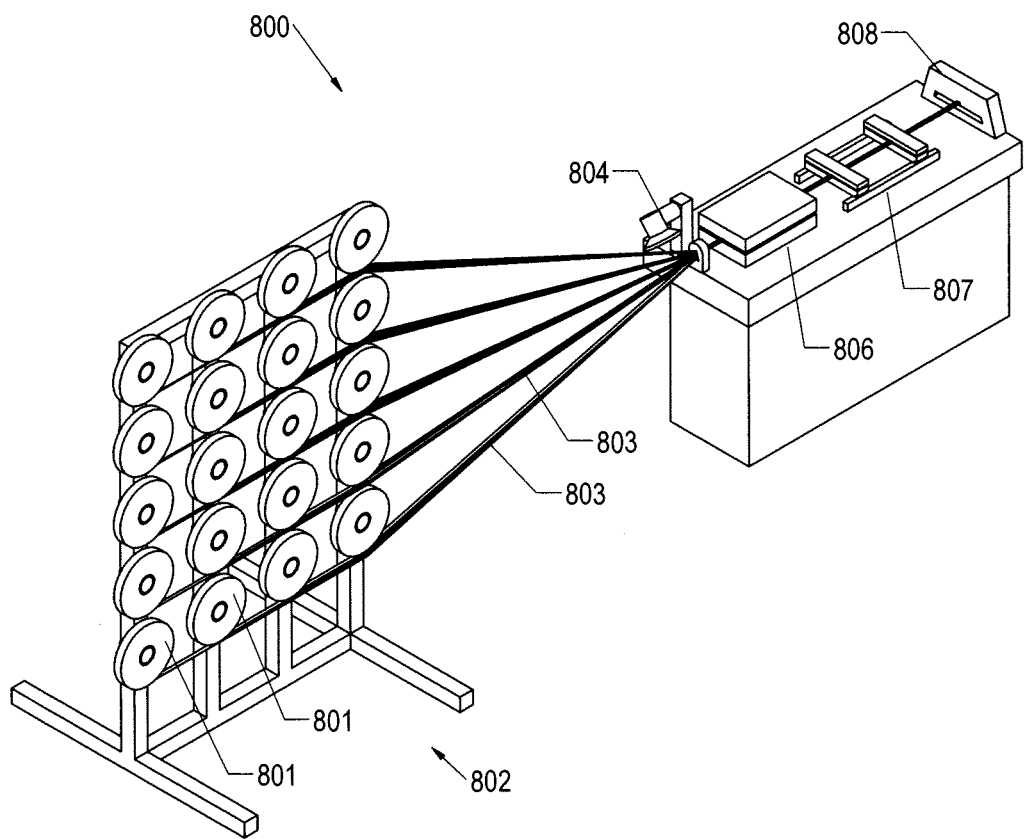
FIG. 8A illustrates a system for manufacturing a field pole member in accordance with an embodiment of the invention.

FIG. 8A illustrates a system for manufacturing a field pole member in accordance with an embodiment of the invention.

System 800 includes a supply ("spooled laminations") 802, elongated magnetic flux conductors 803 (each of which is wound onto a spool 801), an optional spray-on binder 804, a combined die-heater 806, a pulling mechanism 807, and one or more cutters 808 for separating the affixed magnetic flux conductors from elongated magnetic flux conductors 803. Supply 802 includes a number of laminations arranged on spools. In one embodiment, each of elongated magnetic flux conductors 803 on respective spools has the same width. In an alternative embodiment, elongated magnetic flux conductors 803 can be of varying widths to, for example, produce tear drop-shaped field pole member cores. In some cases, sheet steel supplied by a steel mill is first slit to the various widths and re-spooled into supply 802 of FIG. 8A. Spools 801 are then loaded into the production machine. During processing, optional spray-on binder 804 sprays at least a heat-activated binding agent onto the individual elongated magnetic flux conductors 803 as they are pulled through a die 806. A heater stage of die 806 activates the binding agent, which solidifies the stack into bar stock. Pulling mechanism 807 pulls the affixed magnetic flux conductors into one or more cutters 808. For instance, two cutters 808 can be used in succession to create the final field pole cores. System 800 can reduce waste of material during the original slitting operation and possibly during the final cuts as compared to, for example, stamping laminations out of sheets of steel. Cutter 808 can form straight cuts (e.g., perpendicular to elongated magnetic flux conductors 803) or angled cuts. Water jet cutting is one example of cutter 808 suitable to practice some embodiments of the invention.

In some embodiments, wire having a grain orientation for enhancing magnetic properties can be used. The initial tooling costs for system 800 can be relatively low, and can be amortized over small volumes. The use of a binding agent to bind the magnetic flux conductors together can generally assist in reducing the noise and vibration of the final composite structure of a field pole member as compared to an equivalent structure made of, for example, unbonded steel laminations. In various embodiments, the laminations can also be affixed by laser welding, e-beam welding and the like.

Figure 14:
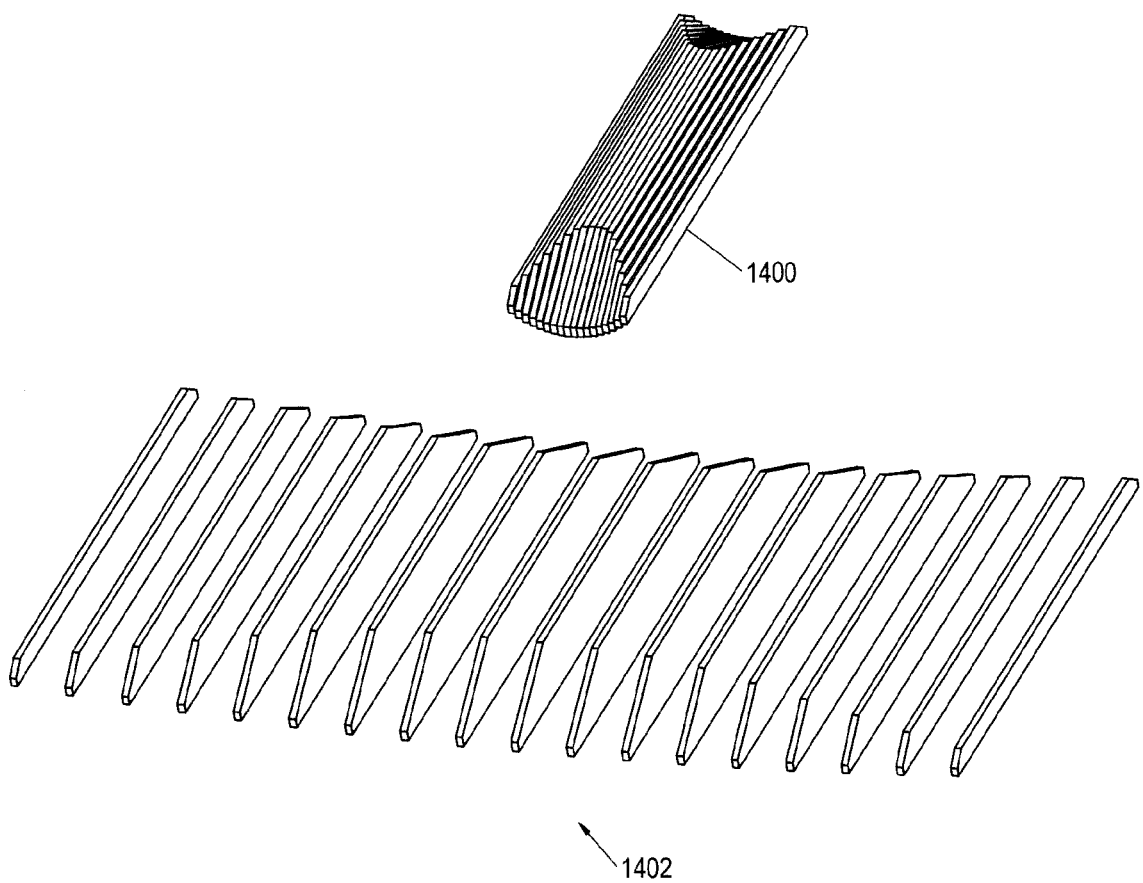
FIG. 14 illustrates a field pole member manufactured in accordance with yet another embodiment of the invention.
Figure 15:
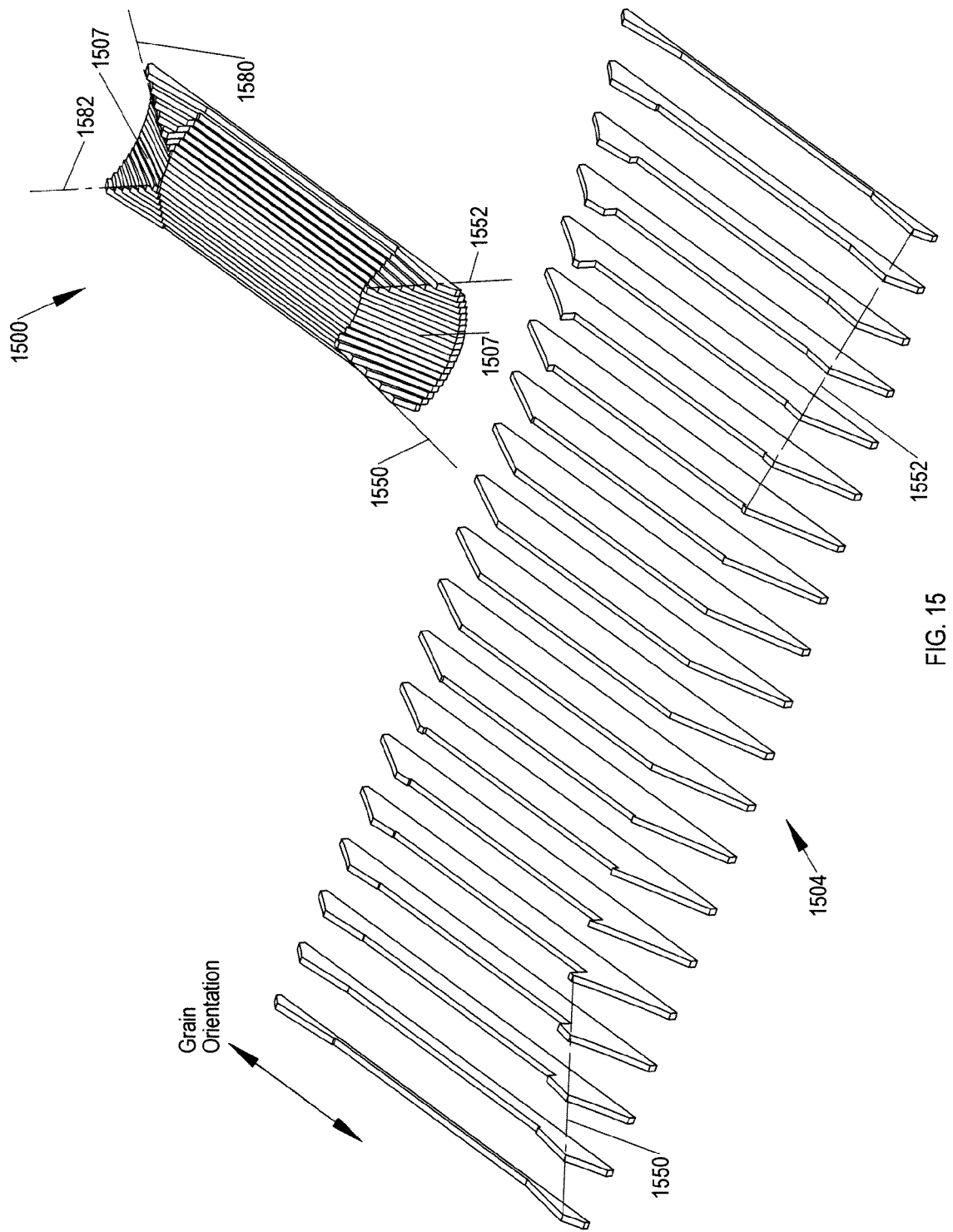
FIG. 15 illustrates a field pole member manufactured in accordance with still yet another embodiment of the invention.

In some embodiments, magnetic flux conductors 803 can be formed as laminations using a stamping process. FIGS. 14 to 16 illustrate examples of laminations formed by, for example, stamping to produce field pole cores and/or field pole members. However, in reference to FIG. 8A, a slitting process can be used to longitudinally separate a starting material (or coil) into different widths for elongated magnetic flux conductors 803. Generally, laminations formed from a slitting process and a separation process, such as by cutting at cutters 808, are likely to have more favorable magnetic characteristics than those produced by stamping. Slitting processes suitable to practice some embodiments include standard shear wheel slitting, water jet slitting, and laser cutting. In some cases, the stamping process might disturb the magnetic properties of elongated magnetic flux conductors 803. In at least one embodiment, magnetic flux conductors 803 can be wires.

Figure 8B:
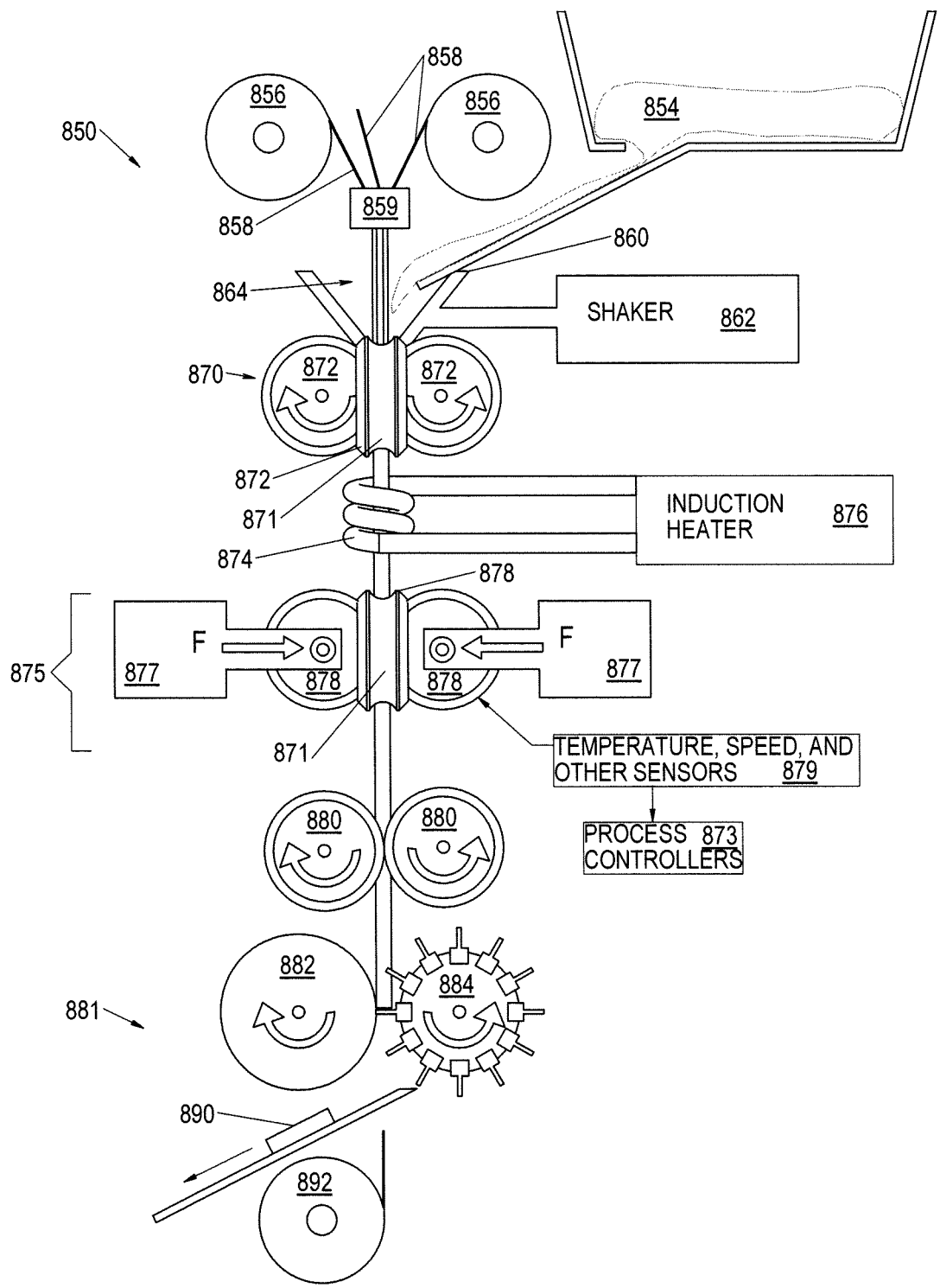
FIG. 8B illustrates another system for manufacturing a field pole member in accordance with another embodiment of the invention.

FIG. 8B illustrates another system for manufacturing a field pole member in accordance with another embodiment of the invention. System 850 can generally be used to form field pole cores as well as the field pole members themselves. As shown, system 850 is used to form field pole members and field pole cores formed by, for example, incorporating composite over elongated magnetic flux conductors, such as wires. Generally, wires 858 are fed via wire guide 859 from supply spools 856 into a hopper 860. Also, powered metal and/or SMC feed stock ("powder") 854 can be fed into hopper

860. In at least one embodiment, the size, the wire cross-section, and number of wires 858 can be selected as a function of for example, process convenience and strength, rather than their magnetic properties. In various embodiments, the volume of wires 858 can vary in relation to the total volume of extrusion 899 or field pole cores 890 to achieve different properties. In one instance, the manufacturing process can be aligned vertically to allow gravity to aid the combination of materials in hopper 860 and to generally aid alignment of the extruded material while it moves through the system. System 850 can be aligned horizontally as well as in other variations of alignment.

Shaker 862 functions to vibrate the powder to combine it with magnetic wires 858 at incorporation site 864 within hopper 860. Shaker 862 is configured to shake hopper 860 to distribute powder 854 around wires 858, and to provide some initial densification of the mix as it enters an initial compaction site 864. In some embodiments, initial compaction wheels 872 are disposed adjacent hopper 860 to pass the combination of the wire and powder to a heating element. Generally, initial compaction wheels 872 can be started in synchronization with wires 858 take-up spool 892 to ensure constant wire tension—at least at start-up. The presence of the tensioned wires can eliminate a problem, at least in some instances, relating to extrusion processes (e.g., a problem of controlling the straightness of the extruded material).

In one embodiment, induction heater 876 heats extruded material 899 at induction heater coils 874, which are generally at temperatures of less than or about 500° C. System 850 also can include an additional (or final) compaction stage 875. In one embodiment, additional compaction stage 875 includes a number of additional compaction wheels 878 for further compacting the extrusion. In one example, hydraulic pistons 877 apply pressures via additional compaction wheels 878 (e.g., four wheels) to extruded material 899. Note that any number of additional compaction wheels 878 can be used. Further, additional compaction wheels 878 can be powered by motors to synchronize the speed of extrusion 899 passing through with the speed of the wire take up by take-up spool 892. Additional compaction wheels 878 can be adjacent to each other so that their angled or contoured surfaces 871 meet or almost meet. Angled or contoured surfaces 871 on wheels 872 and/or 878 can be configured to form the outside diameter portions of extrusion 899 to shape a portion of the field pole core/member, such as the cross-sectional area of a field pole core/member. Note that additional compaction wheels 878 can replace or supplement the use of the die 806 of FIG. 8A to aid in reducing the friction at the forming process. In some embodiments, temperature and speed sensors 879 and process controller 873 can control the functions of system 850, including the final compaction stage 875.

Powered tension wheels 880 can apply tension to extrusion 899, for example, once the wires are released at the bottom of the process at take-up spool 892. Extrusion 899 can be passed to the cutoff station 881 at which at least the field pole cores 890 are separated from extrusion 899. Cutoff station 881 can be energized to cut the extrusion into a predetermined length by, for example, blades 884, which can follow extrusion 899 at the same relative speed. Blades 884 can include moving saw blades. Once cutoff station 881 is energized, the wires that were fed to the take up spool 892 to provide initial tension are no longer needed.

Figure 9:
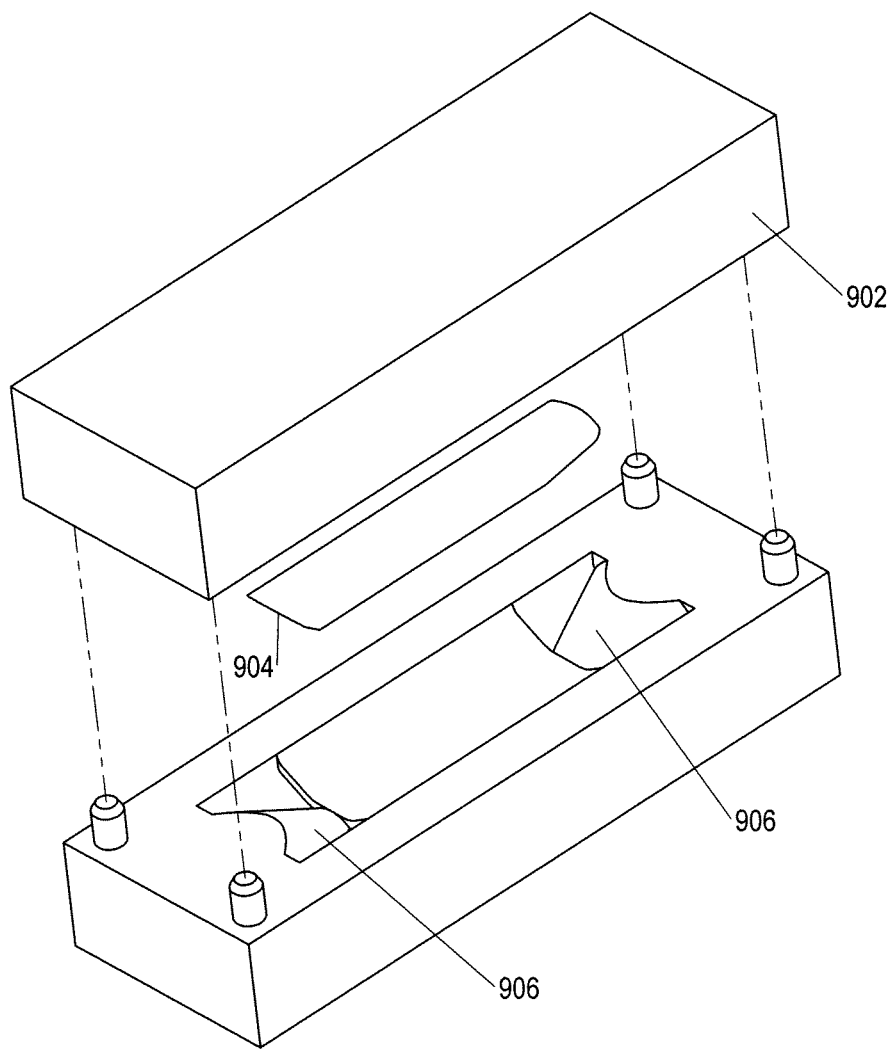
FIG. 9 illustrates an over-molding process to form pole faces in accordance with one embodiment of the invention.

FIG. 9 illustrates an over-molding process to form pole faces in accordance with one embodiment of the invention. Here, mold 902 includes two halves, one of which includes contours 906 for forming pole faces. In operation, a field pole core 904 is composed, for example, of laminations. Field pole core 904 then is deposited into mold 902. After the over-molding process, a field pole member is produced.

FIG. 10 illustrates an integrating process to form pole shoe faces in accordance with an embodiment of the invention. In FIG. 10, a field pole core 1012 has pole shoe members 1014 integrated or fastened thereto to form a field pole member 1010. Note that while field pole cores 1012 can be composed of laminations, as shown, FIG. 10, field pole core 1012 can be composed of any other magnetic flux conductor, including wires. In various embodiments, pole shoe members 1014 can include sculpted pole faces 1016, each of which can be either a contoured pole face or an angled pole face.

Figure 11A:
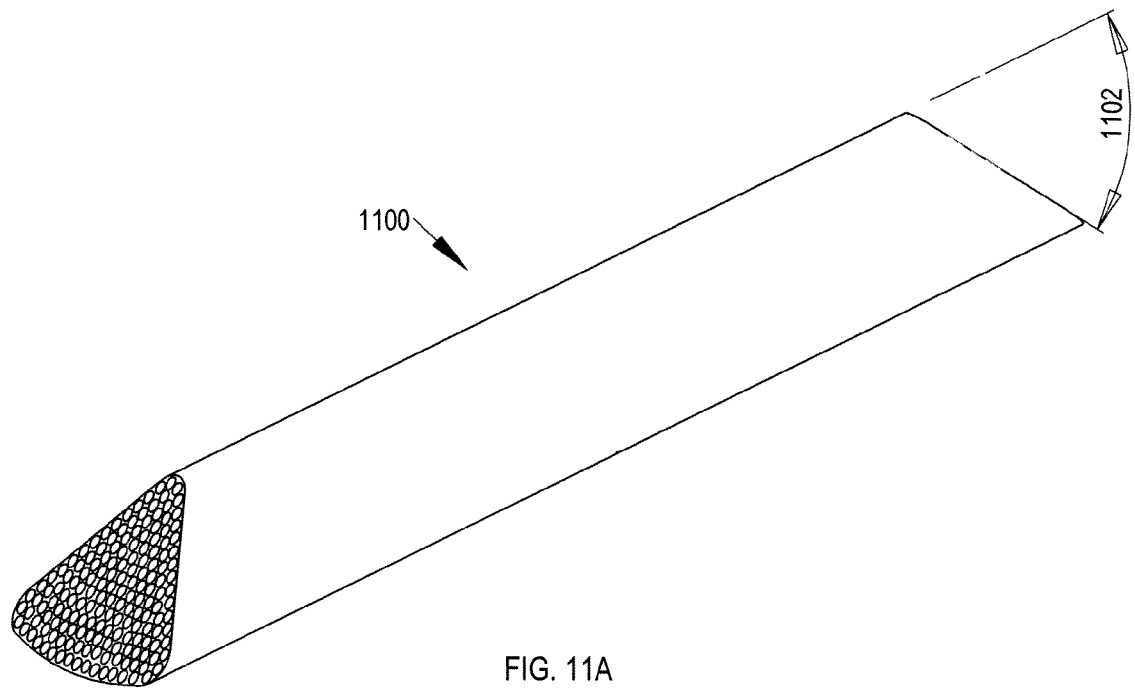
FIGS. 11A to 11C illustrate examples of field pole cores produced by embodiments of the invention.
Figure 11B:
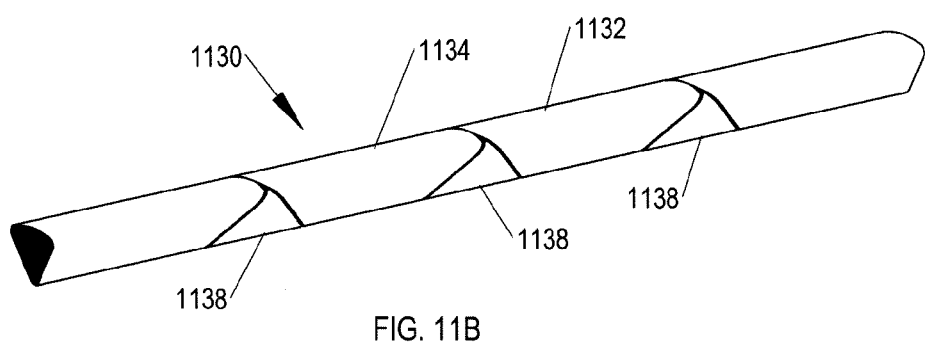
Figure 11C:
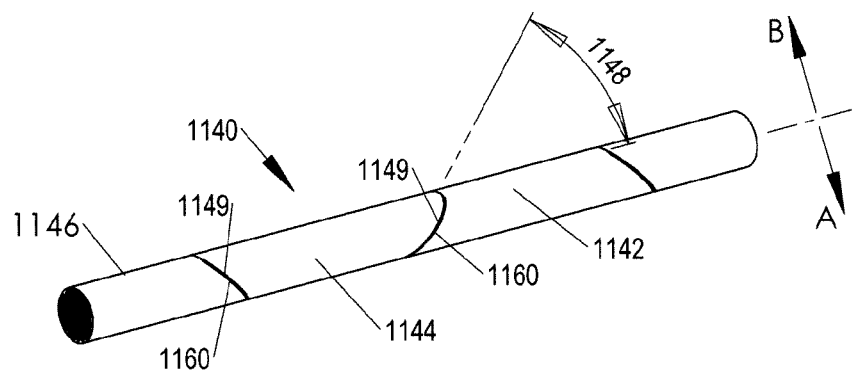

FIGS. 11A to 11C illustrate examples of field pole cores produced by various embodiments of the invention. As shown in FIG. 11A, cutting an elongated bar stock of affixed wires can produce field pole core 1100. The ends of field pole cores are shown to be cut at an angle 1102. Note too that cutting an elongated bar stock at angle 1102 produces at least two field pole cores 1100 having non-symmetrically shaped ends, as shown in FIG. 11B. To produce two consecutive field pole cores 1100 having symmetrically shaped ends, as shown in view 1130 of FIG. 11B, a notch 1138 is cut out to separate field pole cores 1132 and 1134. Notch 1138 represents wastage, and requires two cuts to separate the field pole cores 1132 and 1134 from each other. In one embodiment, the cross-section of the field pole core is such that it produces symmetrically-shaped ends, as shown in FIG. 11C. For example, consider view 1140 of FIG. 11C in which the field pole core has a circular cross-section. By producing symmetrically-shaped ends, a single cut can separate field pole cores 1142 and 1144, for example, rather than the two cuts of non-symmetrically shaped field pole cores that results in notch 1138 of FIG. 11B. As such, a single cut used to form field pole cores, and, thus, can reduce the wastage associated with notch 1138. Two single cuts—as shown in view 1140—can produce a field pole core 1144 having symmetrical cross-sections and ends 1149, both of which generally face direction "A." Those two single cuts also form symmetrically shaped ends 1160 for the other field pole cores 1142 and 1146, with those ends 1160 facing direction "B." Angle 1148 of the cut is generally configured to confront these surfaces of, for example, a conical magnet (not shown) being at a specific angle from an axis of rotation.

Figure 12:
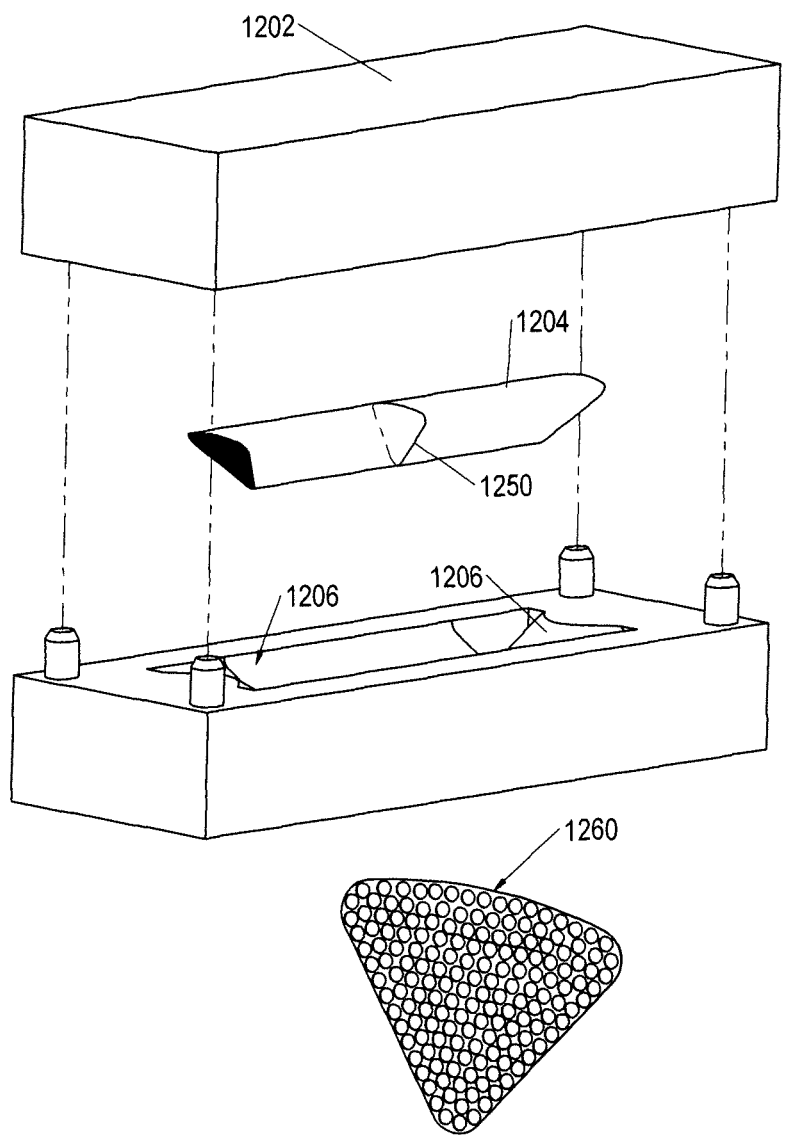
FIG. 12 illustrates an over-molding process to form pole faces in accordance with one embodiment of the invention.

FIG. 12 illustrates an over-molding process to form pole faces in accordance with one embodiment of the invention. Here, mold 1202 includes two halves, one of which includes contours 1206 on surface portions of mold 1202 for forming pole faces. Contours 1206 can be used to form contoured pole faces, such as contoured pole faces 1308 in FIG. 13. Referring back to FIG. 12, a field pole core 1204 can be composed, for example, of wires and can have cross-section 1250, which is shown to include wires in cross-section view 1260. Field pole core 1204 is deposited into mold 1202. After the over-molding process, a field pole member is produced. The parts out of the mold can have additional machining operations, if necessary, without shorting the wires together (provided the machining was accounted for in the design of the mold).

Figure 13:
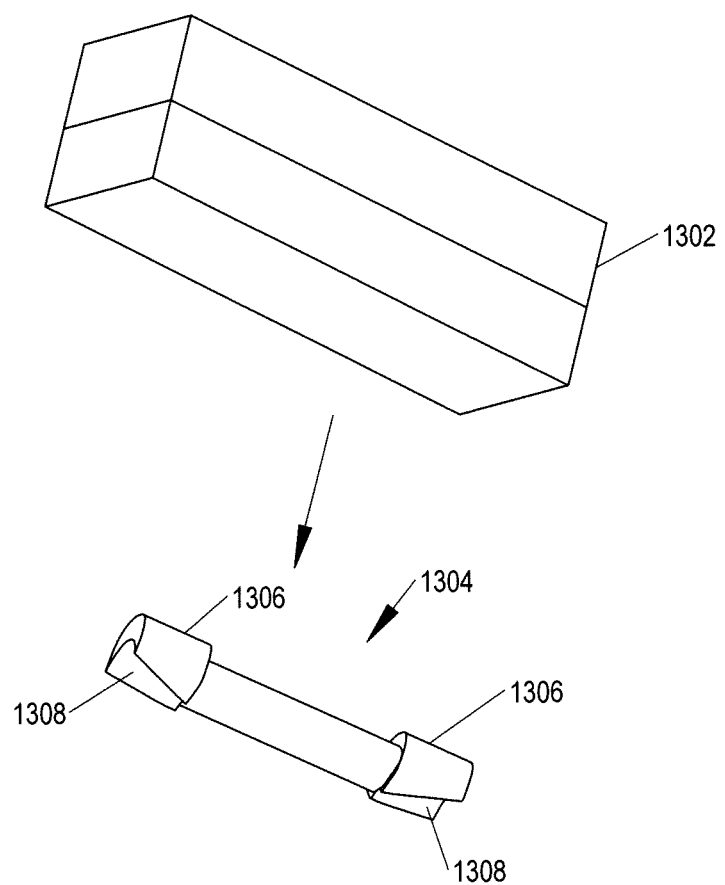
FIG. 13 illustrates a field pole member manufactured in accordance with an embodiment of the invention.

FIG. 13 illustrates a field pole member manufactured in accordance with an embodiment of the invention. In FIG. 13, mold 1302 produces a field pole member 1304, which creates two pole shoe members 1306 as well as pole faces 1308. In yet another embodiment, field pole member 1304 is composed of soft magnetic composite powder and is produced by inserting the powder into mold 1202 of FIG. 12 and then pressed into shape by mold 1302.

FIG. 14 illustrates a field pole member manufactured in accordance with yet another embodiment of the invention. In FIG. 14, laminations 1402 are stamped out of sheets of steel and affixed to each other to form field pole member 1400.

FIG. 15 illustrates a field pole member manufactured in accordance with still yet another embodiment of the invention. In FIG. 15, laminations 1504 are stamped out of sheets of steel and affixed to each other to form field pole member 1500 having sculpted pole faces 1507 having skewed field pole face edges to reduce detent and torque ripple. In particular, field pole member 1500 is constructed from a number of laminations 1504. Laminations 1504 can be patterned to provide sculpted pole faces 1507. Sculpted pole face 1507 is bound by both a first skewed edge 1550 and a second skewed edge 1552, whereas the other pole face 1507 at the other pole shoe is bound by a first skewed edge 1580 and a second skewed edge 1582.

In other embodiments, field pole members can implement wires as magnetic flux conductors to form field pole cores and/or members shown in FIGS. 14 to 16. As such, sculpted pole faces can be formed by, for example, a molding process as shown in FIG. 12. In some embodiments, a sculpted pole face can be referred to as a skewed pole face, especially if the pole face includes features as a function of detent and/or torque ripple.

FIG. 16 illustrates a field pole member manufactured in accordance with another embodiment of the invention. In FIG. 16, laminations 1602 are configured to aggregate together in a concentric orientation, or a substantially concentric orientation, in relation to an axis of rotation. In this example, different laminations 1602 can have different sizes, and can optionally include features, such as a pole shoe feature. To form field pole member 1600, laminations 1062 can be drawn from reels of pre-slit lamination material 1604 and assembled together. With this approach, scrap or waste material can be reduced, at least in some cases. Examples of the above-mentioned features include a stepped-back transition region 1608, which, for example, can reduce leakage between field pole cores/members once assembled. Stepped-back transition region 1608 can be formed in association with other features, such as part of a pole shoe, according to at least one embodiment. Another feature can form sculpted and/or skewed pole faces, such as shaped field pole face 1610.

FIG. 17 is an exploded view of a rotor-stator structure including rotor assemblies in accordance with some embodiments. Various embodiments relate generally to electrodynamic machines and the like, and more particularly, to rotor assemblies and rotor-stator structures for electrodynamic machines, including, but not limited to, outer rotor assemblies and/or inner rotor assemblies. In some embodiments, a rotor for an electrodynamic machine includes a rotor assembly. FIG. 17 depicts a rotor structure including at least two rotor assemblies 1730a and 1730b mounted on or affixed to a shaft 1702 such that each of rotor assemblies 1730a and 1730b are disposed on an axis of rotation that can be defined by, for example, shaft 1702. A stator assembly 1740 can include active field pole members arranged about the axis, such as active field pole members 1710a, 1710b, and 1710c, and can have pole faces, such as pole face 1714, formed at the ends of respective field pole members 1711a, 1711b, 1711c. Active field pole members include a coil 1712. A subset of pole faces 1714 of active field pole members 110a, 1710b, and 1710c can be positioned to confront the arrangement of magnetic regions 1790 in rotor assembly 1730a to establish air gaps. Note that a subset of pole faces 1714 can be disposed internally to a conically-shaped boundary 1703, such as either conically-shaped boundary 1703a or conically-shaped boundary 1703b. For example, the subset of pole faces 1714 can be disposed at, within, or adjacent to at least one of boundaries 1703a or 1703b to form conically-shaped spaces. Either of boundaries 1703a or 1703b can circumscribe or substantially circumscribe a subset of pole faces 1714 and can be substantially coextensive with one or more air gaps. For example, the term "substantially circumscribe" can refer to a boundary portion of conically-shaped space that encloses surface portions of the subset of pole faces 1714. As shown, at least one of boundaries 1703a and 1703b form a conically-shaped space and can be oriented at an angle A from the axis of rotation 1773, which can be coextensive with shaft 1702. As shown, boundary 103a is at an angle A and extends from an apex 1771a on axis of rotation 1773 in a direction toward apex 1771b, which is the apex of a conically-shaped boundary 1703b. As shown, conically-shaped boundaries 1703a and 1703b each include a base 1775 (e.g., perpendicular to shaft 1702) and a lateral surface 1777. Lateral surfaces 1777 can be coextensive with conically-shaped boundary 1703a and 1703b to form conically-shaped spaces. Note that while conically-shaped boundary 103a and conically-shaped boundary 1703b each is depicted as including base 1775, conically-shaped boundary 1703a and conically-shaped boundary 1703b can extend (e.g., conceptually) to relatively larger distances such that bases 1775 need not be present. Thus, conically-shaped boundary 1703a can extend to encapsulate apex 1771b and conically-shaped boundary 1703b can extend to encapsulate apex 1771a. Note, too, that in some embodiments, at least a portion of pole face 1714 can include a surface (e.g., a curved surface) oriented in a direction away from an axis of rotation. The direction can be represented by a ray 1715a as a normal vector extending from a point on a plane that is, for example, tangent to the portion of pole face 1714. Ray 1715a extends from the portion of pole face 1714 in a direction away from the axis of rotation and shaft 1702. Note that ray 1715a can lie in a plane that includes the axis of rotation. Similarly, ray 1715b can extend from the other pole face outwardly, whereby ray 1715b can represent a normal vector oriented with respect to a tangent plane 1792.

Each rotor assembly can include an arrangement of magnetic regions 1790. Magnetic region 1790 (or a portion thereof) can constitute a magnet pole for rotor assembly 1730a or rotor assembly 1730b, according to some embodiments. In one or more embodiments, at least one magnetic region 1790 has a surface (or a portion thereof) that is coextensive (or is substantially coextensive) to one or more angles with respect to the axis of rotation or shaft 1702. In the example shown, one or more magnetic regions 1790 of rotor assembly 1730a can be disposed externally to a portion of a conically-shaped space (e.g., a conically-shaped space associated with either conically-shaped boundary 1703a or conically-shaped boundary 1703b) that is centered on the axis of rotation. In some embodiments, the arrangement of magnetic regions 1790 can be mounted on, affixed to, or otherwise constrained by a support structure, such as either support structure 1738a or support structure 1738b. Support structures 1738a and 1738b are configured to support magnetic regions 1790 in compression against a radial force generated by the rotation of rotor assemblies 1730a and 1730b around the axis of rotation. In at least some cases, support structures 1738a and 1738b also can provide paths for flux. For example, support structures 1738a and 1738b can include magnetically permeable material to complete flux paths between poles (e.g., magnetic regions and/or magnets) of rotor assemblies 1730a and 1730b. Note that support structures 1378a or 1738b need not be limited to the example shown and can be of any varied structure having any varied shapes and/or varied functionality that can function to at least support magnetic regions 1790 in compression during rotation. Magnetic regions 1790 can be formed from magnetic material (e.g., permanent magnets) or magnetically permeable material, or a combination thereof, but is not limited those structures. In some embodiments, magnetic regions 1790 of FIG. 17 can be representative of surface magnets used to form the poles (e.g., the magnet poles) of rotor assemblies 1730a and 1730b, whereby one or more surface magnets can be foamed, for example, using magnetic material and/or one or more magnets (e.g., permanent magnets), or other equivalent materials. In some embodiments, the term "magnetic material" can be used to refer to a structure and/or a composition that produces a magnetic field (e.g., a magnet, such as a permanent magnet). In various embodiments, magnetic regions 1790 of FIG. 17 can be representative of one or more internal permanent magnets ("IPMs") (or portions thereof) that are used to form the poles of rotor assemblies 1730a and 1730b, whereby one or more internal permanent magnets can be formed, for example, using magnetic material (e.g., using one or more magnets, such as permanent magnets) and magnetically permeable material, or other equivalent materials. According to at least some embodiments, the term "internal permanent magnet" ("IPM") can refer to a structure (or any surface or surface portion thereof) that produces a magnetic field, an IPM (or portion thereof) including a magnetic material and a magnetically permeable material through which flux passes (e.g., at least a portion of the flux being produced by the magnetic material). In various embodiments, magnetic material of a magnetic region 1790 can be covered by magnetically permeable material, such that the magnetically permeable material is disposed between the surfaces (or portions thereof) of magnetic region 1790 and respective air gaps and/or pole faces. In at least some cases, the term "internal permanent magnet" ("IPM") can be used interchangeably with the term "interior permanent magnet." While the rotor-stator structure of FIG. 17 is shown to include three field pole members and four magnetic regions, a rotor-stator structure according to various embodiments need not be so limited and can include any number of field pole members and any number of magnetic regions. For example, a rotor-stator structure can include six field pole members and eight magnetic regions.

As used herein, the term "rotor assembly" can refer to, at least in some embodiments, to either an outer rotor assembly or an inner rotor assembly, or a combination thereof. A rotor assembly can include a surface portion that is coextensive with a cone or a boundary of a conically-shaped space, and can include magnetic material and, optionally, magnetically permeable material as well as other materials, which can also be optional. Therefore, a surface portion of a rotor assembly can be either coextensive with an interior surface or an exterior surface of a cone. An outer rotor assembly includes magnetic regions 1790 disposed "outside" the boundaries of the pole faces relative to the axis of rotation. Rotor assemblies 1730a and 1730b are "outer rotor assemblies" as magnetic regions 1790 are disposed or arranged externally to or outside a boundary 1703 of a conically-shaped space, whereas pole faces 1714 are located within boundary 1703 of the conically-shaped space (i.e., portions of magnetic regions 1790 are coextensive with an exterior surface of a cone, whereas portions of pole faces 1714 are coextensive with an interior surface of a cone). As such, a point on the surface of magnetic region 1790 is at a greater radial distance from the axis of rotation than a point on pole face 1714, where both points lie in a plane perpendicular to the axis of rotation. An outer rotor assembly can refer to and/or include an outer rotor magnet, according to at least some embodiments. Further, note that the term "rotor assembly" can be used interchangeably with the term "rotor magnet," according to some embodiments.

Figure 32:
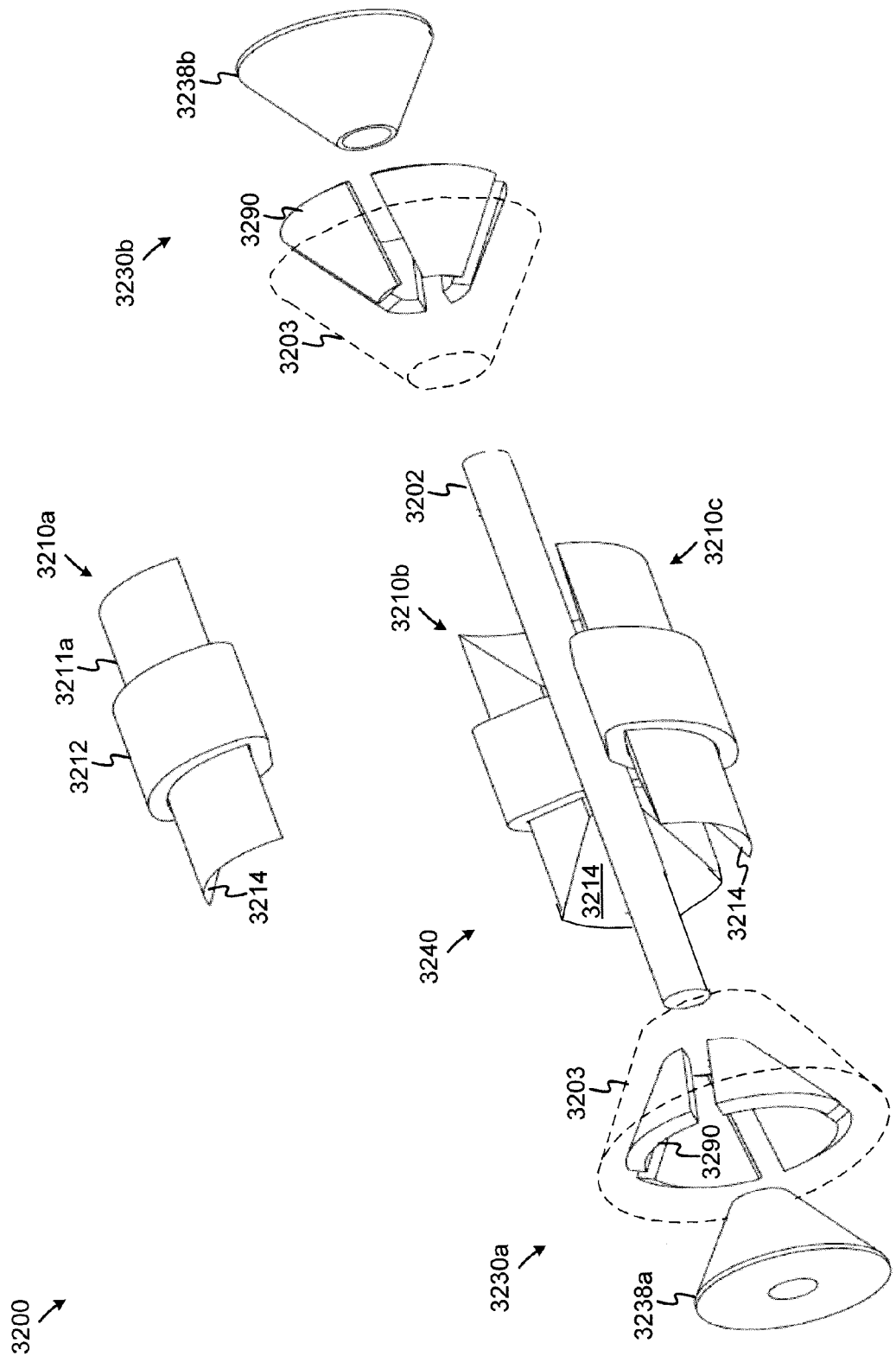
FIG. 32 is an exploded view of a rotor-stator structure including inner rotor assemblies in accordance with some embodiments.

The term "inner rotor assembly" can refer to, at least in some embodiments, portions of rotor structures in which magnetic regions are disposed internally to or "inside" a boundary of a conically-shaped space, whereas the pole faces are located externally to or outside the boundary of conically-shaped space. As such, a point on the surface of the magnetic region is at a smaller radial distance from the axis of rotation than a point on a pole face, where both points lie in a plane perpendicular to the axis of rotation. An inner rotor assembly can refer to and/or include an inner rotor magnet, according to at least some embodiments. To illustrate, FIG. 32 depicts boundaries 3203 of conically-shaped spaces in which magnetic regions 3290 are disposed. Pole faces 3214 are disposed or arranged outside boundaries 3203 of conically-shaped spaces. Thus, magnetic regions 3290 are coextensive with an interior surface of a cone, whereas pole faces 3214 are coextensive with an exterior surface of a cone). In some embodiments, the term "inner rotor assembly" can refer to either an "inner rotor magnet" or a "conical magnet" or a "conical magnet structure." An example of the structure of a conical magnet can include an assembly of magnet components including, but not limited to, magnetic regions and/or magnetic material and a support structure. In some instances, the support structure for an inner rotor assembly or conical magnet can be referred to as a "hub," or, in some cases, a "core." In at least some embodiments, the term "inner rotor assembly" can be used interchangeably with the terms "conical magnet" and "conical magnet structure." In at least one embodiment, the term "inner rotor assembly" can refer, but are not limited to, at least some of the magnets described in U.S. Pat. No. 7,061,152 and/or U.S. Pat. No. 7,294,948 B2. According to a specific embodiment, a rotor assembly can also refer to an outer rotor assembly combined with an inner rotor assembly.

In view of the foregoing, the structures and/or functionalities of an outer rotor assembly-based motor can, among other things, enhance torque generation and reduce the consumption of manufacturing resources. Mass in an outer rotor assembly is at a greater radial distance than an inner rotor assembly, thereby providing increased inertia and torque for certain applications. Again, support structures 1738 can be also configured to support magnetic region and associated structures in compression against radial forces during rotation, thereby enabling optimal tolerances for the dimensions of the air gap formed between pole faces and magnetic regions. In particular, rotational forces tend to urge the surfaces of magnetic regions 1790 away from the surfaces of the pole face surfaces, thereby facilitating air gap thicknesses that otherwise may not be available. As such, outer rotor assemblies can be used in relatively high speed applications (i.e., applications in which high rotational rates are used), such as in electric vehicles. In some embodiments, a rotor assembly, as described herein, has magnetic material (e.g., magnets, such as permanent magnet structures) having surfaces that are polarized in a direction such that flux interacts via at least one side of a magnetically permeable material. For example the direction of polarization of the magnetic material can be orthogonal or substantially orthogonal to a line or a line portion extending axially between two pole faces of a field pole member. The line or the line portion extending axially between the two pole faces of the field pole member can be oriented parallel to an axis of rotation. As such, the surface area of the magnetic region can be configured to be less than the combined surfaces areas of the magnetic material. For example, the combined surface areas of the magnetic material surfaces adjacent to the magnetically permeable material can be greater than the surface area of the magnetically permeable material that confronts the pole faces. Therefore, the amount of flux passing between the surface of the magnetically permeable material and a pole face can be modified (e.g., enhanced) as a function, for example, of the size of the surfaces area(s) of the magnetic material and/or the surface area(s) of the sides of magnetically permeable material. Also, the type of magnetic material (e.g., ceramic, rare earth, such as neodymium and samarium cobalt, etc.) can be selected to modify the amount of flux passing through a magnetic region. Accordingly, the angle of the conically-shaped space can be modified (e.g., to a steeper angle, from 45 degrees to 60 degrees relative to the axis of rotation) to form a modified angle. The modified angle relative to an axis of rotation can serve to define the orientation of either an angled surface (e.g., a conical surface) of magnetic region or a pole face, or both. With the modified angle, the rotor-stator structure can be shortened, which, in turn, conserves manufacturing materials (i.e., increasing the angle to a steeper angle, the field pole members of a stator assembly can be shortened). The angle of the conically-shaped space can be modified also to enable the use of less powerful magnets (e.g., ceramic-based magnets, such as ceramic ferrite magnets). For example, decreasing the angle from a relatively steep angle (e.g., 65 degrees) to a more shallow angle (e.g., 40 degrees), less powerful magnets can be used as the surface area of the magnets or magnetic regions can be increased to provide a desired flux concentration. Therefore, neodymium-based magnets can be replaced with ceramic-based magnets. In sum, the modified angle can be a function of one or more of the following: (i.) the type of magnet material, (ii.) the surface area of the magnet material, (iii.) the surface area of magnetically permeable material, (iv.) the surface area of the magnetic region, and (v.) the surface area of a pole face. In some embodiments, the modified angle can be a non-orthogonal angle. Examples of non-orthogonal angles include those between 0 degrees and 90 degrees (e.g., excluding both 0 degrees and 90 degrees), as well as non-orthogonal angles between 90 degrees and 180 degrees (e.g., excluding both 90 degrees and 180 degrees). Any of these aforementioned non-orthogonal angles can describe the orientation of pole face and magnetic regions for either outer rotor assemblies or inner rotor assemblies, or both.

Note that in some embodiments, boost magnets can be implemented to enhance the amount of flux passing between a magnetic region and a pole face, whereby the enhancement to the amount of flux by one or more boost magnets can influence the angle and/or surface areas of the magnetic region or the pole face. Boost magnets can include magnetic material disposed on non-confronting surfaces of magnetic permeable material that are oriented off of a principal flux path. Boost magnets can include axial and radial boost magnets, examples of which are shown in FIG. 34C and subsequent figures. Therefore, the modified angle can also be a function of the characteristics of boost magnets. For example, the type of magnet material constituting the boost magnets, the surface area of the boost magnets, and the surface area of magnetically permeable material adjacent to the boost magnets can influence or modify the amount of flux passing through a magnetic region.

In various embodiments, the angle of the conically-shaped space can be modified to determine an angle that provides for an optimal surface area of a pole face through which flux passes, the flux being at least a function of the magnetic material (e.g., ceramic versus neodymium). In one approach, the modified angle can be determined by the following. First, an amount of flux in a coil region of an active field pole member can be determined, the amount of flux producing a desired value of torque. A magnet material to produce a flux density at an air gap formed between a surface of the magnet material and a pole face of the active field pole member can be selected. Then, the surface area of the pole face can be calculated based on the flux in the coil region and the flux density of the magnet material, the surface area providing for the flux density. Then, the pole face (and the angle of the conically-shaped space) can be oriented at a non-orthogonal angle to the axis of rotation to establish the surface area for the pole face. In some embodiments, the magnets of a rotor assembly can include an axial extension area that can be configured to increase an amount of flux passing through the surface of the magnetically permeable structure by, for example, modifying the area dimension laying in planes common to the axis of rotation.

A stator assembly, according to some embodiments, can use field pole members that can use less material to manufacture than field pole members configured for other motors. Further, a field pole member for an outer rotor assembly-based rotor-stator structure can have wider and shorter laminations at distances farther from the axis of rotation than other laminations located at distances closer to the axis of rotation. In turn, flux passing through the field pole member is more uniformly distributed and is less likely to have high flux densities at certain portions of the field pole member. In some embodiments, the structure of field pole member can be shorter than in other motors, as there can be greater amounts of available surface area of magnetically permeable material in the rotor of the rotor-stator structure. The available surface area of magnetically permeable material presents opportunities to enhance the flux concentration by way of the use of magnetic material located adjacent to the available surface area. In turn, the enhanced flux concentration facilitates the use of pole faces that are coincident with a steeper angle relative to an axis of rotation. Steeper-angled pole faces can provide for shorter field pole member lengths and, thus, shorter motor lengths relative to pole faces coincident with less steep angles. According to some embodiments, a field pole member can be configured as an outwardly-facing field pole member having a pole face oriented in a direction away from an axis of rotation. Such a pole face can have a convex-like surface, but need not be so limited (e.g., a pole face can be relatively flat in rotor-stator structures implementing one or more outer rotors). This structure provides for flux paths through the field pole member that, on average, are shorter than found in other stator assemblies of comparable length along an axis of rotation. Consider that the surface area of an outwardly-facing pole face can be composed (conceptually) of a number of unit areas of comparable size, whereby a total flux passing through a pole face passes into a greater quantity of unit areas associated with relatively shorter flux path lengths than in other stator assemblies. With flux passing over relatively shorter flux paths, the flux passes through less material than otherwise might be the case. Therefore, losses, such as eddy current losses, are less than other stator assemblies that might have flux paths that, on average, are longer than those associated with the outwardly-facing field pole member (having a similar axial length). Further, an outwardly-facing field pole member can have less surface area (e.g., between the coils and pole faces) adjacent a perimeter of a stator assembly than other stator assemblies. Therefore, an outwardly-facing field pole member can have fewer magnetic linkage paths that extend through a motor case, thereby reducing losses and eddy currents that otherwise might be generated in the motor case.

Figure 18A:
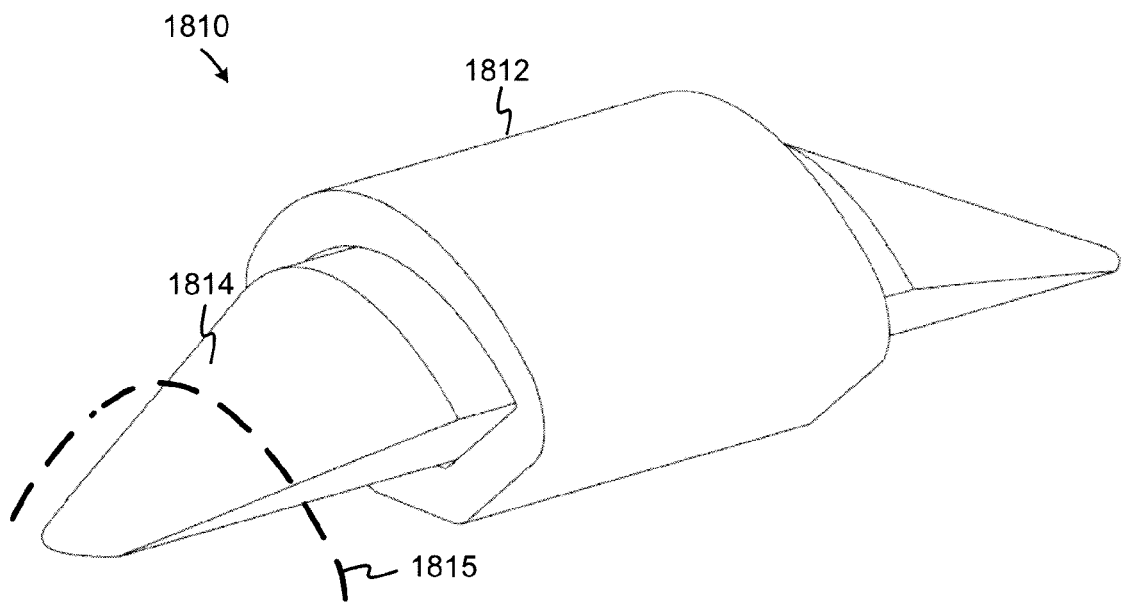
FIGS. 18A and 18B depict a pole face and a magnetic region each configured to form an air gap with the other, according to some embodiments.
Figure 18B:
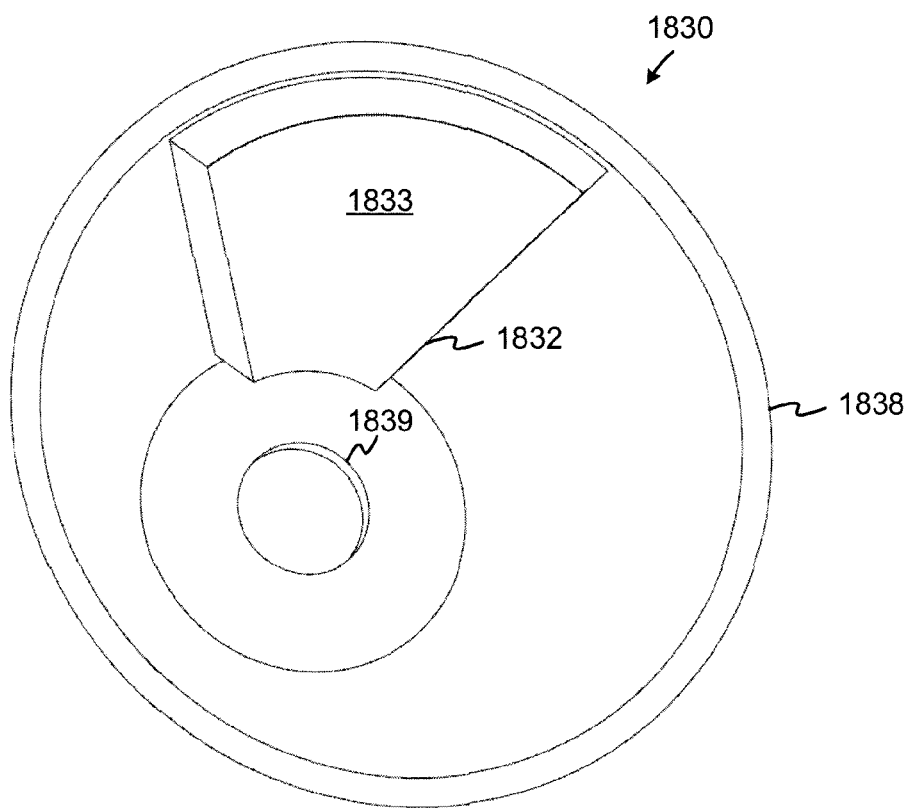

FIGS. 18A and 18B depict a pole face and a magnetic region, respectively, each being configured to form an air gap with the other, according to some embodiments. FIG. 18A depicts a pole face 1814 being formed as one of two pole faces for an active field pole member 1810, which also includes a coil 1812. Pole face 1814 can have a surface (or a portion thereof) that is curved or rounded outward from the interior of active field pole member 1810. In some examples, at least a portion of pole face 1814 has a curved surface that is coextensive with one or more arcs 1815 radially disposed (e.g., at one or more radial distances) from the axis of rotation, and/or is coextensive with either an interior surface (or an exterior surface) of a cone. Although the field pole member of active field pole member 1810 can be composed of a contiguous piece of magnetically permeable material (e.g., a piece formed by a metal injection molding process, forging, casting or any other method of manufacture), the field pole members described herein can also be composed of multiple pieces, such as laminations, wires, or any other flux conductors. Therefore, active field pole member 1810 can be formed as a stacked field pole member composed of a number of laminations integrated together.

FIG. 18B depicts a magnetic region 1832 including a magnet surface 1833 being formed as one of a number of magnetic regions (not shown) that constitute a rotor assembly 1830. As shown, rotor assembly 1830 includes a support structure 1838 for supporting magnetic region 1832, among other things, to position magnetic region 1832 at a distance from pole face 1814 of FIG. 18A to establish an air gap. Support structure 1838 can be also configured to support magnetic region 1832 in compression against radial forces during rotation, thereby enabling optimal tolerances for the dimensions of the air gap formed between pole face 1814 and magnetic region 1832. Support structure 1838 includes an opening 1839 at which rotor assembly 1830 can be mounted to a shaft. In some embodiments, support structure 1838 can provide a flux path (e.g., a return path) to magnetically couple magnetic region 1832 to another magnetic region not shown. At least a portion of surface 1833 can be coextensive (or substantially coextensive) to an angle with respect to the axis of rotation (or shaft 1702 of FIG. 17) passing through opening 1839. While surface 1833 of magnetic region 1832 is depicted as a single, curved surface, this depiction is not intended to be limiting. In some embodiments, surface 1833 of magnetic region 1832 can include surfaces of multiple magnets (not shown) that are configured to approximate a curved surface that is substantially coextensive with one or more angles with the axis of rotation, the curved surface being configured to confront a pole face. The multiple magnets can include relatively flat surface magnets, or can include magnets having any type of surface shape.

Figure 19A:
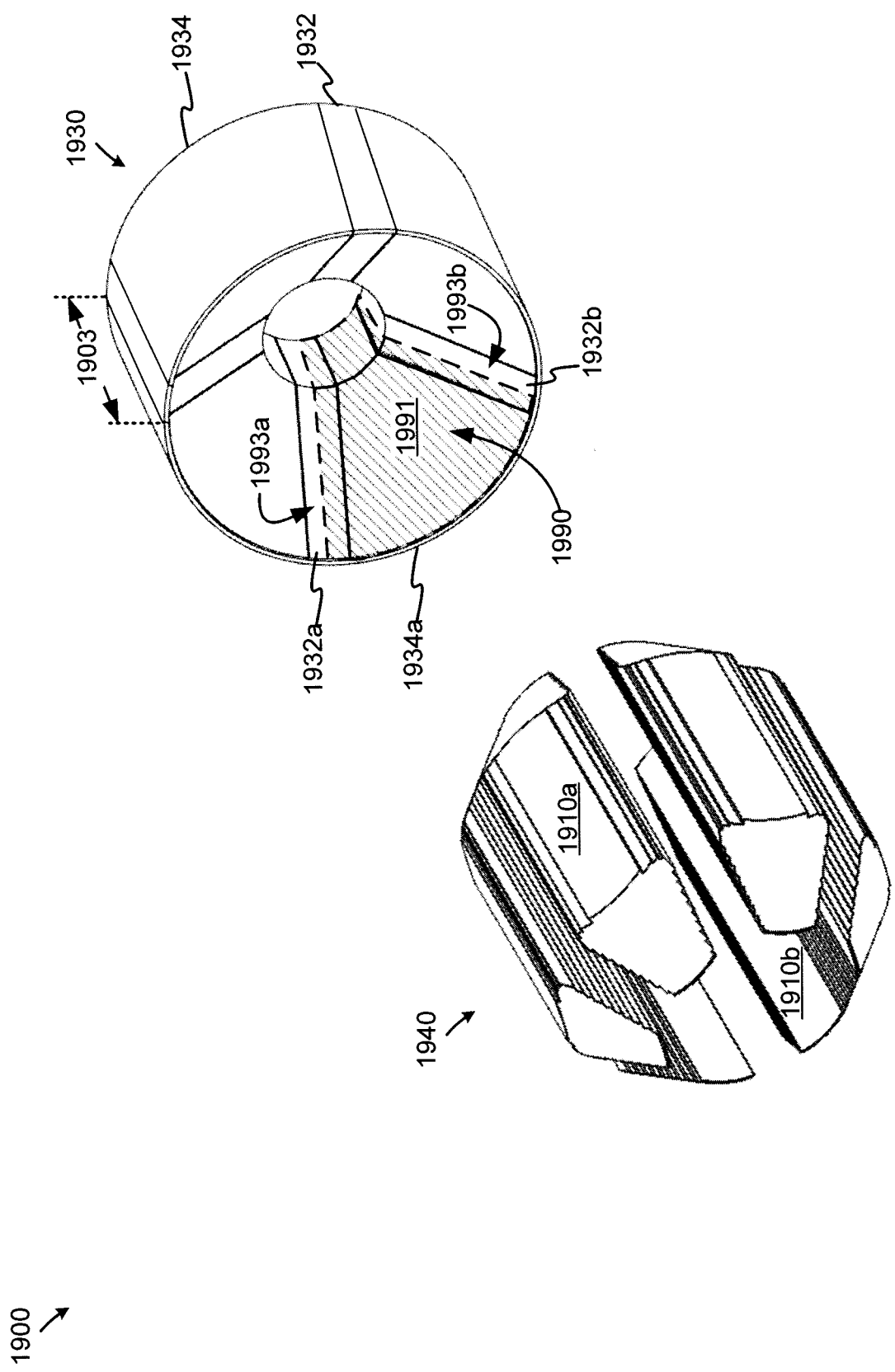
FIGS. 19A and 19B depict examples of outer rotor assemblies, according to some embodiments.
Figure 19B:
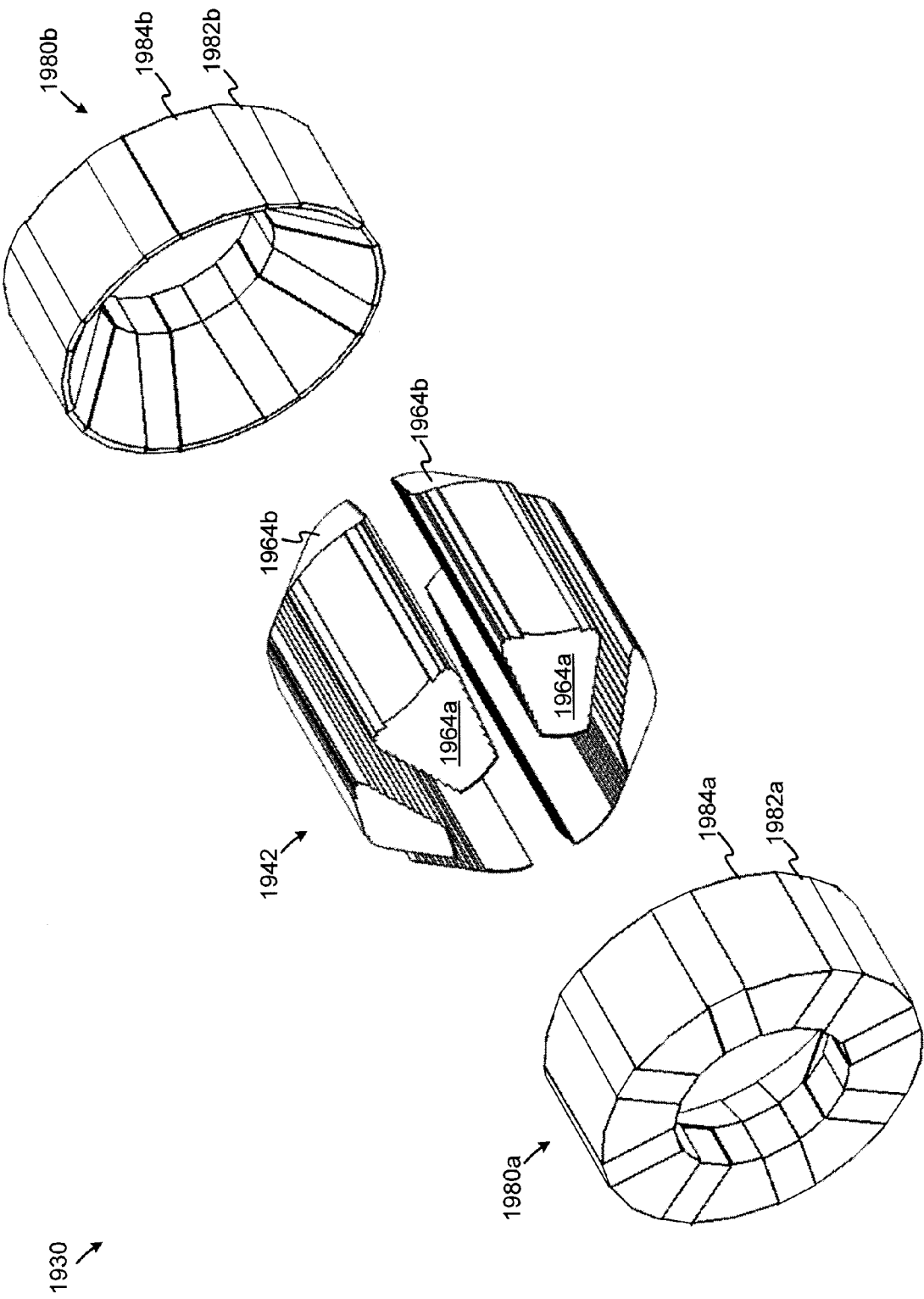

FIGS. 19A and 19B depict examples of outer rotor assemblies, according to some embodiments. FIG. 19A is a diagram 1900 depicting a stator assembly 1940 that includes a number of field pole members, such as field pole members 1910a and 1910b, and outer rotor assembly 1930. In the example shown, outer rotor assembly 1930 includes an arrangement of internal permanent magnet ("IPM") structures. In this example, the radial edges of magnetic region 1990 are shown to be approximately half (i.e., ½) the width (e.g., peripheral width) of surfaces 1993a and 1993b of respective structures of magnetic material 1932a and 1932b that confront the stator assembly. Thus, the surface of magnetic region 1990 can include a surface of a magnetically permeable structure and surface portions of magnetic material 1932a and 1932b. For example, outer rotor assembly 1930 can include structures (e.g., magnets) including magnetic material 1932, and magnetically permeable structures 1934. Thus, outer rotor assembly 1930 includes an arrangement of magnetic regions 1990 configured to confront a subset of pole faces of stator assembly 1940, whereby at least one magnetic region 1990 includes a magnet 1932a (or a portion thereof), a magnetically permeable structure 1934a, and a magnet 1932b (or a portion thereof). Note that a magnetic region is not limited to the example shown nor is limited to structures herein. For example, a magnetic region can include one magnet and one magnetically permeable structure. In other embodiments, a magnetic region can include any number of magnets and any number of magnetically permeable structures. Further, the term "magnetic region" can refer to the combination of magnets and magnetically permeable structures (e.g., used to form a magnet pole), or the combination of structures including magnetic material and magnetically permeable material. In some cases, a magnetic region can refer to those surfaces constituting a pole, or can refer to those surfaces or structures used to generate a pole, or both. A magnetic region can also be referred to as the surface of a magnetically permeable structure, and may or may not include surfaces 1993a and 1993b of magnetic material 1932a and 1932b or respective magnets. Thus, the surface of a magnetic region can be coextensive with the surface of 1934a confronting stator assembly 1940. In at least one embodiment, magnetic material 1932 has an axial length dimension 1903 that is configurable to modify an amount of flux density passing through a surface of a magnetically permeable structure, such as through surface 1991 of magnetically permeable structure 1934a. In some embodiments, structures of magnetic material 1932a and 1932b are polarized to produce magnet flux circumferentially within outer rotor assembly 1930 about an axis of rotation (not shown).

FIG. 19B is a diagram 1930 depicting a rotor-stator structure including an outer rotor assembly 1980a, a group 1942 of field pole members, and an outer rotor assembly 1980b. Outer rotor assembly 1980a includes magnetic material 1982a and magnetically permeable structures 1984a, whereas outer rotor assembly 1980b includes magnetic material 1982b and magnetically permeable structures 1984b. A first subset of pole faces 1964a are configured to confront surfaces of magnetic material 382a and magnetic permeable structures 1984a, and a second subset of pole faces 1964b are configured to confront surfaces of magnetic material 1982b and magnetic permeable structures 1984b.

FIGS. 19C to 19D depict an example of a field pole member configured to interoperate with outer rotor assemblies, according to some embodiments. As shown, FIGS. 19C and 19D depict field pole member 1952 being an outwardly-facing field pole member with a pole face being oriented in a direction away from an axis of rotation 1945. A pole face 1950a is shown to include—at least conceptually—a number of unit areas each associated with a length (e.g., a length of a flux path or portion thereof) between pole faces 1950a and 1950b of FIG. 19D. Note that the units of area in FIG. 19C are not drawn to scale and each is equivalent to the other unit areas. Pole face 1950a includes a unit area 1902 and a unit area 1904. In FIG. 19D, unit area 1902 is associated with a length 1909 between unit area 1902 of pole face 1950a and unit area 1905 of pole face 1950b. Similarly, unit area 1904 is associated with a length 1908 between unit area 1904 of pole face 1950a and unit area 1907 of pole face 1950b. Length 1908 is relatively shorter than length 1909. As such, flux passing over length 1908 has a relatively shorter flux path than if the flux passed over length 1909. Each unit area of pole face 1950a is associated with a length extending to another unit area of pole face 1950b.

Field pole member 1952 can be characterized by a mean or average length per unit area, which can be determined by adding the lengths associated with each of the unit areas and dividing the sum by the number of unit areas in pole face 1950*a*. The average length per unit area is indicative of the amount of material, such as magnetically permeable material, contained within field pole member 1952. Flux, such as a unit of flux (e.g., unit of total flux), extending along a certain average length per unit experiences less losses, such as eddy current or hysteresis losses, than a longer average length per unit area. When pole face 1950*a* confronts a magnetic region that produces a flux density over the surface area of pole face 1950*a*, a total flux passes via an air gap (not shown) through field pole member 1952. Another characteristic of field pole member 1952 is that if pole face 1950*a* is divided axially into two equal halves (i.e., an upper half 1912 and a lower half 1911) along the axis, then upper half 1912 is associated with more units of area associated with relatively shorter lengths. Since field pole member 1952 has wider dimensions in upper half 1912 than lower half 1911, upper half 1912 can provide for more units of area. In particular, lower half 1911 is associated with fewer units of area than upper half 1912 as field pole member 1952 has narrower dimensions in lower half 1911. As there are more units of area in upper half 1912, more flux passes through the associated lengths, including length 1908, than passes through lower half 1911. As such, more flux passes through shorter lengths than the longer lengths associated with lower half 1911.

In view of the foregoing, field pole member 1952 provides for flux paths that, on average, are shorter than found in other stator assemblies of comparable length along an axis of rotation. Therefore, a total flux passing through a pole face passes into a greater quantity of unit areas associated with relatively shorter flux path lengths than with other stator assemblies. Note that field pole members depicted in FIG. 19D (and elsewhere herein), such as field pole member 1952, are not intended to be limited to field pole members that provide straight flux paths. Rather, field pole member 1952 can include structural attributes to provide a substantially straight flux path (e.g., consecutive segments of flux path portions that do not deviate more than 60 degrees).

FIGS. 19E to 19F depict an example of a field pole member configured to interoperate with inner rotor assemblies, according to some embodiments. As shown, FIGS. 19E and 19F depict field pole member 1956 being an inwardly-facing field pole member with a pole face being oriented in a direction toward an axis of rotation 1945. A pole face 1954*a* is shown to include a number of unit areas each associated a length between pole faces 1954*a* and 1954*b* of FIG. 19F. Note that the units of area in FIG. 19E are not drawn to scale and each is equivalent to the other unit areas. Pole face 1954*a* includes a unit area 1924 and a unit area 1926. In FIG. 19F, unit area 1924 is associated with a length 1919 between unit area 1924 of pole face 1954*a* and unit area 1925 of pole face 1954*b*. Similarly, unit area 1926 is associated with a length 1918 between unit area 1926 of pole face 1954*a* and unit area 1927 of pole face 1954*b*. Length 1918 is relatively shorter than length 1919. As such, flux passing over length 1918 has a relatively shorter flux path than if the flux passed over length 1919. Each unit area of pole face 1954*a* is associated with a length extending to another unit area of pole face 1954*b*.

As with field pole member 1952 of FIGS. 19C and 19D, field pole member 1956 can be characterized by a mean or average length per unit area, which can be determined by adding the lengths associated with each of the unit areas and dividing the sum by the number of unit areas in pole face 1954*a*. The average length per unit area is indicative of the amount of material within field pole member 1956. Again, flux extending along a certain average length per unit experiences less losses than a longer average length per unit area. When pole face 1954*a* confronts a magnetic region (e.g., of a conical magnet, a conical inner rotor assembly, or the like) that produces a flux density over the surface area of pole face 1954*a*, a total flux passes via an air gap (not shown) through field pole member 1956. Another characteristic of field pole member 1956 is that if pole face 1954*a* is divided axially into two equal halves (i.e., an upper half 1921 and a lower half 1922) along the axis, then upper half 1921 is associated with more units of area as field pole member 1956 (e.g., field pole member 1956 has wider dimensions in upper half 1921 that include more units of area). Lower half 1922 is associated with fewer units of area as field pole member 1956 is narrower in lower half 1922. As there are more units of area in upper half 1921, more flux passes through the associated lengths, including length 1919, than passes through lower half 1922. As such, more flux passes through longer lengths than the shorter lengths associated with lower half 1922. In some cases, when the axial length, L, of field pole member 1956 of FIG. 19F is equivalent to the axial length, L, of field pole member 1952 of FIG. 19D, field pole member 1952 has a shorter average length per unit area than field pole member 1956 of FIG. 19F. As such, field pole member 1952 may include a lesser amount of material than field pole member 1956, and may, at least in some cases, experience less losses.

Figure 19G:
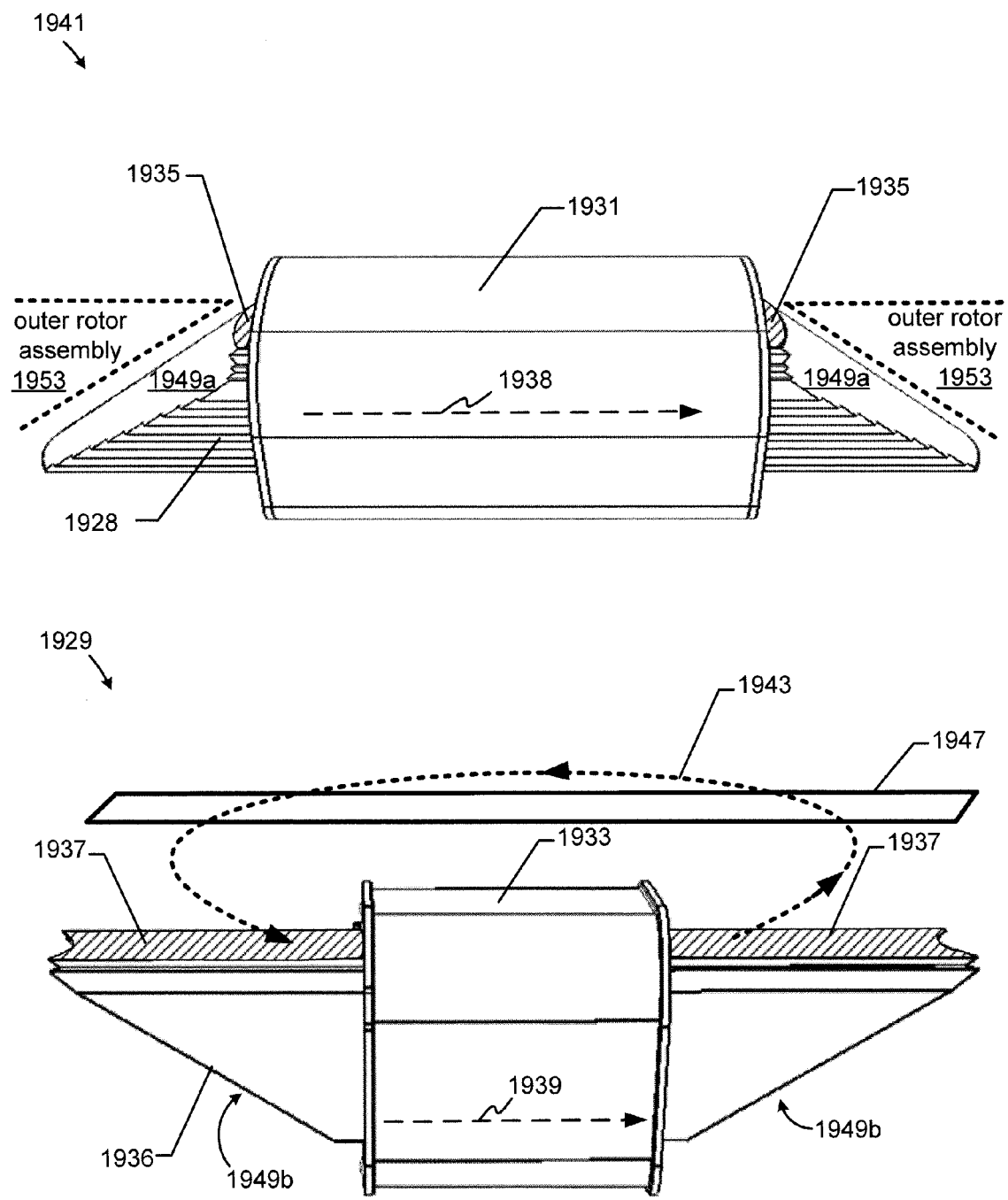
FIG. 19G depicts field pole members for outer rotor assemblies and inner rotor assemblies, according to some embodiments.

FIG. 19G depicts field pole members for outer rotor assemblies and inner rotor assemblies, according to some embodiments. Active field pole member 1941 includes a coil 1931 disposed on a field pole member 1928, whereas active field pole member 1929 includes a coil 1933 disposed about field pole member 1936. Active field pole members 1941 and 1929 can have equivalent lengths. Active field pole member 1941 includes areas 1935 between coil 1931 and the pole faces. Similarly, active field pole member 1929 includes areas 1937 between coil 1933 and the pole faces. Areas 1935 and areas 1937 are located at or adjacent to the perimeter of stator assemblies that include active field pole member 1941 and active field pole member 1929, respectively. An example of such a perimeter is perimeter 2251 for stator assembly 2240 in FIG. 22B. Consequently, areas 1935 and areas 1937 of FIG. 19G, in some examples, are located at or adjacent to motor cases that can be made of either of magnetically permeable material or electrically-conductive material, or a combination thereof. When coil 1931 is energized, magnetic flux passes through field pole member 1928 on flux path 1938, whereas when coil 1933 is energized, magnetic flux passes through field pole member 336 on flux path 1939. As the areas 1935 are lesser in size than areas 1937, areas 1935 of active field pole member 1941 can have a reduced possibility to generate magnetic linkage paths 1943 (e.g., from one area 1937 to another area 1937) that otherwise might pass through a surface 1947 of a motor case and generate losses due to such magnetic linkage paths 1943. Therefore, if the motor case is composed of magnetically permeable material, areas 1935 of active field pole member 1928 provide for reduced hysteresis losses relative to the hysteresis losses produced by magnetic linkage paths 1943 passing through surface 1947 of the motor case. Or, if the motor case is composed of electrically-conductive material, areas 1935 of active field pole member 1928 provide for reduced eddy current losses relative to the eddy current losses produced by magnetic linkage paths 1943 passing through surface 1947 of the motor case. In some embodiments, the motor case can be composed of neither magnetically permeable material nor electrically-conductive material. Note that outer rotor assemblies 1953, which are depicted in dashed lines, intercept magnetic flux emanating from pole faces 1949a and prevent such flux from reaching a motor case (not shown). Note further that pole faces 1949a of field pole member 1928 and pole faces 1949b of field pole member 1936 can have surfaces that are oriented at an equivalent acute angle (e.g., 40 degrees) with respect to an axis of rotation.

Figure 19H:
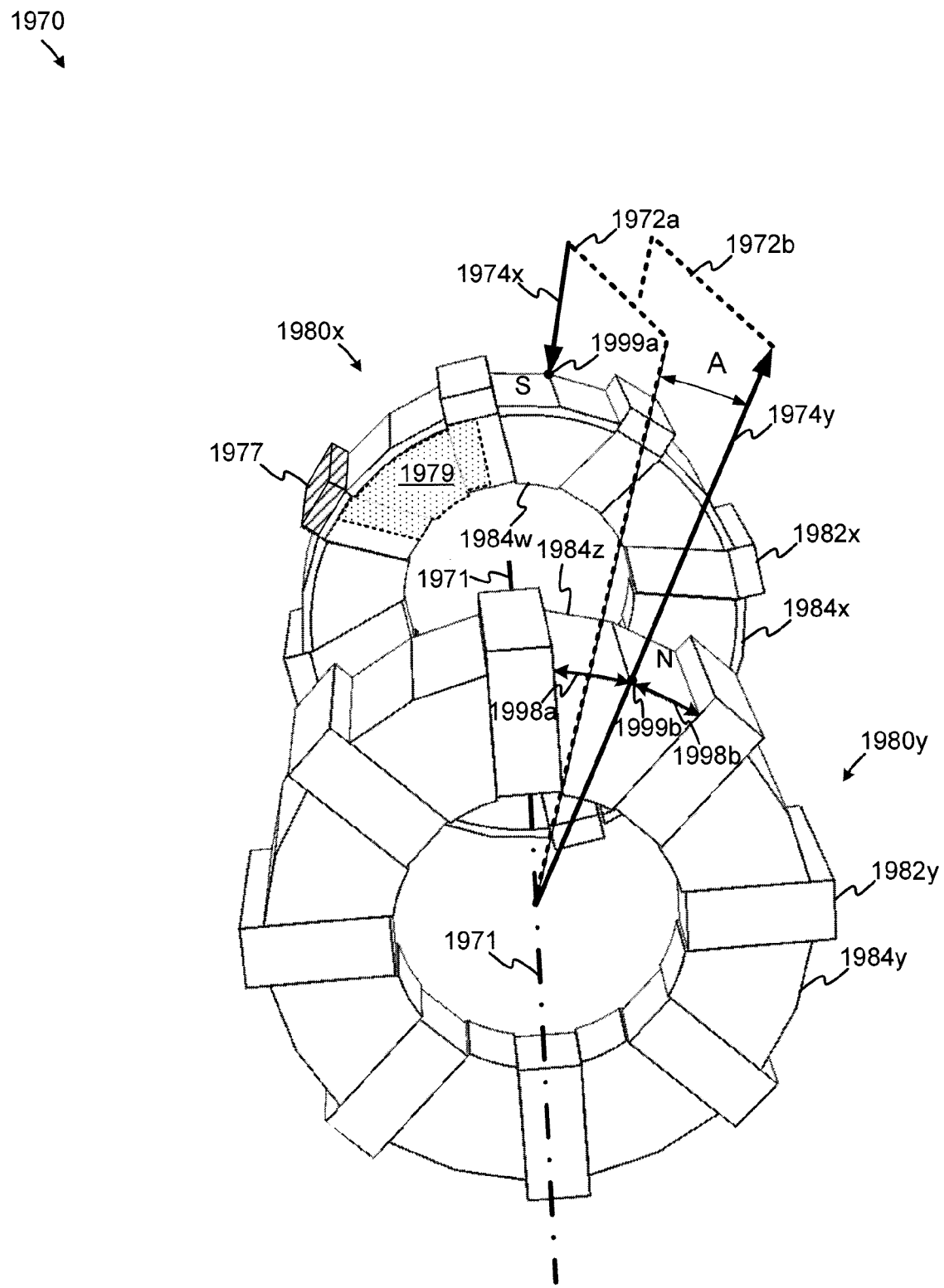
FIG. 19H depicts an example of a rotor structure implementing an arrangement of offset outer rotor assemblies, according to some embodiments.

FIG. 19H depicts an example of a rotor structure implementing an arrangement of offset outer rotor assemblies, according to some embodiments. Rotor structure 1970 is shown to include rotor assemblies 1980x and 1980y disposed on an axis of rotation 1971. Rotor assembly 1980x is shown to include magnetic regions 1979, which, in turn, can include magnets and/or magnetic material 1982x (or portions thereof) and magnetically permeable structures 1984x. Rotor assembly 1980y also includes magnetic regions (not shown) similar to magnetic regions 1979, which, in turn, can include magnets and/or magnetic material 1982y (or portions thereof) and magnetically permeable structures 1984y. As rotor assemblies 1980x and 1980y each can contribute to a detent torque when positioned to interact with field poles (not shown) in the stator, flux from either rotor assemblies 1980x or 1980y, or both, can contribute to detent. Flux waveforms depicting detent produced in association with rotor assemblies 1980x and 1980y can be substantially similar in shape and amplitude to each other, and, as such, the amplitudes of the detent waveforms rotor assemblies 1980x and 1980y can be added together (e.g., through the principles of superposition). The detent waveforms can add together to form a composite detent waveform. As shown, rotor assemblies 1980x and 1980y are outer rotor assemblies.

According to at least some embodiments, rotor assemblies 1980x and 1980y can be offset from each other relative to, for example, a shaft (not shown) coextensive to axis of rotation 1971. Rotor assemblies 1980x and 1980y can be offset by an angle A to provide for a composite detent waveform that has an amplitude less than if there was no offset. In some examples, angle A can be determined to offset at least one detent waveform to be out of phase (or substantially out of phase), where angle A can be any number of degrees. In at least some examples, angle A can be any angle between 0 to 30 degrees. A composite detent waveform can have a reduced amplitude, with the offset rotor assemblies 1980x and 1980y causing the detent waveforms to be offset relative to each other. In some cases, offset detent waveforms can cancel (or substantially cancel) each other for enhanced position control of a motor and relatively smoother operation, according to various embodiments.

Angle A can be referenced in relation to the rotor assemblies and/or between any points of reference associated with the rotor assemblies, and can be expressed in terms of mechanical degrees about axis 1971. In at least some embodiments, angle A is an angle between poles for rotor assemblies 1980x and 1980y, such as an angle between one pole associated with rotor assembly 1980x and another pole associated with rotor assembly 1980y. For example, a south pole associated with rotor assembly 1980x can be positioned on axis 1971 at an angle A relative to a north pole associated with rotor assembly 1980y. In at least some embodiments, angle A can be referenced relative to a first reference point associated with rotor assembly 1980x and a second reference point associated with rotor assembly 1980y. As shown in this example, reference points, such as reference points 1999a and 1999b of associated magnetic regions 1979, can be used to determine an offset from each other by angle A. In some cases, reference points 1999a and 1999b each can represent a point along a line or plane that bisects the surface of either magnetically permeable structure 1984w or magnetically permeable structure 1984z. Reference points can include other points of reference, such as a point on a common edge or side (e.g., adjacent to a magnet, such as magnet 1982x or magnet 1982y). According to at least some embodiments, rotor assemblies 1980x and 1980y can be offset relative to planes including reference points, where each of the reference points is located in a plane that includes axis 1971. As shown, a ray 1974y extending out from rotor assembly 1980y can be offset from another ray 1974x oriented into rotor assembly 1980x. In particular, a plane 1972a including ray 1974x (e.g., into magnetically permeable structure 1984w) can be offset by an angle A from another plane 1972b that includes ray 1974y (e.g., extending out from magnetically permeable structure 1984z). While planes 1972a and 1972b including rays 1974x and 1974y can include axis of rotation 1971, the planes need not be so limited. Plane 1972b bisects magnetically permeable material 1984z such that reference point 399b is located at midpoint between equal arc lengths 1998a and 1998b (e.g., along a circle centered on axis of rotation 1971). Note that structural features, such as feature 1977, which is shown with shading, is optional and need not be present in various examples.

Figure 20A:
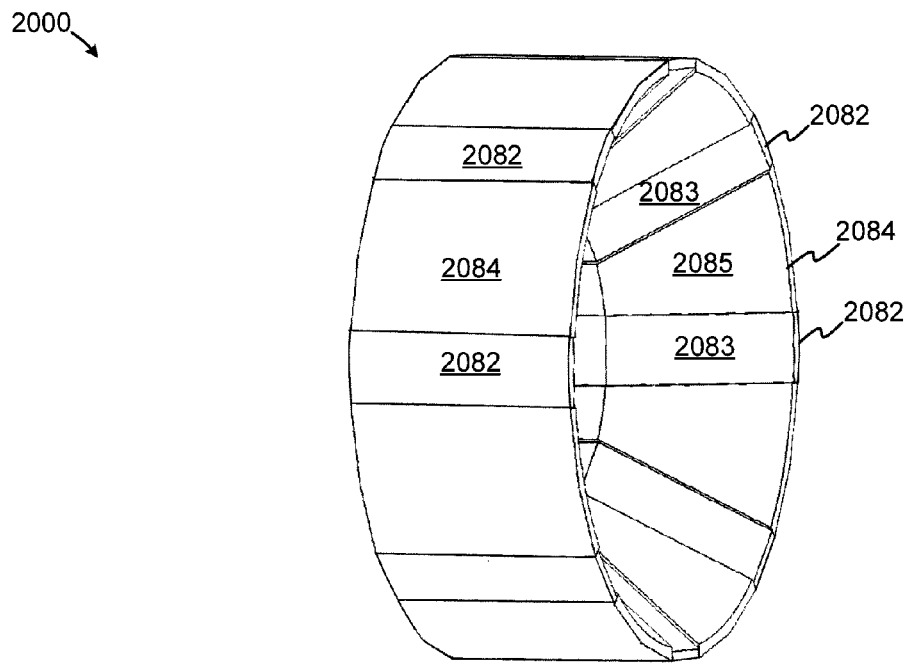
FIGS. 20A and 20B depict different perspective views of an example of an outer rotor assembly, according to some embodiments.
Figure 20B:
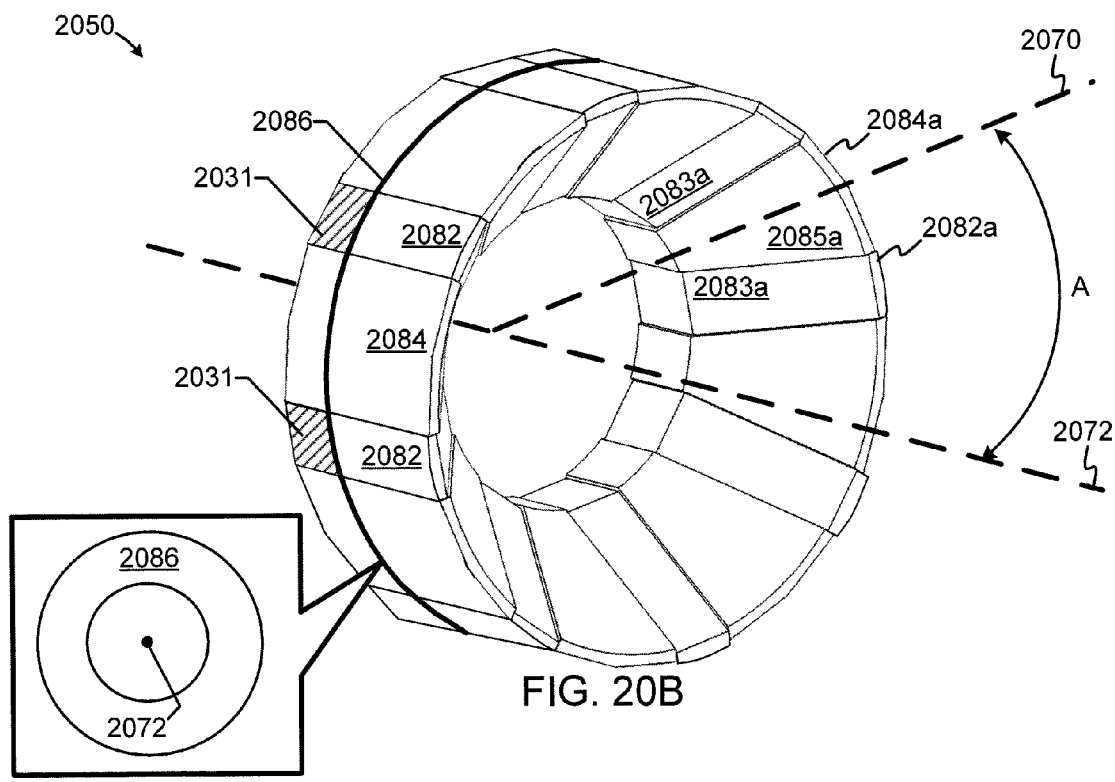

FIGS. 20A and 20B depict different perspective views of an example of an outer rotor magnet or rotor assembly, according to some embodiments. In FIG. 20A, a rotor assembly 2000 includes magnetic material 2082 (e.g., as permanent magnets) having surfaces 2083 configured to confront pole faces, and magnetically permeable structures 2084 having surfaces 2085 that are configured also to confront pole faces. Surfaces 2083 and 2085 can specify a magnetic region and/or a pole for rotor assembly 2000. Note that while surfaces 2083 of magnetic material 2082 are configured to confront pole faces, flux need not, according to some embodiments, pass through surfaces 2083. Rather, the flux and/or flux density produced by the structures of magnetic material 2082 can magnetically couple to (i.e., form flux paths through) the sides of magnetically permeable structures 2084, whereby flux produced by the structures of magnetic material 2082 can interact via surfaces 2085 with pole faces.

FIG. 20B depicts another perspective view of a rotor assembly 2050 includes magnetic material 2082 (e.g., as permanent magnets), and magnetically permeable structures 2084. A surface 2085a of magnetically permeable structures 2084a can be at angle "A" from centerline 2072 passing through the center of rotor assembly 2050, where line 2070 is coextensive with at least a portion of surface 2085a. Further, surfaces 2083a of magnetic material 2082a can be at angle "A" (or any other angle) from centerline 2072. In some embodiments, centerline 2072 coincides with an axis of rotation. Centerline 472 can represent a geometric center of a number of cross-sections of rotor assembly 2050 in planes perpendicular to the axis of rotation. To illustrate, FIG. 20B depicts a cross section 2086 having an annular or a disc shape that is centered on centerline 2072, with cross section 2086 residing a plane perpendicular to centerline 2072. Further, centerline 2072 can represent, for example, a line about which rotor assembly 2050 is symmetric. In at least some embodiments, surfaces 2085a are used to form air gaps with adjacent pole faces (not shown). In at least one example, surfaces 2085, such as surface 2085a, are configured to be coextensive with portions of an outer surface of a cone, whereas surfaces 2083, such as surface 2083a, may or may not be configured to be at angle A or coextensive with the outer surface of a cone. Thus, flux paths may pass between surfaces 2085 and the pole faces, whereas flux paths need not exist between surfaces 2083 and the pole faces.

Figure 20C:
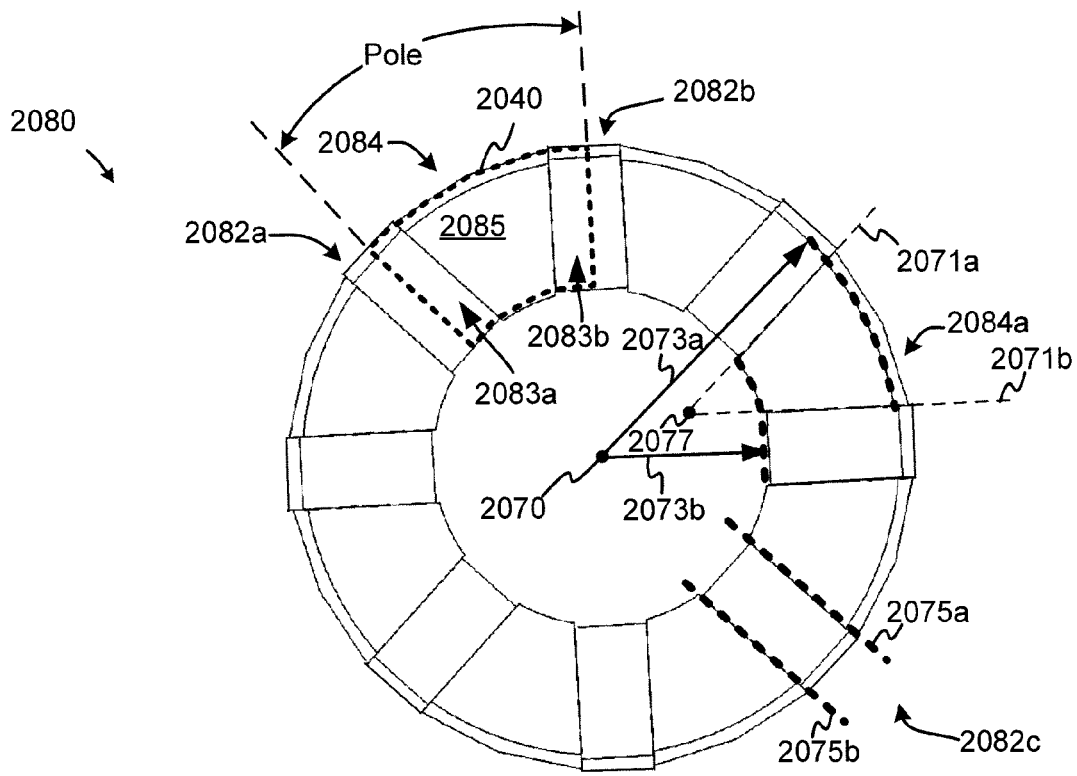
FIGS. 20C and 20D depict a front view and a rear view of an example of an outer rotor assembly, according to some embodiments.
Figure 20D:
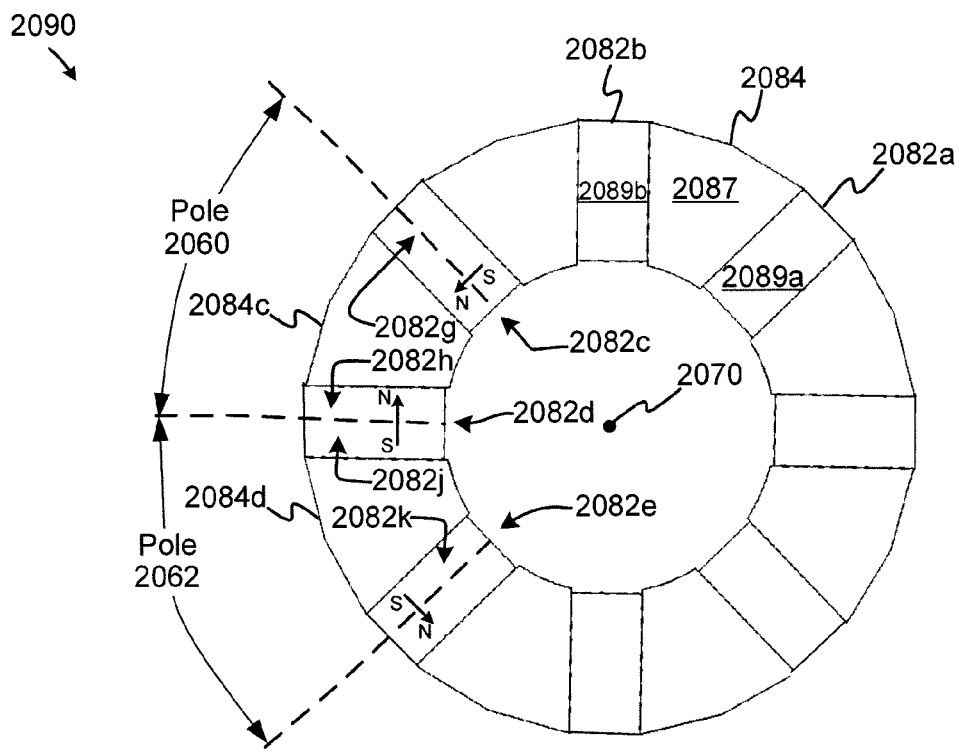

FIGS. 20C and 20D depict a front view and a rear view of an example of an outer rotor assembly, according to some embodiments. FIG. 20C depicts a front view of a rotor assembly 2080 including an arrangement of magnetic regions 2040. A magnetic region 2040 includes surface portion 2083a, surface portion 2083b, and surface 2085 associated with respective magnetic material 2082a, magnetic material 2082b, and magnetically permeable structure 2084, whereby surfaces 2083a, 2085, and 2083b are configured to confront pole faces (not shown). Magnetic regions 2040 are arranged radially about a centerline 2070. Further to FIG. 20C, the front view (e.g., the view in which at least surface 2085 confronts pole faces of field pole members) of magnetically permeable structure 484a is a circular sector shape (e.g., a "pie piece"-like cross-section in a plane substantially perpendicular to the axis of rotation). In the example shown, magnetically permeable structure 2084a can be defined as a portion of a circle enclosed by line 2071a and line 2071b originating from, for example, a point 2077, and bounded by a first arc or line associated with an outer radius 2073a and a second arc or line associated with an inner radius 2073b. Line 2071a and line 2071b can be a first boundary and a second boundary extending from a point 2077, which is a center of a circle (not shown) offset from centerline 2070. Note that inner radius 2073b can be relatively constant in an extension portion (e.g., in an extension region 2026 of FIG. 20E) and can vary in an angled surface portion (e.g., in an angled surface portion 2028 of FIG. 20E) along the axis of rotation.

Referring back to FIG. 20C, the front view of magnetic material 2082, such as magnetic material 2082c, indicates that sides 2075a and 2075b of magnetic material 2082 can be parallel to each other. Further, magnetic material 2082c can also be bound by an arc or line associated with an outer radius 2073a and another arc or line associated with an inner radius 2073b. Note that the shapes of magnetically permeable structures 2084 and magnetic materials 2082a and 2082b are not limited to those shown and can be of any shape. For example, magnetic materials 2082a and 2082b can be wedge-shaped (not shown) and the shapes of magnetically permeable structures 2084 can be dimensioned to have parallel sides, such as sides 2075a and 2075b. Note that sizes (e.g., relative sizes) of magnetically permeable structures 2084 and magnetic materials 2082a and 2082b are not limited to those depicted in this and other figures. Also, rotor assembly 2080 and other variations thereof need not be limited to magnetically permeable structures 2084 and magnetic materials 2082a and 2082b, but may include other materials, structures and/or arrangements of magnetically permeable structures 2084 and magnetic materials 2082a and 2082b.

FIG. 20D depicts a rear view 2090 of a rotor assembly 2080 including arrangements of magnetic material 2082a, magnetic material 2082b, and magnetically permeable structures 2084 of FIG. 20C, where magnetic material 2082a, magnetic material 2082b, and magnetically permeable structures 484 are used to form a magnetic region. Surfaces 2089a, 2087, and 2089b are rear surfaces of magnetic material 2082a, magnetically permeable structure 2084, and magnetic material 2082b, respectively. In some embodiments, the cross-sections of magnetic material 2082a and of magnetic material 2082b are substantially rectangular in a plane perpendicular to centerline 2070. In various instances, one or more of the surfaces of either the magnetic material or the magnetically permeable structure can be curved or straight (or can be formed from multiple straight portions to approximate a curved surface) at an inner radius dimension, such as at inner radius 2073b of FIG. 20 or an outer radius dimension, such as at an outer radius 2073a of FIG. 20C. The cross-section of magnetically permeable structure 2084 can be trapezoidal in shape (e.g., wedge-shaped) in a plane perpendicular to centerline 2070. Further, FIG. 20D depicts a rear view of structures for forming magnetic poles 2060 and 2062, where pole 2060 is a north pole and pole 462 is a south pole. In the example shown, a portion ("N") 2082g of magnet 2082c, a portion ("N") 2082h of magnet 2082d and magnetically permeable structure 2084c form pole 2060, whereas a portion ("S") 2082j of magnet 2082d, a portion ("S") 2082k of magnet 2082e, and magnetically permeable structure 2084d form pole 2062. Note that magnets 2082c, 2082d, and 2082e can be polarized in the direction shown by the flux arrows with north ("N") and south ("S") notations, whereby the directions of polarization can be circumferential (or substantially circumferential), and, thus, can be tangent (or substantially tangent) to a circle (not shown) about centerline 2070. In some examples, the directions of polarization can be circumferential in that flux passes generally of, at, or near the circumference of a circle (not shown) about a centerline and/or an axis of rotation. In some embodiments, the portions of magnets 2082a to 2082b need not be visible in the rear view. For example, the axial lengths of magnets 2082 of FIGS. 20A and 20B need not extend along centerline 2072 as long as magnetically permeable material 2084.

FIGS. 20E to 20G depict cross-sectional views of an example of an outer rotor assembly, according to some embodiments. Diagram 2020 of FIG. 20E includes a cross-section of an outer rotor assembly in which a plane ("X-X") bisects the outer rotor along or through the axis of rotation 2012. The cross-section includes an extension portion 2026 and an angled surface portion 2028 having at least a subset of dimensions along the axis of rotation 2012. Extension portion 2026 includes an inner radius ("IR") 2021 as a dimension that is substantially constant along axis of rotation 2012. Extension portion 2026 can be configured to vary an amount of flux passing through a surface of magnetically permeable structure, such as surface 2025. The amount of flux can be varied by modifying a dimension along the axis, such as an axial length 2029. The amount of flux can be generated at least by magnetic material. In some examples, the amount of flux can be varied by modifying another dimension, height 2027, which can be perpendicular to axis of rotation 2012. In some cases, modifying the outside radius ("OR") 2099 of the outer rotor assembly may influence height 2027 to modify the amount of flux. Also, modifying height 2027 to modify the amount of flux may or may not influence outside diameter 2099. Angled surface portion 2028 is shown to have surfaces at multiple radial distances 2023 from axis of rotation 2012, whereby radial distances 2023 increase at axial distances further from extension portion 2026 along axis of rotation 2012. But note that radial distances 2023 need not vary in some cases (not shown). For example, one or more subsets of radial distances can be constant or substantially constant for one or more subsets or ranges of lengths along the axis of rotation. As shown, the interior portions of an internal permanent magnet ("IPM") and/or portions of the magnetically permeable material and magnetic material are disposed at radial distances greater than a radial distance 2023 from the axis of rotation.

In some embodiments, the portions of magnets 2082a to 2082b need not be visible in the rear view. For example, the axial lengths of magnets 2082 of FIGS. 20A and 20B need not extend along centerline 2072 as long as magnetically permeable material 2084 along the axis of rotation. Thus, magnets 2082 can be embedded in magnetically permeable material such that they need not extend axially through the axial length of a rotor assembly. In some embodiments, magnets 2082 having a shorter axial length than magnetically permeable material 2084 can be disposed adjacent supplemental structures 2031 that can include any material, such as plastic. In some instances, supplemental structures 2031 can include any material that reduces or prevents magnetic short-circuits between structures of magnetically permeable material 2084. While magnets 2082 may be disposed in angled surface portion 2028, they can be disposed in a portion of an extension portion or can be omitted therefrom. In some embodiments, surfaces 2083 of magnets 2082 can be covered by magnetically permeable material between surfaces 2083 and respective air gaps and/or pole faces.

Diagram 2010 of FIG. 20F is a perspective view of a cross-section of an outer rotor assembly 2032 in which a plane ("X-X'") 411 bisects the outer rotor assembly along the axis of rotation 2012, according to at least one embodiment. The inner diameter of extension portion 2026 can include one or more radial distances. In the example shown, the inner diameter can include as radial distances 2013 and 2014 between axis of rotation 2012 and the surfaces in extension portion 2026 for magnets 2082 and magnetically permeable structure 2084. In some cases, radial distances 2013 and 2014 can be the same.

Diagram 2030 of FIG. 20G is another perspective view of a cross-section of an outer rotor assembly 2032, according to at least one embodiment. As shown, the surfaces of magnets 2082 and magnetically permeable structures 2084 can be at the same or at different distances from the axis of rotation (e.g., the surfaces for magnets 2082 and magnetically permeable structure 2084 can reside on the same or different interior or exterior surface portions of a cone). Thus, surfaces 2037 of magnetically permeable structures 2084 and surfaces 2039 of magnets 2082 can be dimensioned similarly or differently. In the particular example shown, surfaces 2037 of magnetically permeable structures 2084 can be disposed at a radial distance 2033 from an axis of rotation, whereas surfaces 2039 of magnets 2082 can be disposed at a radial distance 2035 from the axis of rotation. Note that in at least some embodiments, surfaces 2037 of magnetically permeable structures 2084 are configured to convey flux between a pole face (not shown) and outer rotor assembly 2032 in an angled surface portion. Thus, surfaces 2039 of magnets need not be coextensive with the same conically-shaped space to which surfaces 2037 are coextensive. Rather, surfaces 2039 of the magnets can be described as being "recessed" relative to surfaces 2037. As air gaps can be defined in associated with surfaces 2037 of magnetically permeable structures 2084, the distances 2035 can be equal or greater than distances 033 relative to an axis of rotation. Further, surfaces 2039 can be of any shape are not limited to the shapes shown in FIG. 20G.

Figure 21A:
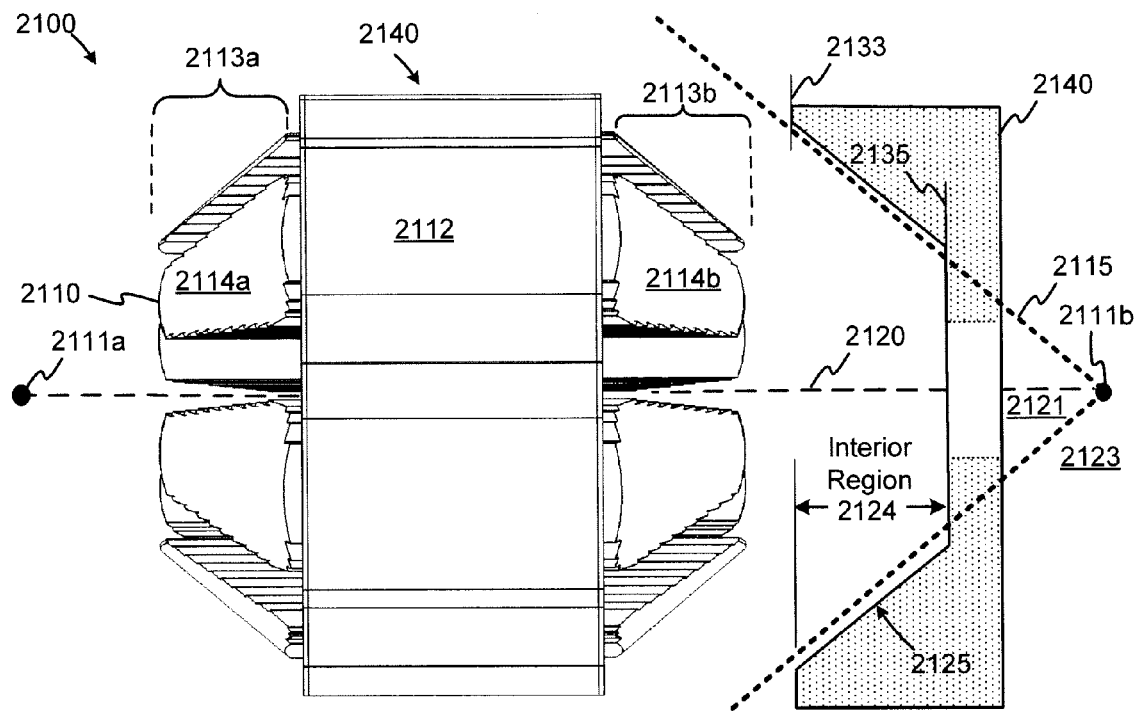
FIGS. 21A and 21B depict different views of an example of a stator assembly, according to some embodiments.
Figure 21B:
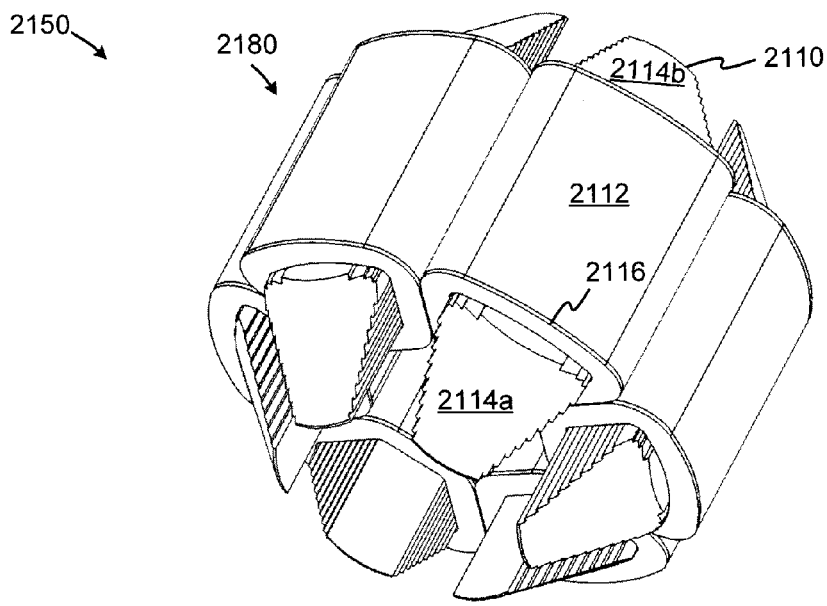

FIGS. 21A and 21B depict different views of an example of a stator assembly, according to some embodiments. FIG. 21A is a diagram 2100 depicting a side view of stator assembly 2140 including an arrangement of active field pole members each including a field pole member 2110 having pole faces 2114*a* and 2114*b*, and a coil 2112. As shown, pole faces 114*a* and portions of respective pole shoes are disposed in a portion 2113*a* of stator assembly 2140 and pole faces 2114*b* are disposed in a portion 2113*b* of stator assembly 2140. Pole faces 2114*b* and portion 2113*b* are configured to extend into an interior region 2124 of a rotor assembly 2140. According to some embodiments, interior region 2124 is an opening, space or cavity configured to receive portion 2113*b*, and can be formed as having a frustum shape. As is known, a frustum is a cone-based shape with a first circular base (e.g., a bottom base) and a second circular base (e.g., a top base), whereby the second base is formed by cutting off the tip of a cone along a plane perpendicular to the height of a cone. The height (not shown) of the cone in this example lies along axis of rotation 2120. Interior region 2124 can be formed by planes 2133 and 2135 passing perpendicular to an axis of rotation 2120. Planes 2133 and 2135 pass or cut through a conical boundary 2115 of a cone disposed on an axis of rotation 2120, with apex 2111*b* of the cone lying on axis of rotation 2120. In at least one example, planes 2133 and 2135 can form a first base and a second base, respectively, of a frustum-shaped interior region 2124. Conical boundary 2115 is oriented so as to extend from apex 2111*b* to enclose another point 2111*a* on axis of rotation 2120 within the interior of conical boundary 2115. Point 2111*a* can serve as another apex for a conical boundary (not shown) to enclose portion 2113*a* within. An angled surface 2125 of, for example, a magnetic region of rotor assembly 2140 is disposed within region 2123 that is external to the conical boundary 2115, whereas pole faces 2114*b* reside in region 2121 that is internal to the conical boundary 2115. Further, pole faces 2114*b* can be oriented at an angle relative to axis of rotation 2120, whereby the angle is the same or different relative to an angle coextensive with angled surface 2125.

FIG. 21B is a diagram 2150 depicting a side view of stator assembly 2180 including an arrangement of active field pole members each including a field pole member 2110 having pole faces 2114*a* and 2114*b*, and a coil 2112. Coil 2112 can be disposed on or over a bobbin 2116. As shown in FIGS. 21A and 21B, pole faces 2114*a* and 2114*b* are configured to align with a line or surface that is at an angle with, for example, the axis of rotation. Further, pole faces 114*a* and 2114*b* include surfaces (or portions thereof) are contoured to also align with or be bounded by the line or the surface at the above-mentioned angle. Therefore, pole faces 2114*a* and 2114*b* can include convex surface portions. According to some embodiments, pole faces 2114*a* and 12114*b* can be substantially flat or flat. A substantially flat or flat surface for a pole face can be coextensive with at least one or more portions of a conically-shaped space. In one example, a width of a pole face from the group of pole faces 2114*a* and 2114*b* can be or can substantially be coincident with an arc on a circle centered on the axis of rotation. The width of the pole face can decrease as, for example, the number of field pole members increase for stator assemblies 2140 of FIG. 21A and 2180 of FIG. 21B. The width decreases as the arc makes up a smaller portion of the diameter of the circle, and as the arc is reduced, the arc approximates a line by which the surface of the pole face can be bounded.

FIG. 22A depicts an outer rotor assembly and a stator assembly configured to interact with each other, according to some embodiments. Outer rotor assembly 2230 and stator assembly 2240 can interact with each other when arranged co-linearly. Diagram 2200 depicts rotor assembly 2230 including magnets 2232 and magnetically permeable structures 2234. Rotor assembly 2230 is configured to center on a centerline 2202*b*, which can coincide with an axis of rotation. Surface 283 and surface 2285 of respective magnets 2232 and magnetically permeable structures 2234 can be coextensive with or can be bounded by a line 2270 or surface oriented at an angle, A, from centerline 2202*b*. In some embodiments, surfaces 2285 of magnetically permeable structures 2234 need only be oriented at angle A for forming air gaps with pole faces 2214, with surfaces 2283 being optionally oriented with angle A. Stator assembly 2240 is shown to include a subset of pole faces 2214, with the dimensions of a number of field pole members establishing a perimeter 651 for stator assembly 2240. The dimensions of the number of field pole members can also establish a diameter 2257, as shown in FIG.

22B. Referring back to FIG. 22A, an envelope 2242 can define one or more boundaries in which pole faces 2214 (or surface portions thereof) are oriented, with envelope 2242 being centered on a center line 2202a. In some cases, envelope 2242 is a conically-shaped three dimensional space that can circumscribe the surfaces of pole faces 2214. The interior surface of envelope 2242 can be coincident with at least one angle, B. Note that angle B can be the same as angle A, or can vary therefrom (e.g., an air gap can have a uniform radial thickness or can have a variable axial thickness that varies in thickness along the axis). Stator assembly 2240 can also be centered on centerline 602a. Centerlines 2202a and 2202b can be coincident with an axis of rotation, at least in some cases. Note that while envelope 2242 can define a boundary of pole faces 2214, the pole faces need not be contoured or convex in all examples. For example, pole faces 2214 can include flat portions that are oriented at angle B within the boundary set forth by envelope 2242.

FIGS. 22B to 2C depict cross-sections of field pole members for determining a surface area of a pole face, according to some embodiments. Angles A and/or B of FIG. 22A can be determined as follows. Generally, a rotor-stator structure is designed based on spatial constraints, such as a volume into which the rotor-stator structure is to reside. Thus, stator assembly 2240 of FIG. 22A can be configured to have a perimeter 2251 and/or a diameter 2257. FIG. 22B depicts a cross-section 2250 in a plane perpendicular to axis of rotation 2256 with active field pole members arranged as a stator assembly within perimeter 2251. Cross-section 650 can be located within a coil region 2244 of FIG. 22A in which coils are disposed axially (e.g., the coils can be wound in an axial direction to generate ampere-turn ("AT") flux in a direction along an axis of rotation 2256 of FIG. 22B within the field pole members in coil region 2244. Active field pole members include coils 2252 and field pole members 2254 of FIG. 22B. A desired amount of flux (e.g., a total amount of flux) can be determined in coil region 2244 within an active field pole member to produce a value of torque. A flux density produced at an air gap can be influenced by the magnetic material used for magnets 2232 (e.g., neodymium magnets produce greater flux densities than, for instance, a ceramic magnet). Therefore, a specific magnetic material can be selected to produce a flux density to achieve a desired amount of flux in a portion of a field pole member having a cross-sectional area 2265 of FIG. 22C, which depicts a cross-section 2260. Cross-sectional area 2265 can provide for the desired amount of flux (e.g., total flux composed of at least AT-generated flux and magnetic material-generated flux) through the field pole member. In some cases, cross-section 2260 can be perpendicular to centerline 2202a of FIG. 22A. For example, cross-section 2260 can be depicted as cross-section 2261 of a field pole member 2241 of stator assembly 2240 of FIG. 22A, with cross-section 2261 being in a plane (not shown) perpendicular to centerline 2202a.

FIG. 22D illustrates a surface area of a pole face determined as a function of the flux in a coil region and/or the flux density produced by at least one magnetic region, the surface area being oriented at angle from a reference line, according to some embodiments. Surface area 2294 of a pole face 2214 of FIG. 22A can be based on the flux in coil region 2244 and the flux density produced by at least one magnet 2232 of the magnetic region, either (or both) of which can influence the generation of a desired amount of torque. Therefore, surface area 2294 can be determined as a function of flux produced by the magnetic material of magnets 2232, the flux originating tangent to a circle about centerline 2202a (i.e., as determined by the direction of polarization). Angle B can be determined to achieve surface area 2294. Note that surface area 2294 is greater than cross-sectional area 2265, thereby enhancing the concentration of magnet-produced flux within the field pole member. Pole face 2214a is oriented at an angle B (e.g., an acute angle to centerline 2202a) to establish surface area 2294. Note that the depiction in FIG. 22D is viewed from a point on a line normal to the surface of pole face 2214a. In some cases, at least a portion of pole face 2214a is coextensive with a portion of a cone. Angle A can be determined to orient the surface 2285 of at least magnetically permeable structure 2284 to the axis of rotation to form the air gap.

Figure 23:
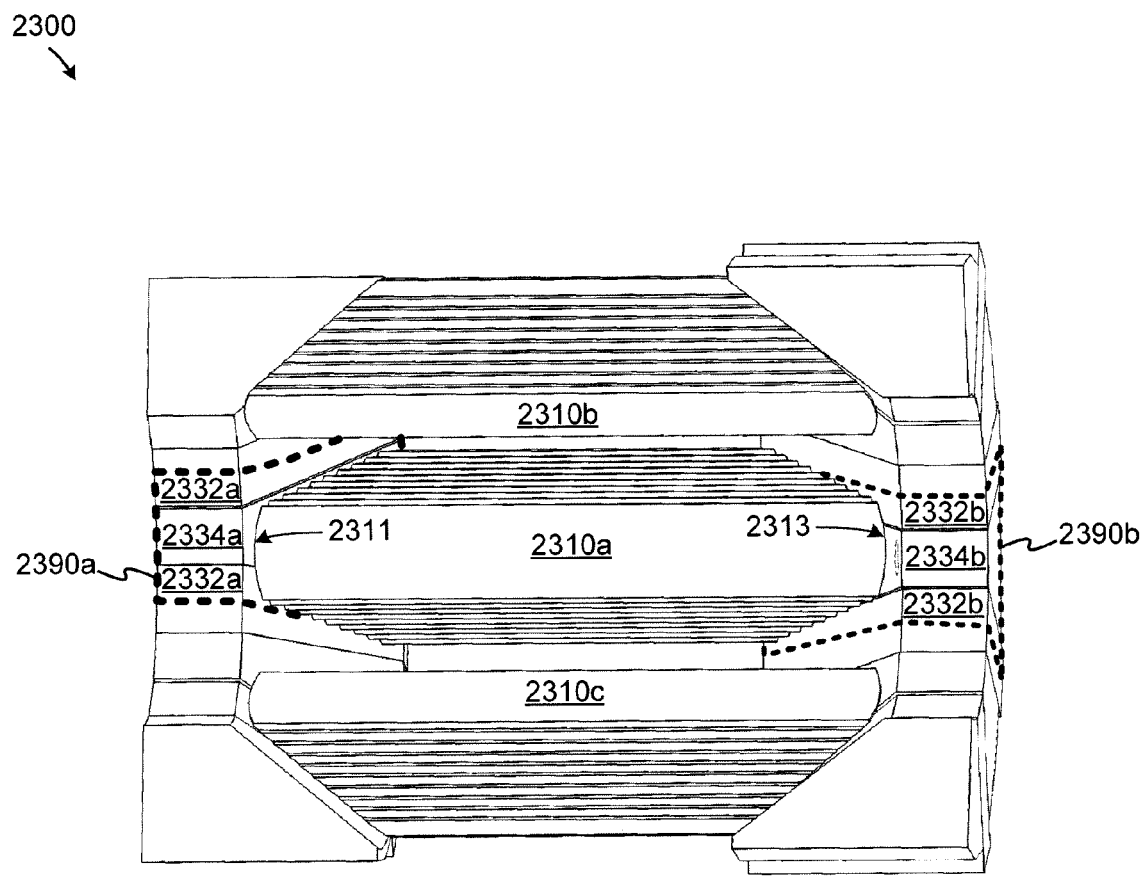
FIG. 23 depicts a cross-section of a rotor-stator structure in which field pole members are positioned adjacent to magnetic regions to form air gaps, according to some embodiments.

FIG. 23 depicts a cross-section of a rotor-stator structure in which field pole members are positioned adjacent to magnetic regions to form air gaps, according to some embodiments. Cross-section 2300 includes field pole members 2310a, 2310b, and 2310c oriented between portions of outer rotor assemblies. In particular, field pole member 2310a is located between magnetic region 2390a and magnetic region 2390b. An air gap 2311 is formed between magnetic region 2390a and a pole face (not shown) of field pole member 2310a and another air gap 2313 is formed between magnetic region 2390b and another pole face (not shown) of field pole member 2310a. Magnetic region 2390a includes magnets 2332a (or portions thereof) and a magnetically permeable structure 2334a, and magnetic region 2390b includes magnets 2332b (or portions thereof) and a magnetically permeable structure 2334b. In operation, a flux path (or a portion thereof) can extend from magnetic region 2390a via field pole member 2310a to magnetic region 2390b in examples where magnetic region 2390a forms a north pole and magnetic region 2390b forms a south pole. In this example, magnets 2332a (or portions thereof) include north poles oriented toward magnetically permeable structure 2334a and magnets 2332b (or portions thereof) include south poles oriented in a direction away from magnetically permeable structure 2334b. Note that while magnetic regions 2390a and 2390b are shown to be offset, they need not be.

Figure 24A:
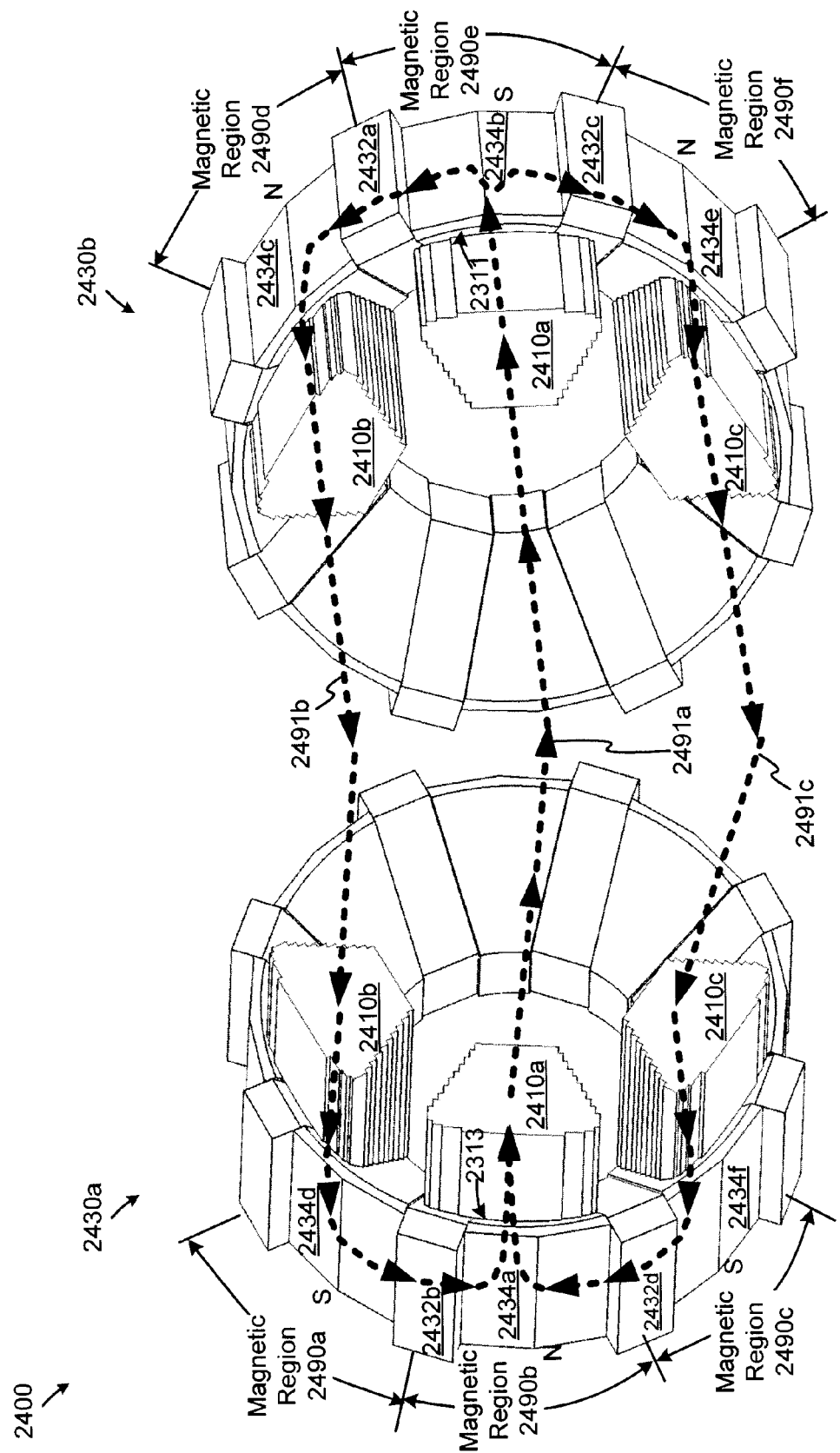
FIG. 24A depicts cross-sections of rotor-stator structure portions illustrating one or more flux path examples, according to some embodiments.

FIG. 24A depicts cross-sections of rotor-stator structure portions illustrating one or more flux path examples, according to some embodiments. Diagram 2400 includes field pole members 2410a, 2410b, and 2410c disposed between rotor assemblies 2430a and 2430b. As shown, flux path portion 2491a can extend through field pole member 2410a from magnetically permeable structure 2434a in rotor assembly 2430a to magnetically permeable structure 2434b in rotor assembly 430b. Flux path portion 2491a also passes through air gaps 2311 and 2313 that are formed between field pole member 2410a and respective rotor assemblies 2430a and 2430b. Magnetically permeable structure 2434b and magnets 2432a and 2432c (or portions thereof) are shown as constituting magnetic region 2490e, which forms a south ("S") pole. The flux path portion passes from magnetic region 2490e to magnetic region 2490d, which forms a north ("N") pole. Magnetically permeable structure 2434c and at least magnet 2432a (or a portion thereof) are shown as constituting magnetic region 2490d. The flux exits rotor assembly 2430b as flux path portion 2491b and passes through field pole member 2410b before entering magnetically permeable structure 2434d of magnetic region 2490a (i.e., a south pole), which also includes at least magnet 2432b. The flux passes to magnetic region 2490b (i.e., a north pole) composed of magnetically permeable structure 2434a and magnets 2432b and 2432d (or portions thereof), thereby establishing a closed flux path. According to the example shown, rotor assemblies 2430a and 2430b and field pole members 2410a and 2410b form a closed flux path. Portions of the closed flux path pass through at least field pole members 2410a and 2410b and at least rotor assemblies 2430a and 2430b in opposite directions or in substantially opposite directions. In some cases, a first portion of the closed flux path can pass through rotor assembly 2430a in a substantially opposite direction than a second portion of the closed flux path that passes through rotor assembly 2430a. For example, the first portion of the close flux path can pass through rotor assembly 2430a in one direction about the axis of rotation (e.g., clock-wise) and the second portion of the close flux path can pass through rotor assembly 2430b in another direction about the axis of rotation (e.g., counter clock-wise).

In a specific embodiment, the rotor-structure can be configured such that flux path portion 2491a can separate in rotor assembly 2430b to form flux path portion 2491b and flux path portion 2491c. Flux path portion 2491b passes through field pole member 2410b, whereas flux path portion 2491c passes through field pole member 2410c. The flux from magnetic region 2490e enters magnet region 2490f (i.e., a north pole) including magnetically permeable structure 2434e and at least magnet 2432c (or a portion thereof). The flux exits rotor assembly 2430b and passes through field pole member 2410c and into magnetic region 2490c (i.e., a south pole) of rotor assembly 2430a. Magnetic region 890c includes magnetically permeable structure 2434f and at least magnet 2432d (or a portion thereof). Note that the generation of flux path portion 891c is optional and need not be present in each rotor-stator structure of the various embodiments. Note, too, a "flux path portion" need not be limited to those shown, but can be any part of a flux path and of any length.

Figure 24B:
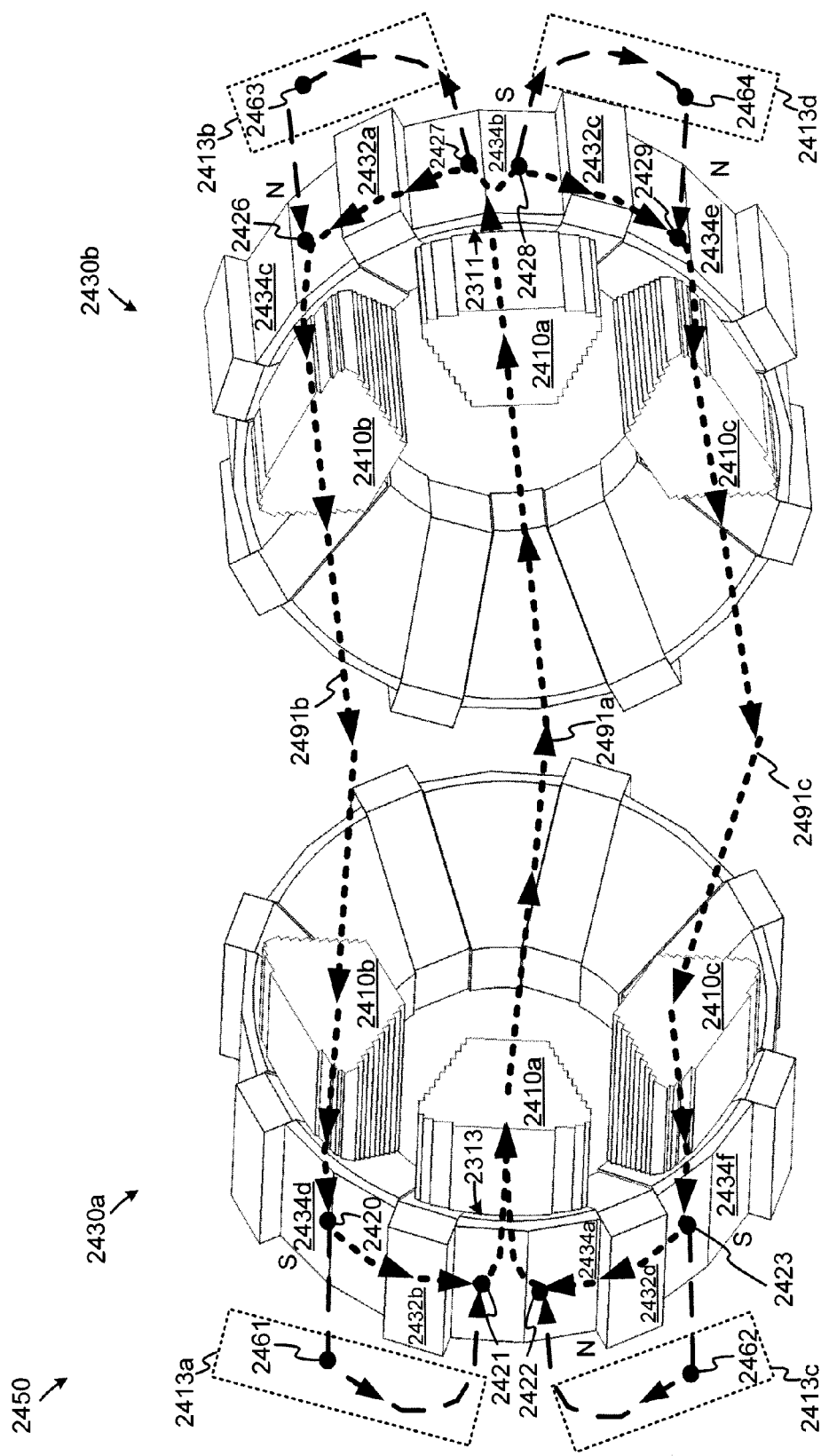
FIG. 24B depicts cross-sections of rotor-stator structure portions illustrating other flux path examples, according to some embodiments.

FIG. 24B depicts cross-sections of rotor-stator structure portions illustrating specific flux path examples, according to some embodiments. Similar to FIG. 24A, diagram 2450 includes field pole members 2410a, 2410b, and 2410c disposed between rotor assemblies 2430a and 2430b. A principal flux path (or portions thereof) is shown to traverse circumferentially through one magnet in a subset of magnets in rotor assembly 2430a and circumferentially through another magnet in another subset of magnets in rotor assembly 2430b. According to some embodiments, a principal flux path passes through magnets in rotor assemblies that generally provide a predominant amount of flux (e.g., magnet-produced flux), thereby contributing predominantly to flux production (e.g., torque production) relative to other magnetic material, such as boost magnets, which are describe below. To illustrate, consider that a principal flux path (or portions thereof) passes from a point 2420 associated with magnetically permeable material 2434d through magnet 2432b to point 2421 associated with magnetically permeable material 2434a in rotor assembly 830a. The principal flux path can include flux path portion 2491a between points 821 and 2427, the principal flux path traversing axially through field pole member 2410a. In rotor assembly 2430b, the principal flux path (or portions thereof) passes from point 2427, which is associated with magnetically permeable material 2434b, through magnet 2432a to point 2426 associated with magnetically permeable material 2434c. The principal flux path can include flux path portion 2491b between points 2426 and 2420, the principal flux path traversing axially through field pole member 2410b, thereby forming a closed flux path. Another principal flux path is shown to include flux path portions that traverse circumferentially from point 2423 through magnet 2432d (e.g., as one magnet in a subset of magnets) to point 2422 in rotor assembly 430a, and from point 2428 through another magnet 2432c (e.g., in another subset of magnets) to point 2429 in rotor assembly 2430b.

FIG. 4B also shows a flux path (or portions thereof) that omits or bypasses magnets 2432b and 432d in rotor assembly 2430a and magnets 2432a and 2432c rotor assembly 2430b. The flux path traverses predominantly in a circumferential direction that bypasses a magnet in a subset of magnets in either rotor assembly 2430a or rotor assembly 2430b. Consider the following example in which a flux path (or portions thereof) passes from a point 2420 via point 2461 to point 2421 in rotor assembly 2430a, thereby bypassing magnet 2432b. Point 2461 represents a point associated with a structure 2413a that is configured to boost an amount of flux passing along, for example, path portion 2491a. Structure 2413a can also be configured to provide a magnetic return path. The flux path can then pass axially between points 2421 and 2427 through field pole member 2410a. In rotor assembly 2430b, the flux path (or portions thereof) passes from point 2427 via a structure 2413b including point 2463 to point 2426. The flux path passes from point 826 to point 2420, thereby forming a closed flux path. Another flux path (or portions thereof) is shown to include flux path portions passing from a point 2428 via a structure 2413d including point 2464 to point 2429 in rotor assembly 2430b, and from point 423 via a structure 2413c including point 2462 to point 2422 in rotor assembly 2430a. Note that structures 42413a, 2413b, 2413c, and 2413d can include the same or different elements and/or compositions.

Figure 24C:
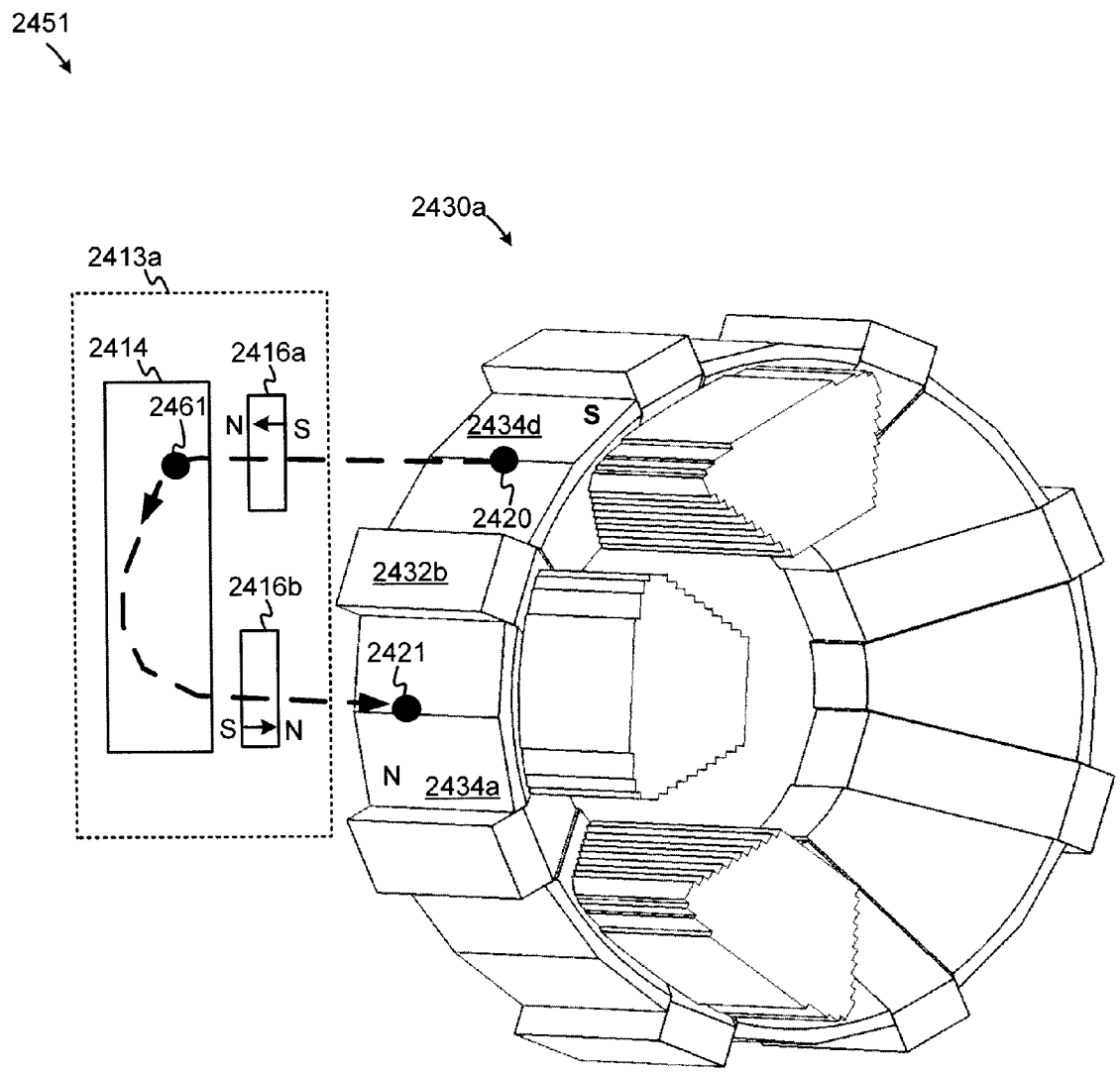
FIG. 24C is a diagram depicting elements of a structure for a rotor assembly, according to some embodiments.

FIG. 24C is a diagram depicting elements of a structure for a rotor assembly, according to some embodiments. Diagram 2451 includes rotor assembly 2430a, as described in FIGS. 8A and 8B, and a structure 2413a. Structure 2413a is configured to boost an amount of flux passing along a flux path and to provide a magnetic return path. Further, structure 2413a can re-orient that direction of flux passing between points 2420 and 2421. For example, absence of structure 413a causes flux to pass between points 2420 and 821 in a direction opposite than depicted by the arrow (i.e., in a direction from point 2421 ("N") to point 2420 ("S")). In the example shown, structure 2413a includes magnetic material, such as magnets 2416a and 2416b, and/or a flux conductor shield that provides a magnetic return path and shields external regions from being exposed to stray flux. A flux conductor shield can include magnetically permeable material that, in some cases, can be equivalent to that of field pole members 2410a to 410c of FIGS. 24A and 24B. Referring back to FIG. 20C, the directions of polarization for magnets 816a and 2416b influence the direction of flux traveling between points 2420 and 2421. In various embodiments, magnets 2416a and 2416b can represent axial boost magnets or radial boost magnets (e.g., either inner radial boost magnets or outer radial boost magnets).

Figure 25A:
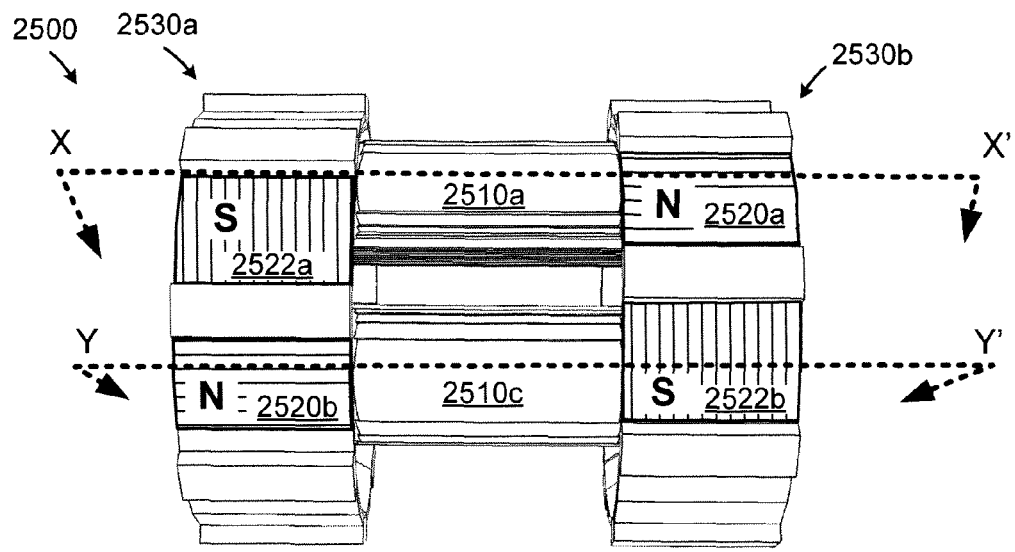
FIGS. 25A to 25C depict cross-sections of a rotor-stator structure portion illustrating examples of one or more flux path portions, according to some embodiments.
Figure 25B:
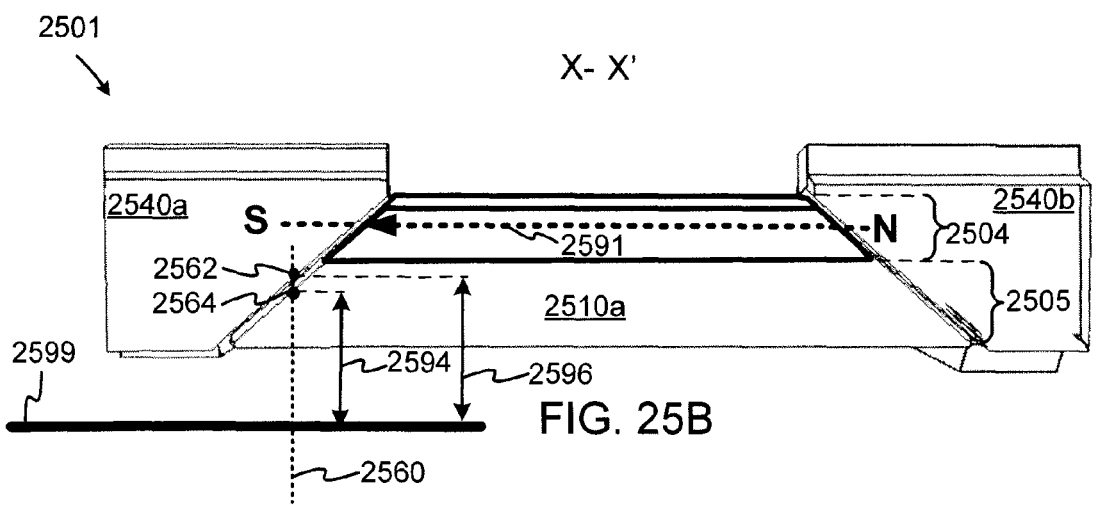
Figure 25C:
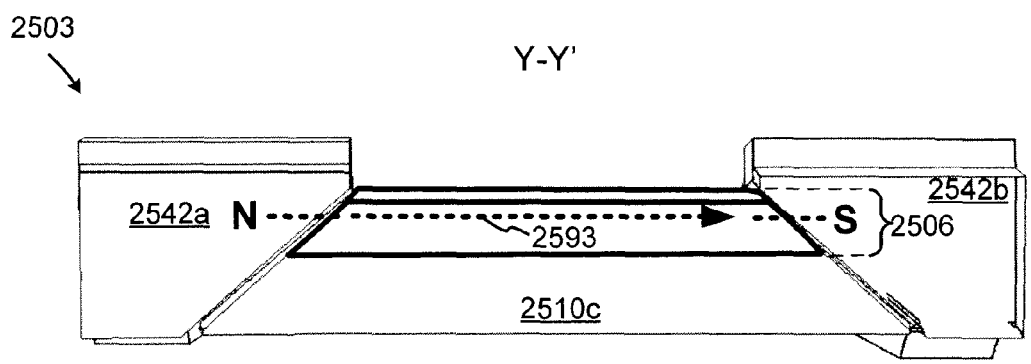

FIGS. 25A to 25C depict cross-sections of a rotor-stator structure portion illustrating examples of one or more flux path portions, according to some embodiments. Diagram 2500 depicts cross-sections of field pole members 2510a and 2510c that are disposed between rotor assemblies 2530a and 2530b. As shown, cross-section X-X' is a cross-section of field pole member 2510a between rotor assemblies 2530a and 2530b, where cross-section X-X' is a medial plane extending in an axial direction through a south magnetic pole including a magnetically permeable structure ("S") 2522a and a north magnetic pole including a magnetically permeable structure ("N") 2520a. The medial plane divides field pole member 2510a approximately in half (e.g., includes percentages from 50/50 to 60/40 on either side). Similarly, cross-section Y-Y' is a cross-section of field pole member 2510c between rotor assemblies 2530a and 2530b, where cross-section Y-Y' is also a medial plane extending in an axial direction through a north magnetic pole including a magnetically permeable structure ("N") 2520b and a south magnetic pole associated with another magnetically permeable structure ("S") 2522b. Cross-section Y-Y' divides field pole member 2510c approximately in half.

FIG. 25B depicts a cross-section ("X-X'") 2501 of field pole member 2510a in which a flux path portion 2591 extends between cross-sections of rotor assemblies 2540a and 940b that correspond to magnetically permeable materials 2522a and 2520a, respectively. In some embodiments, field pole member 2510a is configured to provide that flux path portion 2591 passes through a portion 2504 of field pole member 2510a that is located at one or more distances farther than other portions of field pole member 2510a, such as a portion 2505, from a reference line (e.g., an axis of rotation). Portion 2504 of field pole member 910a can have an axial length that is shorter than other portions of field pole member 2510a. For example, one or more laminations disposed within portion 2504 can have lengths that are shorter than the lengths of laminations that are disposed in other portions of field pole member 2510a. Note that a point 2562 on the surface of the magnetically permeable structure in the cross-section of rotor assembly 540a can be at a radial distance 2596 from a reference line 2599 (e.g., the axis of rotation) and a point 2564 on the pole face can be at a radial distance 994 from reference line 2599, wherein the both points 2562 and 2564 can lie in a plane 560, which, for example, can be perpendicular to reference line 2599. In outer rotor assemblies, radial distance 2596 is greater than radial distance 2594.

FIG. 25C depicts a cross-section ("Y-Y'") 903 of field pole member 2510c in which a flux path portion 2593 extends between cross-sections of rotor assemblies 2542a and 2542b. In some embodiments, field pole member 2510c is configured to provide that flux path portion 2593 passes through a portion 2506 of field pole member 2510a similar to flux path portion 2591 of FIG. 25B. Note that flux path portion 2593 can be representative of either flux path portion 2491b or 2491c of FIG. 24A, in at least some examples.

Figure 26:
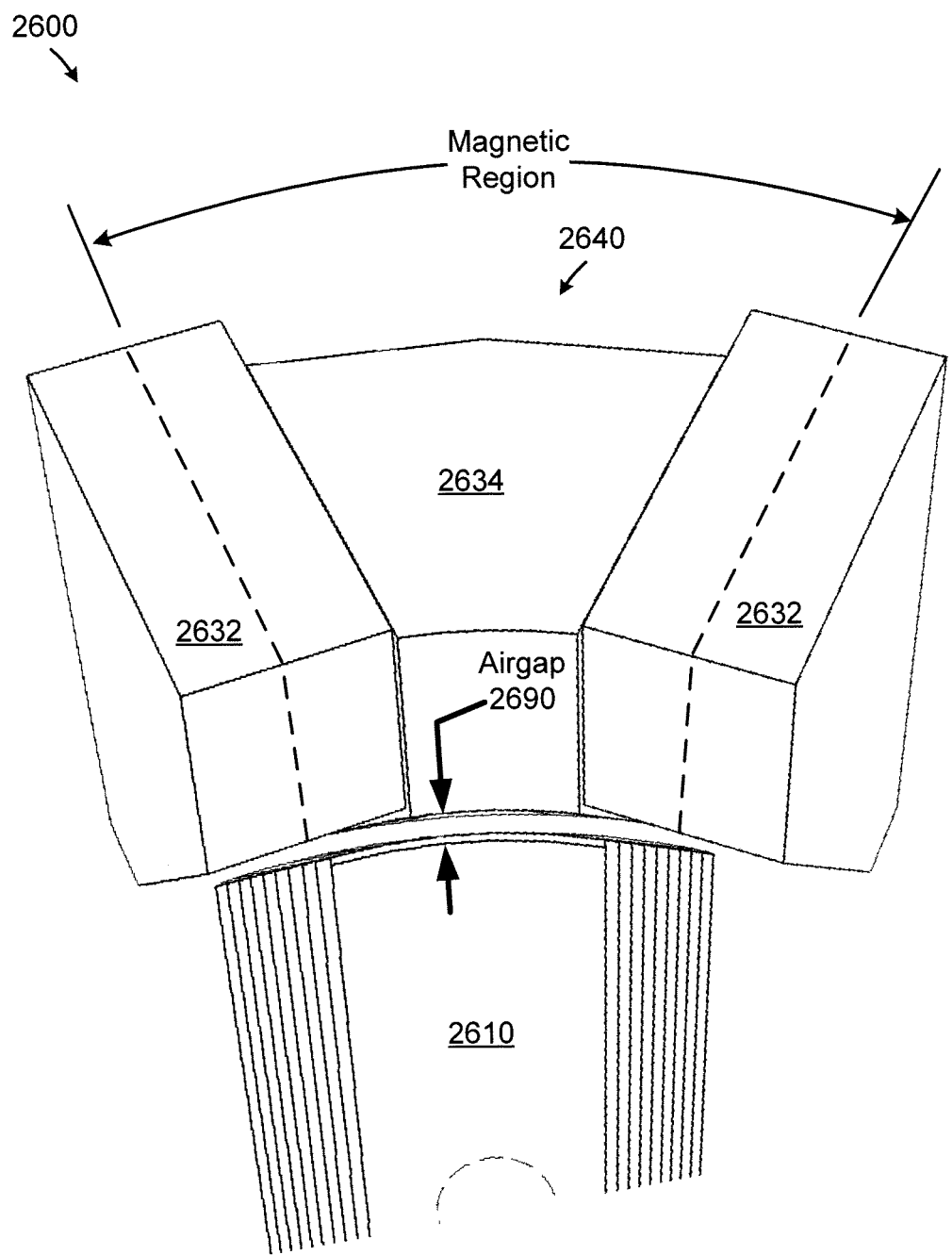
FIG. 26 depicts a view along an air gap formed between a magnetic region and a pole face, according to some embodiments.

FIG. 26 depicts a view along an air gap formed between a magnetic region and a pole face, according to some embodiments. Diagram 2600 is a view of an air gap 2690 along a curved surface (not shown) of, for example, a conically-shaped envelope, whereby the air gap can be coextensive with or located on the curved surface. Further, diagram 2600 also depicts a magnetic region 2640 confronting a pole face of a field pole member 2610, where magnetic region 2640 includes magnets 2632 (or portions thereof) and a magnetically permeable structure 2634. The pole face of field pole member 2610 and magnetic region 2640 (or a portion thereof) establish an air gap 2690. As shown, the surface of the pole face includes a curved surface between a side of field pole member 2610 near one of magnets 2632 and the other side of field pole member 2610 near another magnet 2632.

FIGS. 27A to 27C depict various views of a field pole member, according to some embodiments. FIG. 27A is a top view of a field pole member 2710 that includes pole faces 2714a and 2714b, and pole core 2711. As illustrated, pole face 2714a includes dashed lines to represent the contours indicating a convex surface. Note that the dashed lines representing the contours can represent the use of laminations to form field pole member 2710, and the dashed lines can represent any number of laminations that can be used to form pole faces 2714a and 2714b, as well as field pole member 2710. FIG. 27B is a perspective view of field pole member 2710 including at least a pole face 2714a, with field pole member 2710 being formed with a stack 2774 of laminations. Line 2770 can represent a flux path passing through a portion 2772 of field pole member 2710 shown in FIG. 27C. Portion 2772 is an axial portion or cross-section portion located at a distance from an axis of rotation. In some embodiments, portion 2772 is an axial portion that has dimensions to facilitate a reduction in flux density to reduce losses that otherwise might accompany a higher flux density. FIG. 27C is a diagram 2750 showing a cross-section view 2720 and a side view 2730 of field pole 2710. Cross-section view 2720 depicts a stack of laminations that at the lower portions have a width, W2, with the laminations increasing in width up to, for example, width, W1, for the upper portions of laminations. Cross-section view 2720 can lie in a plane that is perpendicular to the axis of rotation, but it need not (e.g., the cross-section can be perpendicular to the direction of flux generated in a coil region and in the direction of AT flux-generated). In some embodiments, an axial portion 2760 includes, for example, one or more laminations having a width W1 in a plane perpendicular to the axis of rotation at a radial distance 2796 (e.g., an average radial distance of the radial distances for each of the laminations associated with axial portion 2760) from a reference line 2799 (e.g., the axis of rotation), and an axial portion 2762 can include one or more laminations having a width W2 can be located at a radial distance 794 (e.g., an average radial distance of the radial distances for each of the laminations associated with axial portion 2762). Note that in the example shown, radial distance 2796 is greater than radial distance 2794. Further, note that axial portion 2760 has an axial length 2790 extending between two pole faces 2714a and 2714b at approximately at radial distance 2796, and axial portion 2762 has an axial length extending between the two pole faces at approximately radial distance 2794, where axial length 2790 is less than the axial length at radial distance 2794. This can facilitate a reduction in losses that otherwise might accompany longer laminations. Note that widths W1 and W2 can represent average widths of laminations or flux conductors in the respective axial portions.

Figure 28:
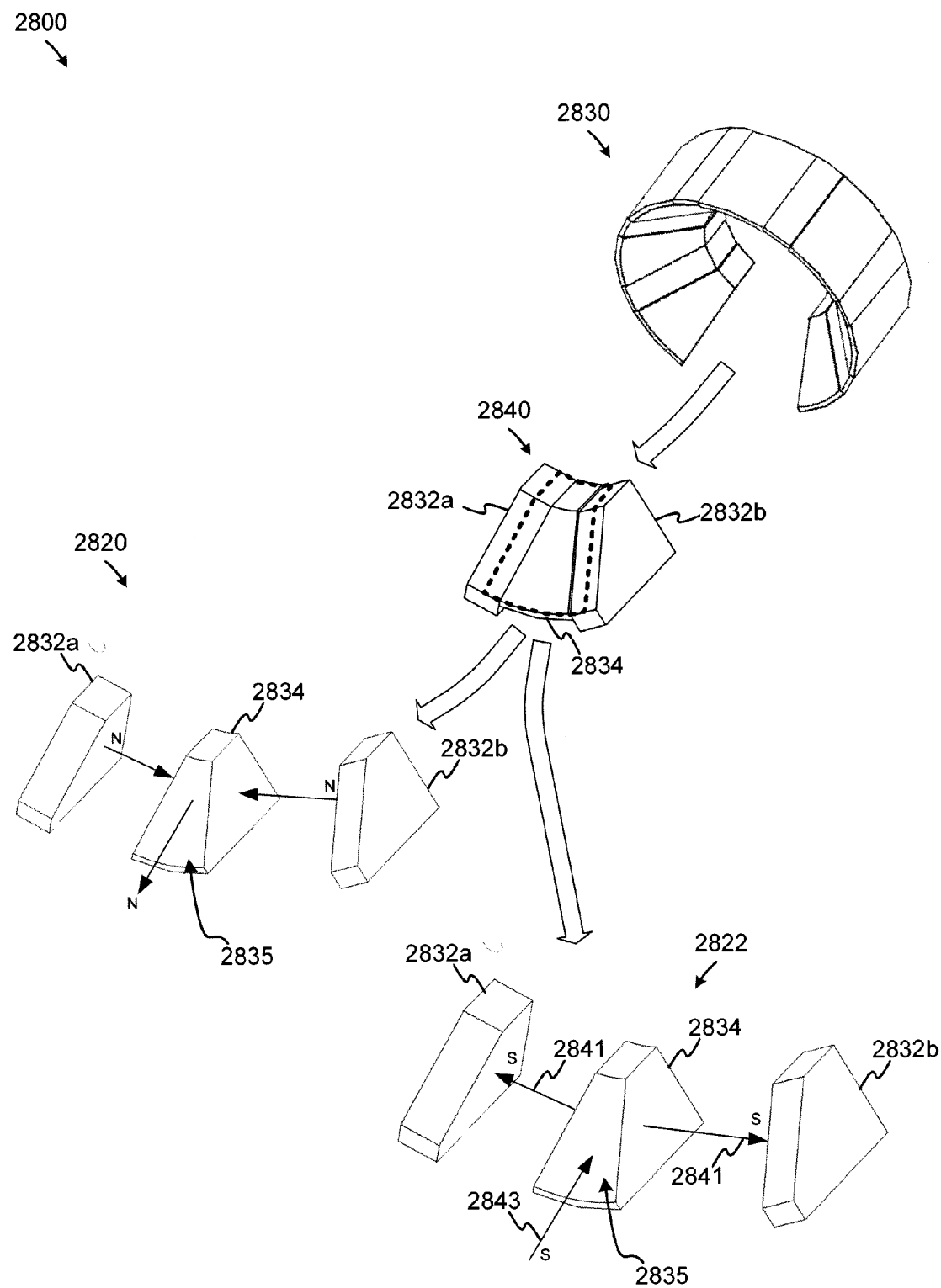
FIG. 28 depicts a magnetic region of a rotor assembly as either a north pole or a south pole, according to some embodiments.

FIG. 28 depicts a magnetic region of a rotor assembly as either a north pole or a south pole, according to some embodiments. Diagram 2800 depicts a magnetic region 2840 of a rotor assembly 2830, with magnetic region 2840 (e.g., as shown by the dashed line) including magnets 2832a and 2832b and magnetically permeable material 2834. Magnetic region 2840 can be configured as either a north pole 2820 or a south pole 2822. North pole 2820 can be implemented as magnetically permeable material 2834 with or without magnets 2832a and 2832b. As shown, magnets 2832a and 2832b can be polarized such that their north poles are oriented toward or substantially toward the sides of magnetically permeable structure 2834. In some embodiments, the polarization of magnets 2832a and 2832b can be in a direction substantially orthogonal to a line extending axially between two pole faces of the same field pole member. As shown, the surfaces of magnets 2832a and 2832b can be polarized as north poles and the flux therefrom enters magnetically permeable material 2834 in a manner that surface 2835 is a north pole (or is substantially a north pole) for rotor assembly 2830. Or, south pole 2822 can be implemented as magnetically permeable material 2834 with or without magnets 2832a and 2832b, with magnets 2832a and 2832b having their south poles oriented toward or substantially toward the sides of magnetically permeable structure 2834. In some embodiments, the polarization of magnets 2832a and 2832b can be in a circumferential direction, which is substantially orthogonal to a line extending axially between two pole faces of the same field pole member (not shown). For example, the directions of polarization 2841 can be substantially orthogonal to a line 2843 extending axially between two pole faces of the same field pole member. As shown, the surfaces of magnets 2832a and 2832b can be polarized as south poles, whereby the flux enters magnetically permeable material 2834 through surface 2835 in a manner that surface 2835 is a south pole (or is substantially a south pole) for rotor assembly 2830.

Figure 29A:
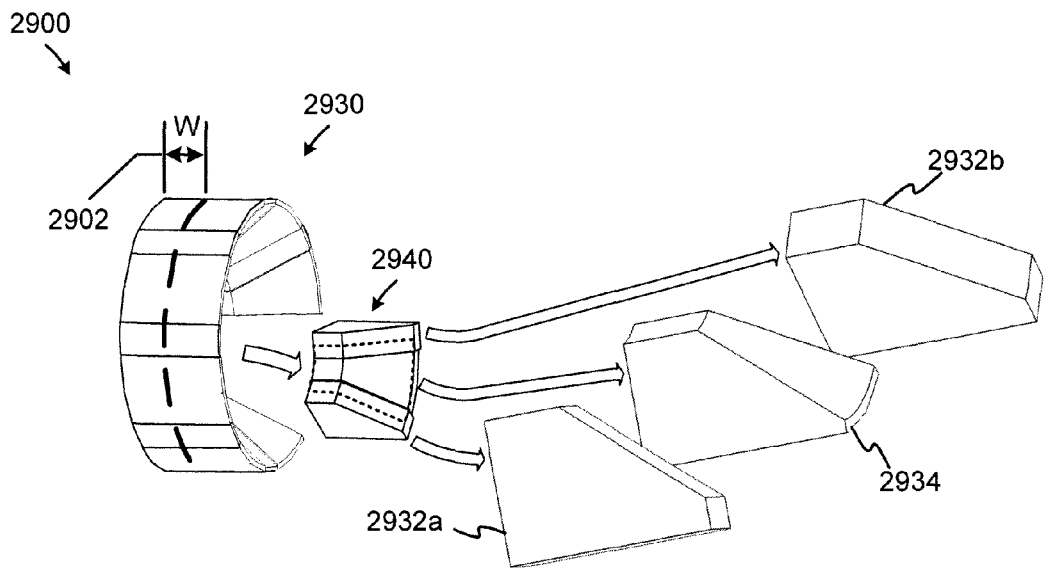
FIGS. 29A to 29C depict implementations of a magnet and magnetically permeable material to form a magnetic region of a rotor assembly, according to some embodiments.
Figure 29B:
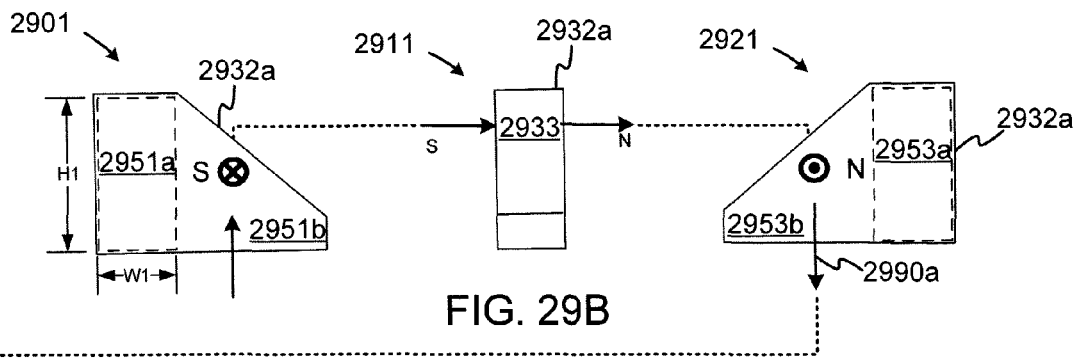
Figure 29C:
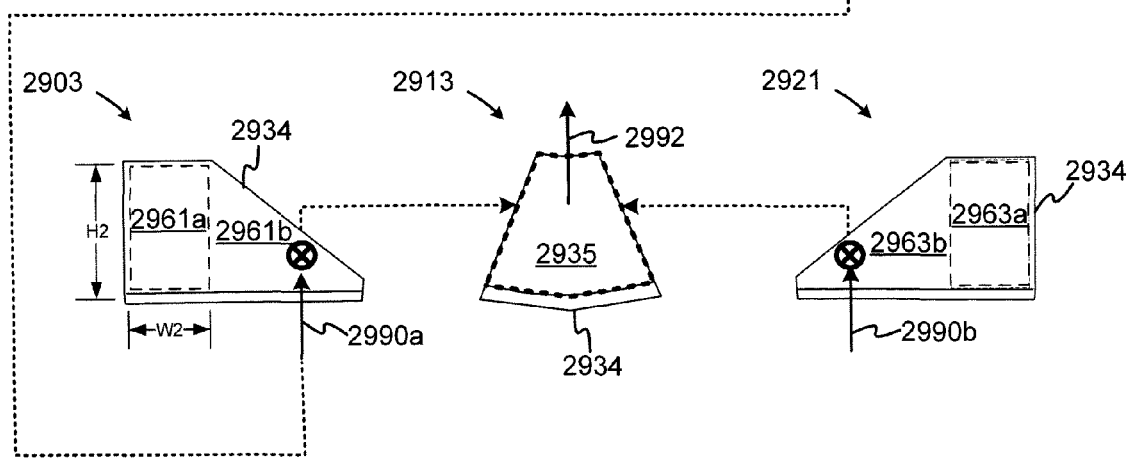

FIGS. 29A to 29C depict implementations of a magnet and magnetically permeable material to form a magnetic region of a rotor magnet or rotor assembly, according to some embodiments. Diagram 2900 of FIG. 29A depicts a magnetic region 2940 of a rotor assembly 2930, with magnetic region 2940 including magnets 2932a and 2932b and magnetically permeable material 2934. In some embodiments, the magnetic material in rotor assembly 2930 has a portion ("W") 2902 of an axial length dimension that is configurable to modify an amount of flux density passing through at least the surface of magnetically permeable structure 2934.

FIG. 29B illustrates various views of a magnet 2932a, according to an embodiment. View 2901 is a side view of magnet 2932a showing a side that is polarized as a south pole ("S"). As shown, magnet 2932a has a side portion 2951b configured as a south pole in which flux enters. Further, magnet 1332a also includes an axial extension area 2951a that can be configured to increase an amount of flux passing through the surface of magnetically permeable structure 2934. The amount of flux can be varied by modifying either the width, W1, or the height, H1, or both, of axial extension area 2951a. As such, an axial extension area can be configured to increase an amount of flux passing through the surface of magnetically permeable structure 2934. View 2911 depicts a front view of surface 2933 configured to confront a pole face, according to an embodiment. As shown, magnet 2932a has a surface polarized in one direction (e.g., as a north pole), and another surface polarized in direction indicative of a south pole. View 2921 is a side view of magnet 2932a showing a side that is polarized as a north pole ("N"). As shown, magnet 1332a has a side portion 2953b configured as a north pole in which flux emanates. Further, magnet 1332a also includes an axial extension area 2953a that can be configured to increase an amount of flux passing through the surface of magnetically permeable structure 2934. The amount of flux can be varied by modifying either the width, W1, or the height, H1, or both, of axial extension area 2953a or axial extension area 2951a of view 2901, both of which may be the same area. Flux 2990a can emanate normal to surface portion 2953b as shown.

FIG. 29C illustrates various views of magnetically permeable material 2934, according to an embodiment. View 2903 is a side view of magnetically permeable material 2934 showing a side of magnetically permeable material 2934 that is configured to be disposed adjacent a side of magnet 2932a to receive flux 2990a from a north pole associated with side portion 2953b of FIG. 13B. In this view, magnetically permeable material 2934 includes a side portion 2961b configured to be adjacent to side portion 2953b of FIG. 29B and an axial extension area 1361a that is configured to be adjacent to axial extension area 2953a. Axial extension area 2961a includes a width, W2, or the height, H2, that can be modified (as can axial extension areas 2951a and 2953a) to enhance the flux density passing through the surface of magnetically permeable material 2934 to implement a magnet pole. Similarly, view 2921 is another side view of magnetically permeable material 2934 showing another side that also is configured to be disposed adjacent another side portion of a magnet not shown to receive flux 2990b from another north pole (e.g., from magnet 2932b). In this side view 2921, magnetically permeable material 2934 includes a side portion 2963b configured to be adjacent to another side portion and another axial extension area of another magnet not shown. View 2913 depicts a front view of surface 2935 configured to confront a pole face, according to an embodiment. As shown, magnetically permeable material 2934 has a surface 2935 configured to operate as a pole, such as a north pole, to provide flux 2992, the flux originating from magnets adjacent to the sides shown in views 2903 and 2921. In some embodiments, the surface of magnetically permeable structure 2934 is configured to include a greater density of flux than a surface of magnet 2932a or magnet 2932b. In various embodiments, the areas of the sides of magnet 2932a and magnet 2932b are collectively greater than the surface area of surface 2935.

Figure 29D:
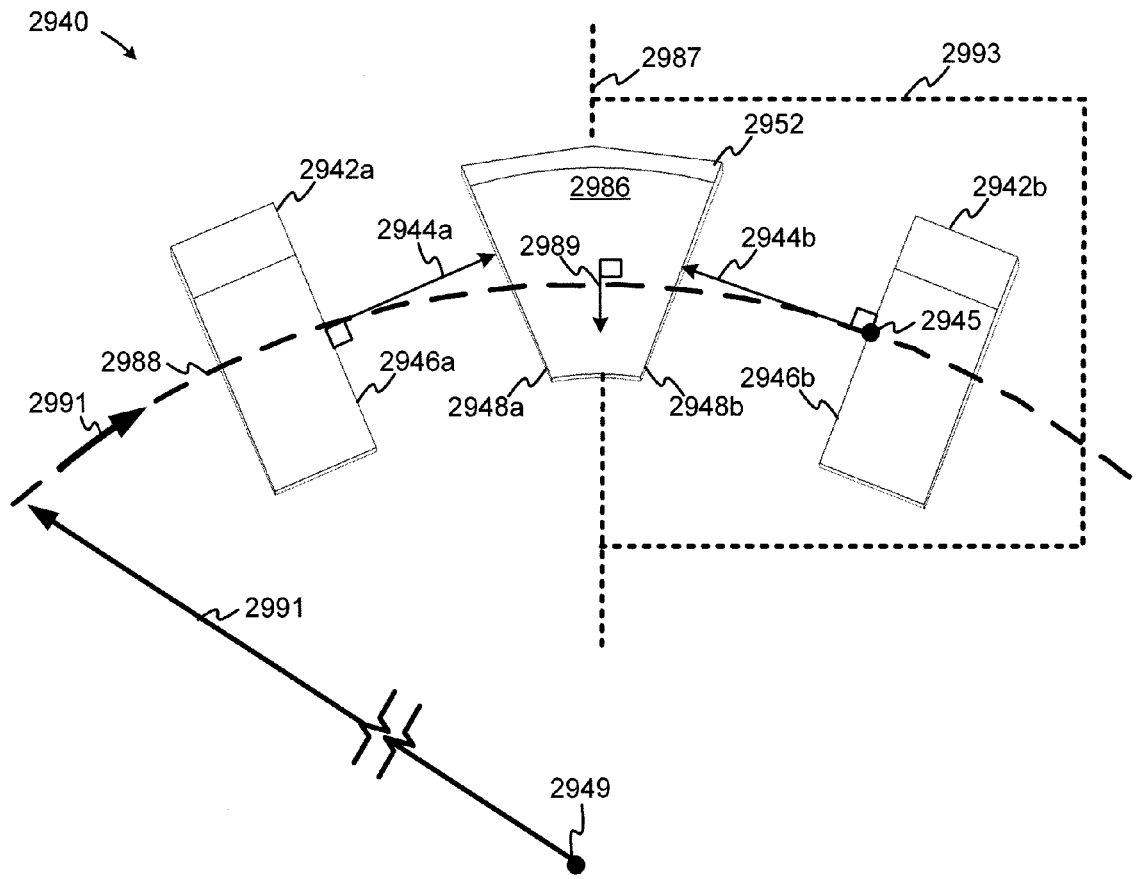
FIGS. 29D to 29E depict examples of various directions of polarization and orientations of surfaces for magnets and magnetically permeable material that form a magnetic region of a rotor assembly, according to some embodiments.
Figure 29E:
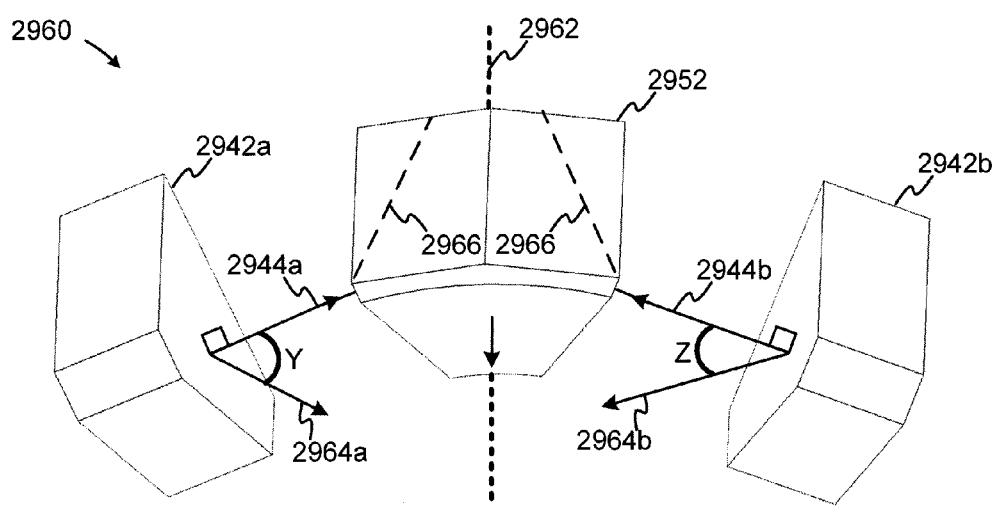

FIGS. 29D to 29E depict examples of various directions of polarization and orientations of surfaces of magnets and magnetically permeable material that form a magnetic region of a rotor magnet or rotor assembly, according to some embodiments. Diagram 2940 of FIG. 29D depicts a front view of magnets 2942a and 2942b, and magnetically permeable material 2952 arranged radially about a centerline 2949. In at least some embodiments the directions of polarization are normal to the surfaces of either magnet surfaces or the surfaces of the magnetically permeable material, or both. In some embodiments, rays 2944a and 2944b can represent the directions of polarization for magnets 2942a and 2942b. For example, a direction of polarization can be represented by ray 2944b extending from a point 2945 (in space or relative to magnet surface), which can lie on a circle centered on a centerline (e.g., the axis of rotation). A portion 2988 of the centered circle is shown in dashed lines. The direction of polarization can be oriented tangent to the circle in a plane centered on the centerline to produce flux in a circumferential direction. Thus, rays 2944a and 2944b can represent the directions of polarization for magnets 2942a and 2942b relative to the magnet surfaces 2946a and 2946b. Directions of polarization for magnets 2942a and 2942b give rise to flux path portions representing flux passing circumferentially (i.e., the flux passes along a path circumscribed by a circle portion 2988 at a radial distance 2991 from centerline 2949). Thus, magnets 2942a and 2942b can be configured to generate magnet flux along a circumferential flux path portion. According to some embodiments, magnets 2942a and 2942b are magnetized such that the directions of polarization for magnets 2942a and 2942b are normal to the surfaces 2946a and 2946b, the normal vectors depicting the orientation of the surfaces 2946a and 2946b as represented by rays 2944a and 2944b. But magnets 2942a and 2942b can be magnetized such that the directions of polarization for magnets 2942a and 2942b can be at an angle to the surfaces 2946a and 2946b (i.e., at an angle to a normal or a normal vector representing the direction of the surfaces of the magnets). According to some embodiments, a direction of polarization for a magnetic material, such as that in magnet 2942b, can lie in a first plane 2993 perpendicular or substantially perpendicular to a second plane (e.g., plane 2987) including centerline 2949 and a normal vector 2989 emanating from a point on confronting surface 1386 of magnetically permeable material 2952, whereby second plane 1387 radially bisects magnetically permeable material 2952. Confronting surface 2986 is configured to confront a pole face of a field pole member.

In some embodiments, portions of the flux paths can be directed substantially between a first point of entry into (or exit from) a magnet and a second point of exit from (or entry to) the magnet. Thus, the portions of flux paths may be relatively straight (but need not be) within the magnetic material. For example, flux can pass substantially straight through a magnetic material such that it exits (or enters) the magnetic material corresponding to a direction of polarization. In some embodiments, portions of the flux path can originate from either surface 2946a or 2946b. Flux can pass into magnetically permeable material 2952, with its direction being altered such that it exits a surface of magnetically permeable material 29352 along, for example, a non-straight or curved flux path portion. In some examples, the flux path or flux path portions in magnetically permeable material 2952 can include non-straight portions between a surface of magnetically permeable material 2952 adjacent to a magnet and a surface of magnetically permeable material 2952 adjacent a pole face.

In some embodiments, rays 2944a and 2944b can represent the directions of flux paths (or flux path portions) between a magnet and a magnetically permeable material. For example, rays 2944a and 2944b can represent a portion of a flux path at or near the interface between the magnet and the magnetically permeable material. In some embodiments, rays 2944a and 2944b can be coextensive with flux paths (or flux path portions) passing through an interface between a magnet and a magnetically permeable material. Note that the depiction of flux paths as rays 2944a and 2944b in FIGS. 29D and 29E is not intended to be limiting. For example, flux paths (or portions thereof) represented by rays 2944a and 2944b can be at any angle in any direction between a magnet and a magnetically permeable material (other than 0 degrees from or parallel to a plane including a centerline 2949 and the magnet surface) and may include straight portions and/or curved portions. While magnet surfaces 2946a and 2946b and surfaces 2948a and 2948b are depicted as being coextensive with planes parallel to centerline 2949, these surfaces are not intended to be limiting. Surfaces 2946a and 2946b and surfaces 2948a and 2948b can be coextensive with planes that are at non-zero angles to centerline 2949.

Diagram 2960 of FIG. 29E depicts a perspective view of magnets 2942a and 2942b and magnetically permeable material 2952 arranged radially about a centerline 2962. Thus, rays 2964a and 2964b can represent the directions of polarization for magnets 2942a and 942b and/or general directions of flux paths relative to (e.g., at angles Y and Z) the rays 964a and 2964b, which represent either normal vectors to magnet surfaces or a tangent to a circle centered on centerline 2949 and passing through a point in space, such as point 2945 of FIG. 29D. Angles Y and Z can represent any angle ranging from 0 to 65 degrees from rays 2964a and 2964b (i.e., 90 to 25 degrees from a magnet surface). According to some embodiments, the term "substantially perpendicular," when used to describe, for example, a direction of polarization, can refer to a range of angles from a line portion, such as a normal vector, that is 90 degrees to at least a portion of a magnet surface. Or the range of angles can be referenced from the flux path formed between the surface of magnetically permeable material and a pole face. In one example, a range of angles can include any angle from 0 to 65 degrees relative to a normal vector (i.e., 90 to 25 degrees from a magnet surface portion). In some embodiments, surfaces 2946a and 2946b and surfaces 2948a and 2948b of FIG. 29D can be coextensive with planes that are at angles to centerline 2962 (or a plane including centerline 2962). For example, FIG. 29E depicts that the sides or surfaces of magnetically permeable material 2952 can be configured as surfaces 2966, which are coextensive with planes (not shown) at angles to centerline 2962. Surface 2966 can increase the surface area of the sides of magnetically permeable material 2952, and may enhance the amount of flux passing through the surface of magnetically permeable material 2952 that is configured to confront pole faces. According to various embodiments, directions of polarization and/or flux path portions may or may not vary from the directions of surfaces 2946a and 2946b of magnets or magnetic material and/or or surfaces 2948a and 2948b of magnetically permeable material. Further, directions of surfaces 2946a and 2946b of magnets or magnetic material and/or or surfaces 2948a and 2948b of magnetically permeable material may or may not be flat and/or may or may not be oriented in planes that at an angle to a plane including the axis of rotation. According to some embodiments, the term "substantially normal," when used to describe, for example, a direction of orientation for a magnet surface, can refer to a range of angles from a line that is 90 degrees to a tangent plane having at least a point on the magnet surface. Examples of angles in the range of angles include any angle from 0 to 65 degrees relative to a normal vector.

Figure 30:
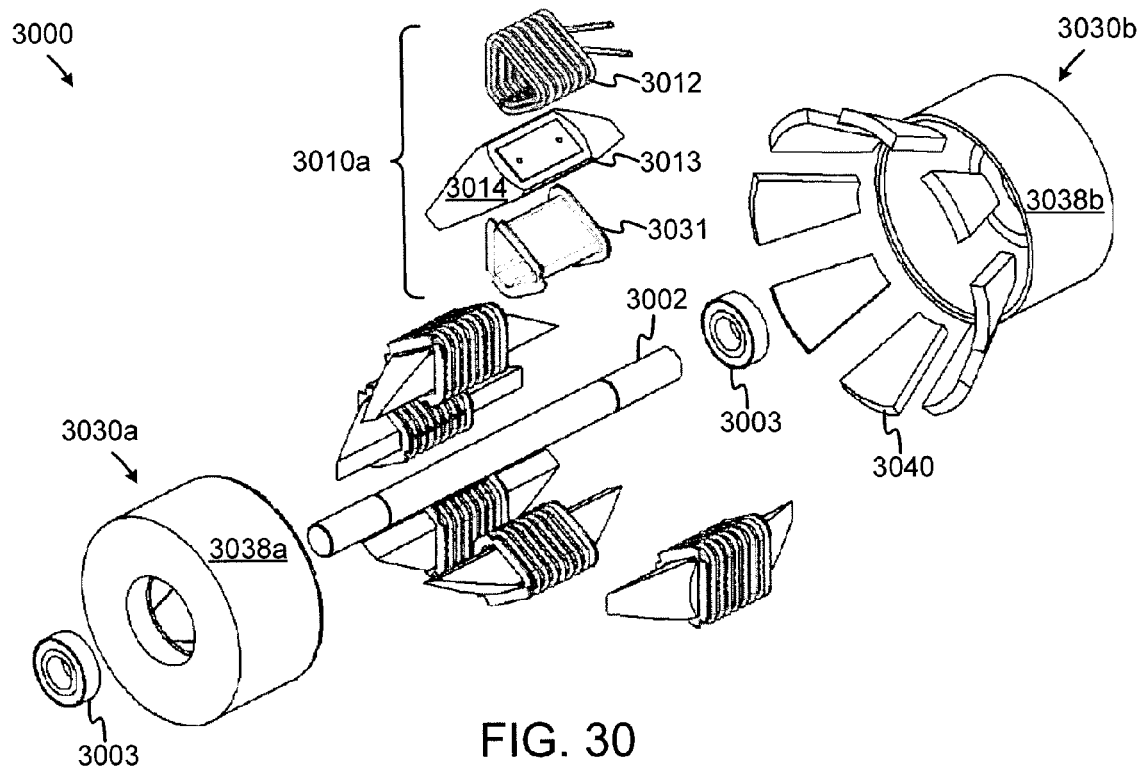
FIG. 30 is an exploded view of a rotor-stator structure including rotor assemblies in accordance with some embodiments.

FIG. 30 is an exploded view of a rotor-stator structure 3000 including rotor assemblies in accordance with some embodiments. FIG. 30 depicts a rotor assembly including at least two rotor assemblies 3030a and 3030b mounted on or affixed to a shaft 3002 such that each of rotor assemblies 3030a and 3030b are disposed on an axis of rotation that can be defined by, for example, shaft 3002. A stator assembly can include active field pole members 3110a arranged about the axis. An active field pole member 3010a can include a coil 3012, a field pole member 3013 having pole faces 3014, and a bobbin 3015. A subset of pole faces 3014 of active field pole members 3010a can be positioned to confront the arrangement of magnetic regions 3040 in rotor assemblies 3030a and 030b to establish air gaps. In some embodiments, magnetic regions 3040 can represent one or more surface magnets. Rotor assemblies 3030a and 3030b can respectively include support structure 3038a and support structure 3038b. Further, bearings 3003 can be disposed within an axial length between the ends of rotor assemblies 3030a and 3030b of rotor-stator structure 3000.

Figure 31:
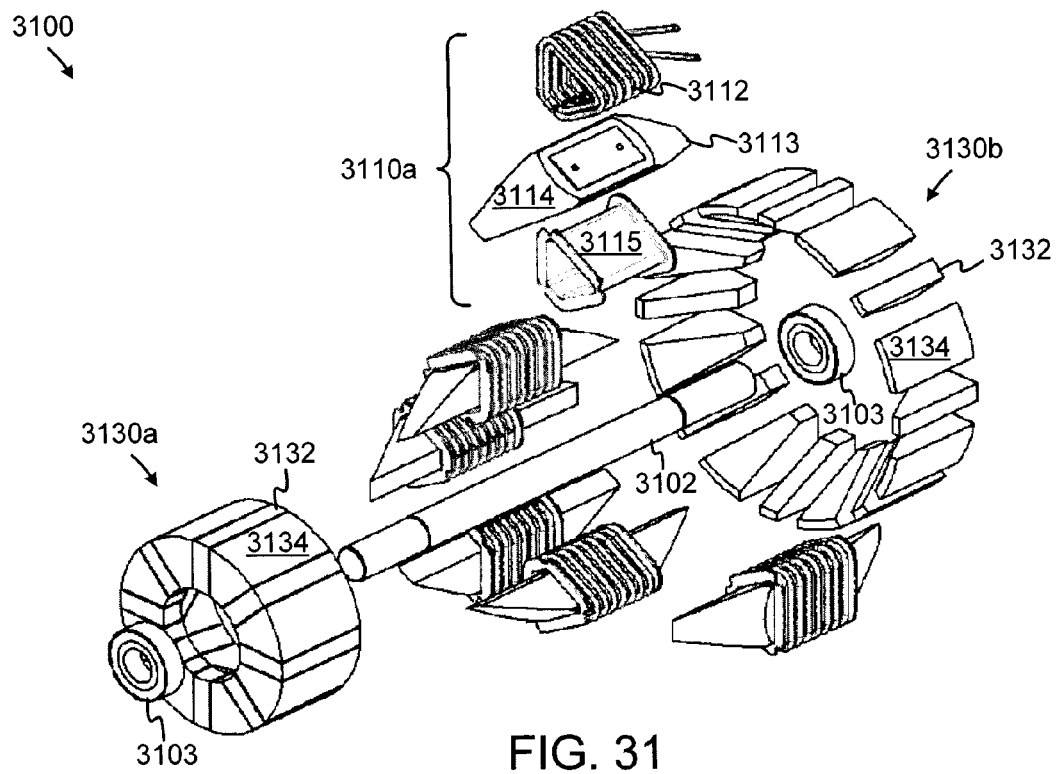
FIG. 31 is an exploded view of a rotor-stator structure including rotor assemblies in accordance with some embodiments.

FIG. 31 is an exploded view of a rotor-stator structure 3100 including rotor assemblies in accordance with some embodiments. FIG. 31 depicts a rotor assembly including at least two rotor assemblies 3130a and 3130b mounted on or affixed to a shaft 3102 such that each of rotor assemblies 3130a and 3130b are disposed on an axis of rotation that can be defined by, for example, shaft 3102. A stator assembly can include active field pole members 3110a arranged about the axis. An active field pole member 3110a can include a coil 3112, a field pole member 3113 having pole faces 3114, and a bobbin 3115. A subset of pole faces 3114 of active field pole members 3110a can be positioned to confront the arrangement of magnetic regions including magnets 3132 and magnetically permeable structures 3134 in rotor assemblies 3130a and 130b to establish air gaps. Further, bearings 3103 can be disposed within an axial length between the ends of rotor assemblies 3130a and 3130b of rotor-stator structure 3100.

FIG. 32 is an exploded view of a rotor-stator structure 3200 including inner rotor assemblies in accordance with some embodiments. FIG. 32 depicts a rotor assembly including at least two inner rotor assemblies 3230a and 3230b mounted on or affixed to a shaft 3202 such that each of inner rotor assemblies 3230a and 3230b are disposed on an axis of rotation that can be defined by, for example, shaft 3202. FIG. 32 depicts boundaries 3203 of conically-shaped spaces in which magnetic regions 3290 are disposed. Pole faces 3214 are disposed or arranged outside boundaries 3203 of conically-shaped spaces. Thus, magnetic regions 3290 are coextensive with an interior surface of a cone, whereas pole faces 3214 are coextensive with an exterior surface of a cone). A stator assembly 3240 can include active field pole members 3210a, 3210b, and 3210c arranged about the axis. An active field pole member 1610a can include a coil 3212 and pole faces 3214 formed at the ends of field pole member 1611a. A subset of pole faces 3214 of active field pole members 3210 can be positioned to confront the arrangement of magnetic regions 1690 that can either include surface magnets (e.g., magnetic material, including permanent magnets) and/or can include a combination of magnetic material (e.g., including permanent magnets) and magnetically permeable structures as internal permanent magnets ("IPMs") in rotor assemblies 3230a and 3230b to establish air gaps. Rotor assemblies 3230a and 3230b can respectively include support structure 3238a and support structure 3238b.

Figure 33:
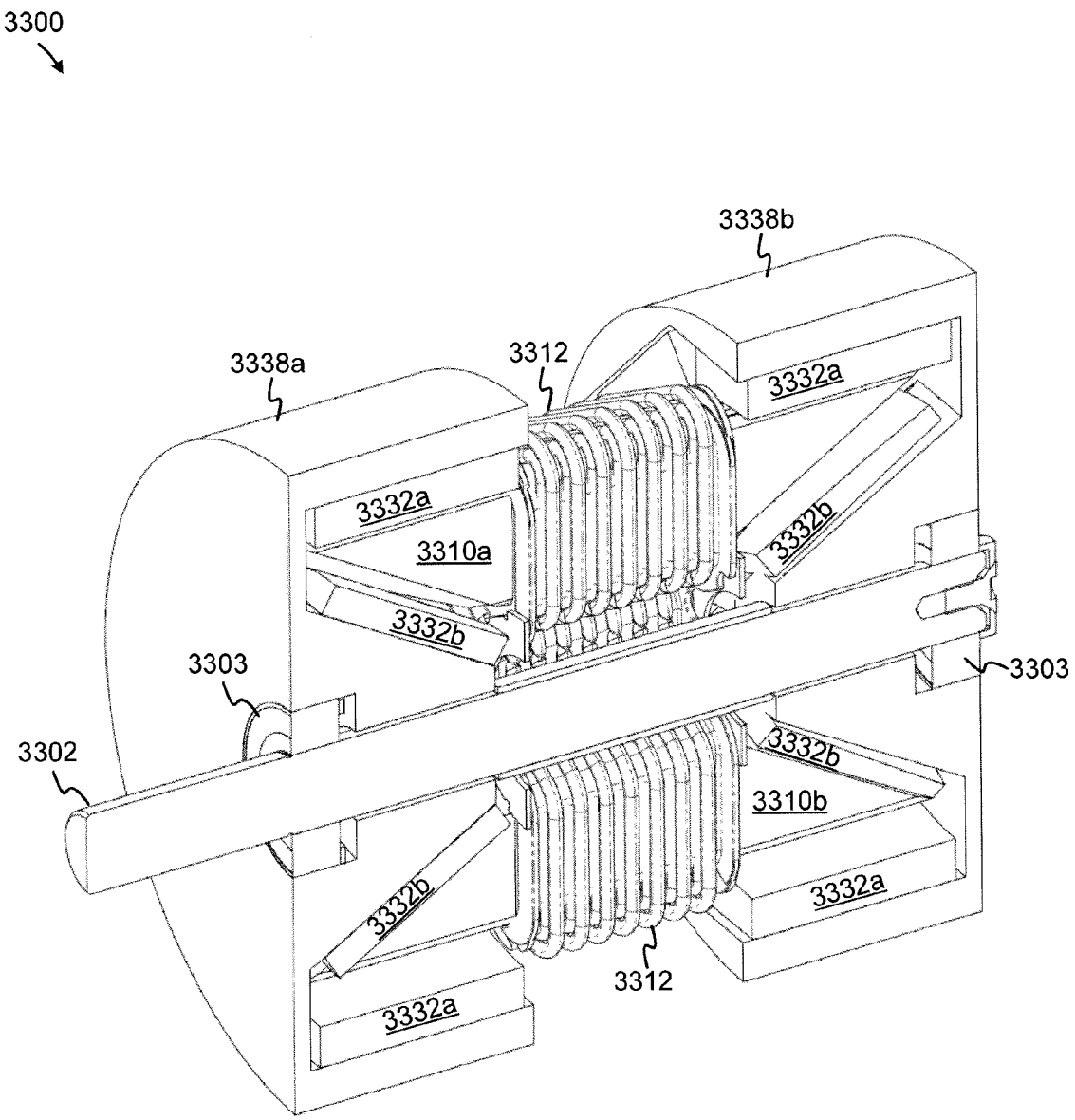
FIG. 33 is a cross-section view of a rotor-stator structure including both outer and inner rotor assemblies in accordance with some embodiments.

FIG. 33 is a cross-section view of a rotor-stator structure including both outer and inner rotor assemblies in accordance with some embodiments. A rotor assembly including at least two rotor assemblies 3338a and 3338b mounted on or affixed to a shaft 3302 such that each of inner rotor assemblies includes magnetic regions 3332b that are disposed on an axis of rotation that can be defined by, for example, shaft 3302. Further, rotor assemblies 3338a and 3338b can also include magnetic regions 3332a of outer rotor assemblies. A stator assembly can include active field pole members 3310a and 3310b arranged about the axis, both of which include coils 3312. A subset of pole faces of active field pole members 3310 can be positioned to confront the arrangement of magnetic regions 3332a and 3332b that can either include surface magnets or can include magnets and magnetically permeable structures as internal permanent magnets in rotor assemblies 3338a and 3338b to establish air gaps. Rotor assemblies 3338a and 3338b can respectively include support structures and bearings 3303.

Figure 34A:
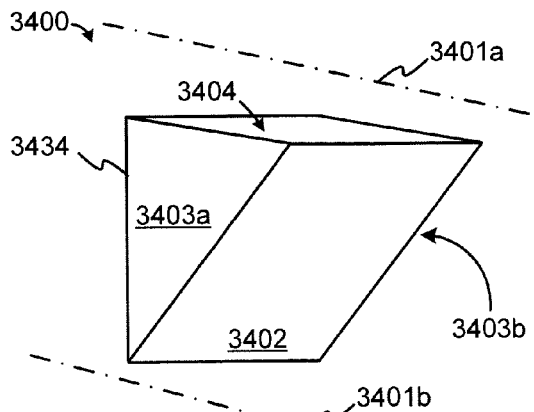
FIGS. 34A to 34G depict various views of an example of a magnetically permeable structure (and surfaces thereof) with various structures of magnetic material, according to some embodiments.
Figure 34B:
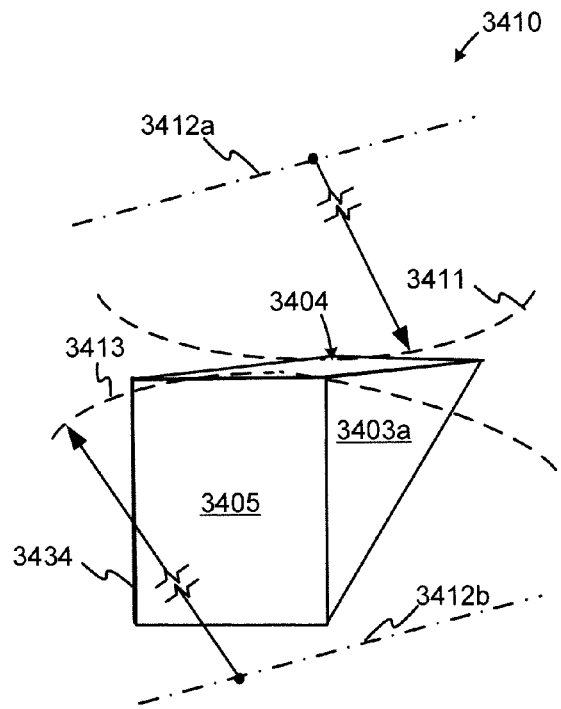
Figure 34C:
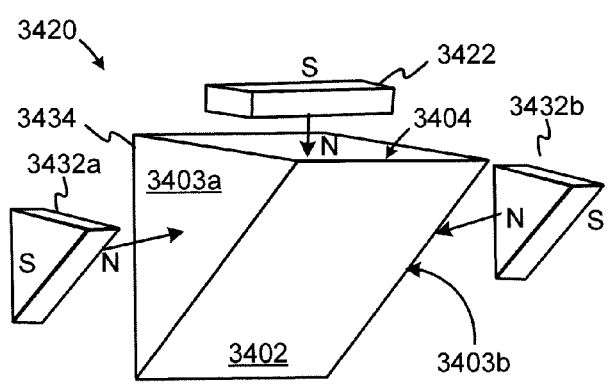

FIGS. 34A to 34D depict various views of an example of a magnetically permeable structure (and surfaces thereof) with various structures of magnetic material, according to some embodiments. FIG. 34A is a front perspective view 3400 of an example of a magnetically permeable structure 3434 configured for use in inner and outer rotor assemblies. Magnetically permeable structure 3434 includes one or more confronting surfaces and a number of non-confronting surfaces. A "confronting surface" of a magnetically permeable structure is, for example, a surface configured to confront or face an air gap, a pole face, a field pole member, a stator assembly, or the like, whereas a "non-confronting surface" of a magnetically permeable structure is, for example, a surface configured to confront or face structures other than a pole face, according to various embodiments. A "non-confronting surface" can be configured to face or confront magnetic material. In the example shown, magnetically permeable structure 3434 includes a confronting surface 3402 and a number of non-confronting surfaces 3403a, 3403b, and 3404. Magnetic material can be disposed adjacent surfaces 3403a and 3403b, whereby the magnetic material can be polarized in a direction into (or out from) surfaces 3403a and 3403b. Therefore, non-confronting surfaces 3403a and 3403b can include or can be on a flux path portion of a flux path passing through field pole members (not shown), magnetically permeable structure 3434, and the magnetic material adjacent to non-confronting surfaces 3403a and 3403b. Non-confronting surface 3404 can be referred to as a "radial non-confronting surface," as its surface area is disposed generally at a radial distance. Note that magnetically permeable structure 3434 can be configured to form magnetic regions in either inner or outer rotor assemblies. For example, if magnetically permeable structure 3434 is implemented in an outer rotor assembly, then magnetically permeable structure 3434 rotates about an axis 3401b, whereas if magnetically permeable structure 3434 is implemented in an inner rotor assembly, then magnetically permeable structure 3434 rotates about an axis 3401a.

FIG. 34B is a rear perspective view 3410 of an example of magnetically permeable structure 3434 including an axial non-confronting surface for either inner or outer rotor assemblies, according to one embodiment. As shown, magnetically permeable structure 3434 includes a non-confronting surface 3405 that can be referred to as an "axial non-confronting surface." Note that if magnetically permeable structure 3434 is implemented in an outer rotor assembly, then magnetically permeable structure 3434 rotates along circle 3413 about an axis 3412b, whereas if magnetically permeable structure 3434 is implemented in an inner rotor assembly, then magnetically permeable structure 3434 rotates on circle 3411 about an axis 3412a.

FIG. 34C is a front perspective view 3420 of an example of an arrangement of a magnetically permeable structure 3434 and magnetic structures, according to one embodiment. As shown, a subset of magnetic structures including magnetic material, such as magnetic structures 3432a and 3432b, are disposed adjacent to non-confronting surfaces 1803a and 1803b, respectively. The flux produce by magnetic structures 3432a and 1832b (e.g., permanent magnets) is directed to magnetically permeable structure 3434, which, in turn, can pass through confronting surface 3402 to a pole face (not shown). For purposes of illustration, consider that FIG. 34A depicts magnetically permeable structure 3434 being implemented as magnetically permeable structure 3434a of rotor assembly 3430a, and magnetic structures 3432a and 3432b of FIG. 34C are implemented as 2432d and 2432b, respectively, of FIG. 24A. As shown, magnetic structures 2432b and 2432d lie in or on flux path portions 2491b and 2491c, respectively, (or shorter portions of flux path portions 2491b and 2491c). Flux path portions 2491b and 2491c extends between rotor assemblies 2430a and 830b. The non-confronting surfaces of magnetically permeable structure 2434a adjacent magnetic structures 2432b and 2432d also can be on or in the flux path portions 2491b and 2491c (or shorter portions thereof). Flux path portions 2491b and 2491c (and 891a) of FIG. 24A can be described as principal flux path portions as the predominant amount of flux passes along these flux path portions, according to some embodiments. As is discussed below, other flux paths can be implemented to intercept flux path portions 2491b and 2491c (and 2491a) to, among other things, provide additional flux to that associated with the principal flux path portions.

Referring back to FIG. 34C, supplementary magnetic material is disposed adjacent to non-confronting surfaces of magnetically permeable structure 3434 to enhance the flux of flux paths having portions passing through magnetic structures 3432a and 3432b and confronting surface 3402. In the example shown, a magnetic structure 3422 (e.g., a permanent magnet) is disposed adjacent non-confronting surface 3404, whereby the direction of polarization for magnetic structure 3422 is directed into (or out of) non-confronting surface 3404. As such, magnetic structure 3422 can provide additional flux to enhance the flux passing through confronting surface 3402.

Figure 34D:
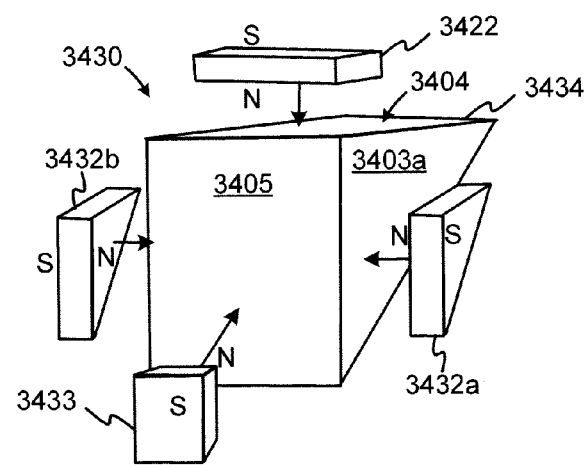

FIG. 34D is a rear perspective view 3430 of an example of the arrangement depicted in FIG. 34C, according to some embodiments. Additional supplementary magnetic material is disposed adjacent to non-confronting surface 3405 of magnetically permeable structure 3434 to enhance the flux of flux paths having portions passing through magnetic structures 3432a and 3432b and confronting surface 3402. As shown, a magnetic structure 3433 (e.g., a permanent magnet) is disposed adjacent non-confronting surface 3405, whereby the direction of polarization for magnetic structure 3433 is directed into (or out of) non-confronting surface 3405. As such, magnetic structure 3433 can provide additional flux to enhance the flux passing through confronting surface 3402.

Figure 34E:
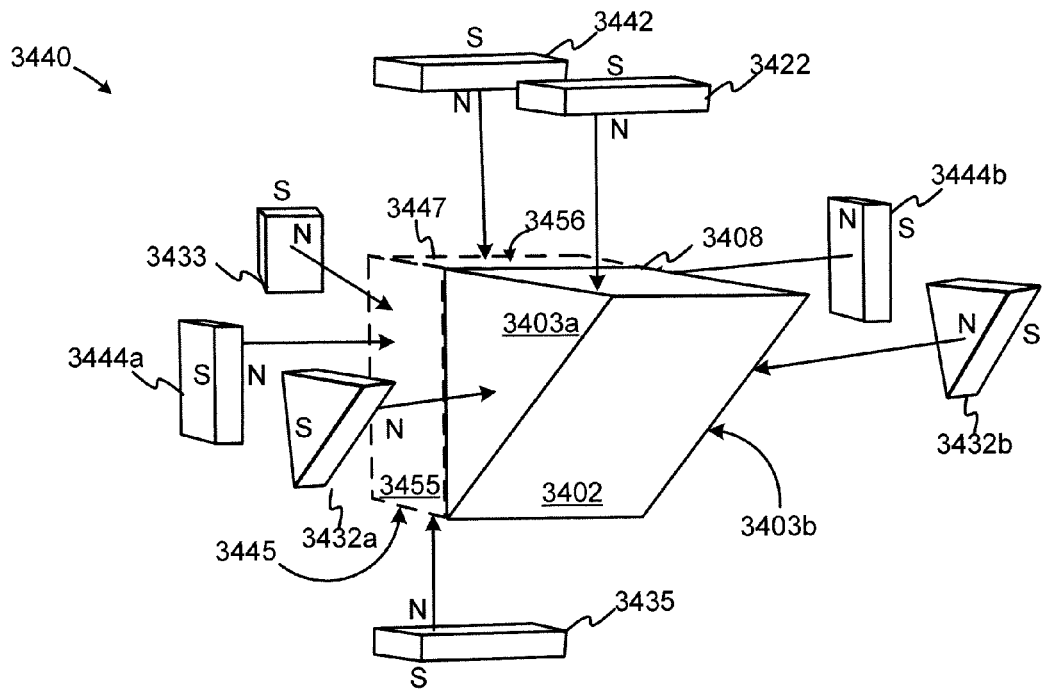

FIG. 34E is a front perspective view 3440 of an example of a magnetically permeable structure including an extension portion 3445, according to some embodiments. A magnetically permeable structure 3408 includes an extension portion 3447 to vary an amount of flux passing through confronting surface 3402, whereby the amount of flux can be varied by modifying a dimension of magnetically permeable structure 3408 along the axis (i.e., in an axial direction). Extension portion 3447 provides for additional surface area of non-confronting surfaces, and can be composed of material similar to that of the magnetically permeable material. For example, additional surface area 3455 is provided so that supplementary magnetic material, such as magnetic structure 3444a, can be disposed adjacent to additional surface area 3455 (another magnetic structure 3444b can also be disposed adjacent to additional surface area not shown). The supplementary magnetic material can provide for enhanced amounts of flux being passed through confronting surfaces 3402. Therefore, the additional surface area and supplementary magnetic material can be added optionally to enhance the flux produced by the magnetic region including confronting surface 3402.

Extension portion 3447 can also provide additional surface area 3456 so that supplementary magnetic material, such as magnetic structure 3442, can be disposed adjacent to additional surface area 456 to enhance the flux passing through confronting surface 3402. Further, extension portion 3447 can also provide additional surface area 3445 so that yet other supplementary magnetic material, such as magnetic structure 435, can be disposed adjacent to additional surface area 3445 to enhance the flux. In some embodiments, magnetic structures 3442 and 3435 can be referred to as radial boost magnets, whereas magnetic structure 3433 can be referred to as an axial boost magnet. A radial boost magnet can produce flux parallel to or along a radial direction relative to an axis, according to some embodiments. For example, a radial boost magnet can produce flux perpendicular to (or substantial perpendicular to) an axis of rotation. An axial boost magnet can produce flux parallel to or along an axial direction, according to some embodiments. For example, an axial boost magnet can produce flux parallel to (or substantial parallel to) an axis of rotation. In various embodiments, one or more of magnetic structures 3433, 3435, 3442, 3444a, and 3444b can be optional. More or fewer surfaces and/or magnetic structures can be implemented. For example, any of magnetic structures 3442, 3444a, and 3444b can be formed as part of respective magnetic structures 3422, 3432a, and 3432b to form unitary magnetic structures (e.g., magnetic structures 3422 and 3442 can be formed as a single magnet). Note that magnetic structures and a magnetically permeable structure depicted in FIGS. 34A to 34E are not limited to those shapes shown and are not limited to flat surfaces. Note that boost magnets can be made from the same magnet material or different magnet material that is disposed between magnetically permeable material in the rotor assemblies. Further, boost magnets can have the same or different surface area dimensions as the adjacent surfaces of magnetic permeable material.

Figure 34F:
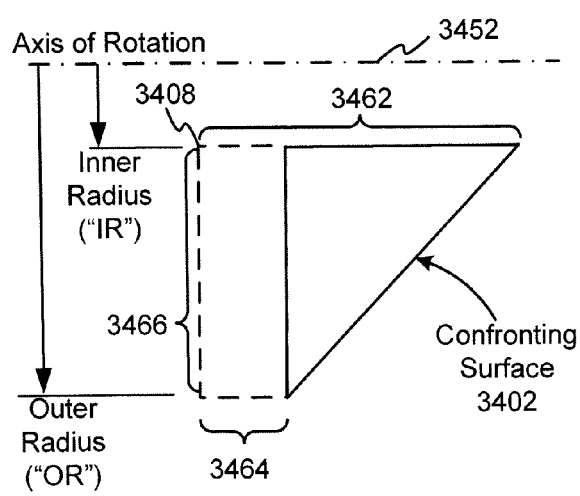
Figure 34G:
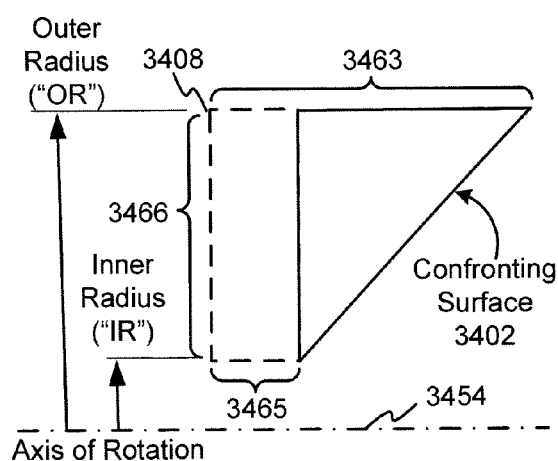

FIGS. 34F and 34G are side views of an example of magnetically permeable structure and various axes of rotations, according to some embodiments. FIG. 34F is a side view of a magnetically permeable structure 3408 oriented relative to an axis of rotation 3452. As confronting surface 3402 is oriented to face away from axis of rotation 3452, magnetically permeable structure 1808 is implemented in an inner rotor assembly. In an inner rotor assembly, a radial surface 3462 (i.e., a radial non-confronting surface) is disposed at an inner radius ("IR") dimension, whereas a radial surface 3464 is disposed at an outer radius ("OR") dimension. Non-confronting surface 3466 is an axial non-confronting surface. FIG. 34G is a side view of a magnetically permeable structure 1808 oriented relative to an axis of rotation 3454. As confronting surface 3402 is oriented to face toward axis of rotation 3454, magnetically permeable structure 408 is implemented in an outer rotor assembly. In an outer rotor assembly, a radial surface 3465 (i.e., a radial non-confronting surface) is disposed at an inner radius ("IR") dimension, whereas a radial surface 3463 is disposed at an outer radius ("OR") dimension. Non-confronting surface 3466 is an axial non-confronting surface. Radial surfaces 3462, 3463, 3464, and 3465 are oriented to extend generally along the axis of rotation, whereas axial surface 3466 is oriented to extend generally along one or more radii.

Figure 35A:
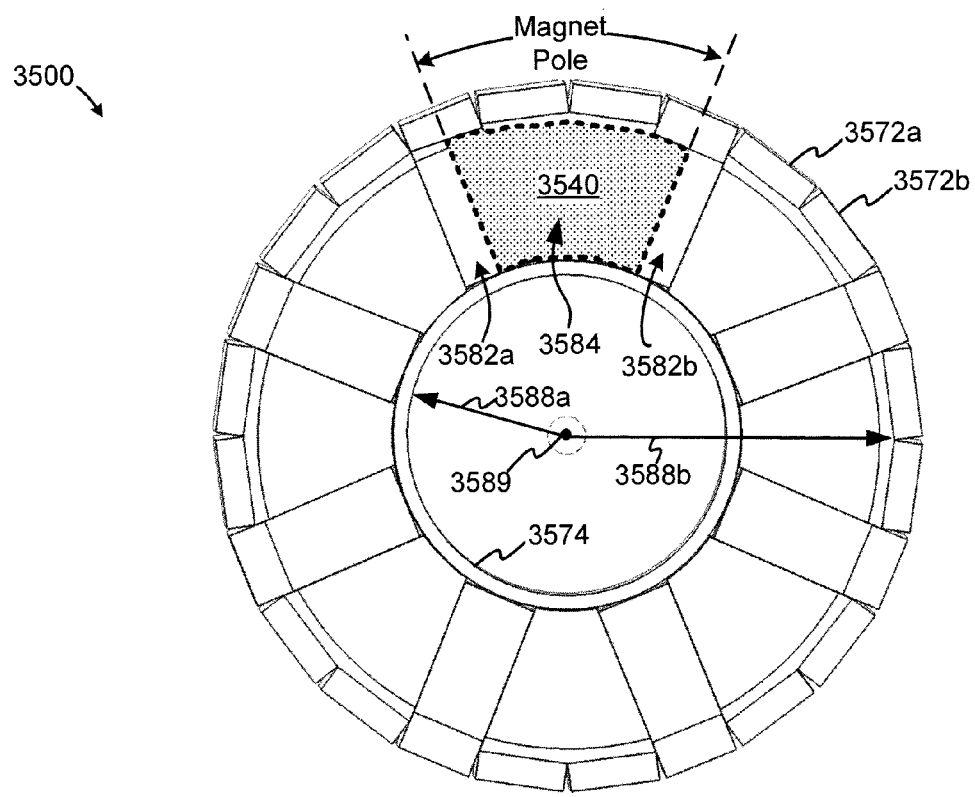
FIGS. 35A to 35D depict various views of an example of an outer rotor assembly, according to some embodiments.

FIGS. 35A to 35D depict various views of an example of an outer rotor assembly, according to some embodiments. FIG. 35A is a front view of an outer rotor assembly 3500. Outer rotor assembly 3500 includes magnetic material 3582a and 3582b (or structures thereof, such as magnets) and magnetically permeable material 3584 arranged about a centerline 3589, the combination of which form magnetic regions, such as magnetic region 3540. Outer rotor assembly 3500 also includes boost magnets disposed adjacent to one or more non-confronting surfaces of magnetically permeable material 3584. As used herein, the term "boost magnet" can refer, at least in some embodiments, to magnets disposed at or adjacent a surface of magnetically permeable material to enhance or "boost" the flux exchanged between a confronting surface of the magnetically permeable material and a pole face of a field pole member. A boost magnet can be disposed external to the flux paths (or flux path portions) passing through magnetically permeable material 584 and magnetic material 3582a and 3582b (e.g., external to the principal flux paths). The boost magnet produces flux for enhancing the amount of flux passing through the air gaps, which, in turn, enhances torque production. As shown, outer rotor assembly 3500 includes boost magnets disposed radially (e.g., at a radial distance from centerline 3589), such as at an inner radius or an outer radius. In some examples, magnetic material can be disposed at an outer radial dimension ("OR") 3588b as one or more outer radial boost magnets. As shown, outer rotor assembly 3500 includes boost magnets 3572a and 3572b. While boost magnets 3572a and 3572b are depicted as having square or rectangular cross-sections, boost magnets are not so limited and can be formed with one or more magnets having various cross-sectional shapes. In another example, a boost magnet can be disposed at an inner radial dimension ("IR") 3588a. A magnetic material can be disposed at inner radial dimension 3588a as one or more inner radial boost magnets. In FIG. 35A, the boost magnet at the inner radial dimension 3588a is composed of inner radial boost magnet 3574 disposed adjacent a surface of magnetically permeable material 3584 located at inner radial dimension 3588a. In some examples, inner radial boost magnet 3574 can be a monolithic structure with alternating regions of "north" and "south" polarities, or can be composed of separate magnetic structures integrated to form inner radial boost magnet 3574.

Figure 35B:
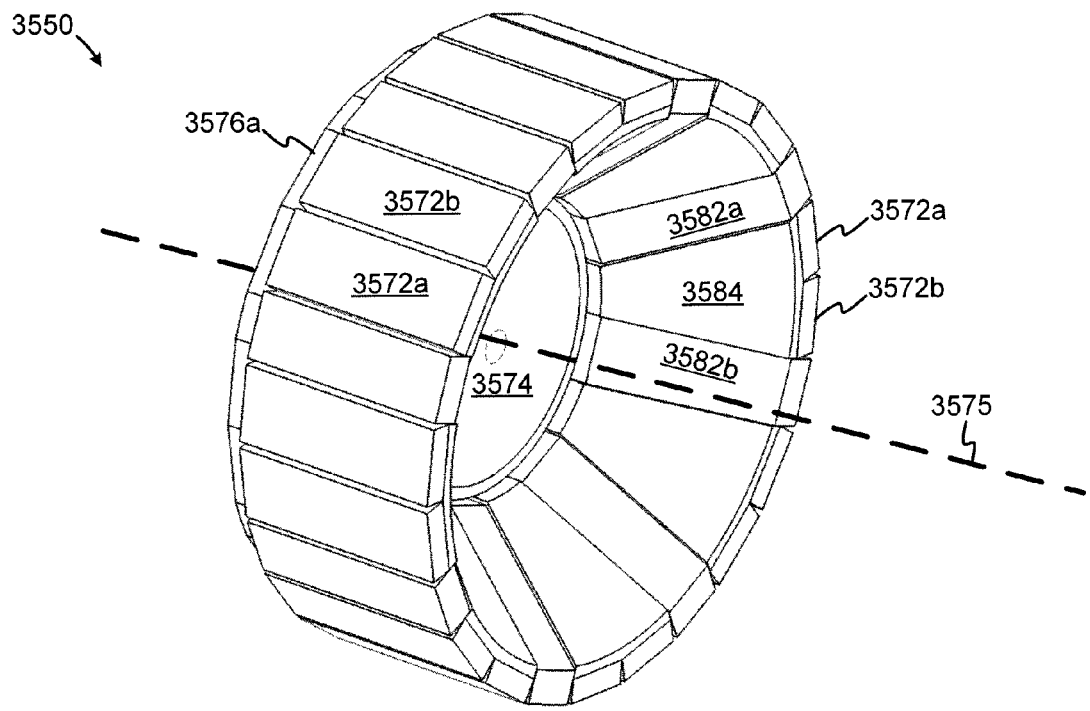

FIG. 35B is a front perspective view of an outer rotor assembly 3550 implementing outer radial boost magnets 3572a and 3572b, as well as inner radial boost magnet(s) 3574, according to some embodiments. Further, one or more boost magnet(s) can be located at or adjacent other surfaces of magnetically permeable material 3584, such as the rear surface(s) of magnetically permeable material 1984. As shown, a boost magnet structure 3576a is disposed adjacent the rear surfaces of magnetically permeable material 3584. Boost magnet structure 3576a is configured to modify (e.g., increase) the amount of flux passing through magnetic region 3540 of FIG. 35A. Note that any outer radial boost magnets 3572a and 3572b, inner radial boost magnet 3574, and axial boost magnet structure 3576a can be optional and may be omitted. Note, too, that the one or more of the boost magnets of FIGS. 35A and 35B can include magnetic material and other material to produce flux.

Figure 35C:
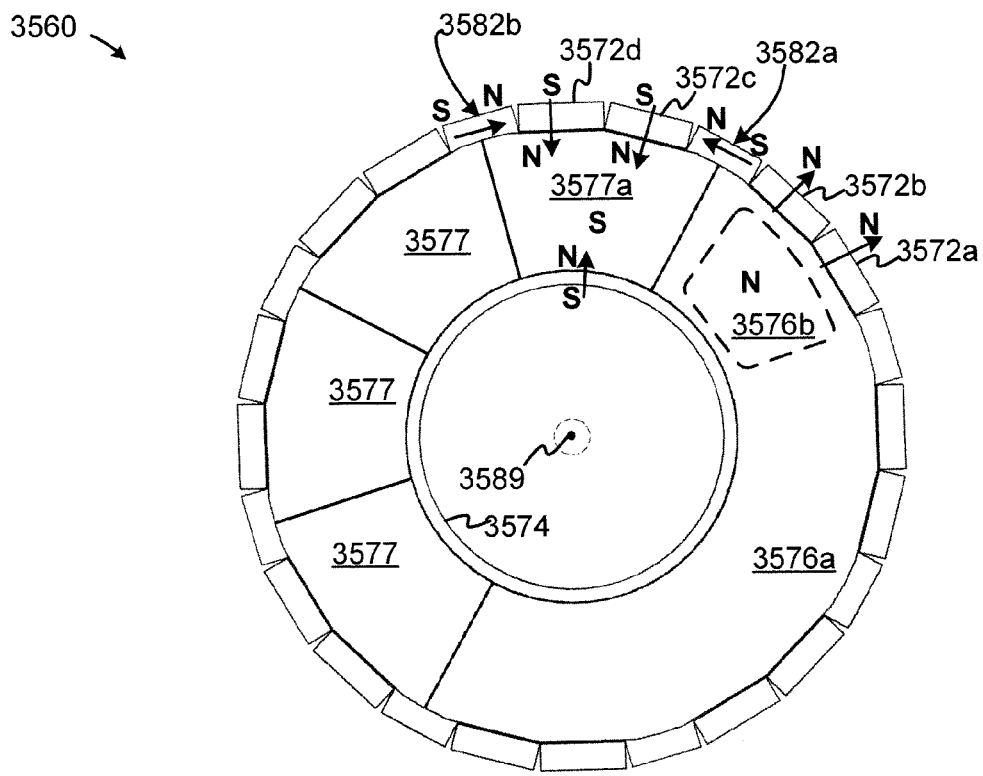

FIG. 35C is a rear view of an outer rotor assembly 3560 illustrating boost magnets 3572a and 3572b, boost magnet(s) 3574, and various examples of boost magnet structures 3576a, according to some embodiments. In various embodiments, boost magnet structure(s) 3576a can be composed of one or more entities configured to provide magnetic material having varied directions of polarization. In some examples, boost magnet structure(s) 3576a can be a monolithic structure including different regions of polarity, such as region 3576b, to provide flux in a direction generally along centerline 3589. As shown, two boost magnet structure(s) 3576a can be used, whereby boost magnet structure 3576a represents one-half of the rear view of an outer rotor assembly 3560 (the other one-half is not shown). In some examples, a boost magnet structure 3576a can be composed of separates structures 3577, each of which includes different regions of polarity to provide the flux along centerline 3589. As shown, four boost magnets 3577 (including 3577a) can be implemented in lieu of a boost magnet structure such as boost magnet structure 3576a. The four boost magnets 3577 represent one-half of the rear view of outer rotor assembly 3560 (the other four boost magnets 3577 representing the other half are not shown). Further, the boost magnet 3577a is depicted as having a direction of polarization, in the rear view, as a south ("S") magnet pole. The direction of polarization of boost magnet 3577a is such that a north ("N") magnet pole (see FIG. 35D) extends from the other side (i.e., the front side) of boost magnet 3577a. FIG. 35C also depicts a direction of polarization of inner radial boost magnet 3574 (i.e., from south ("S") to north ("N"), directed inwardly toward centerline 3589. FIG. 35C also depicts directions of polarization of outer radial boost magnets 3572c and 3572d. Magnets 3582a and 3582b include magnetic material having directions of polarization that are generally tangential (or substantially tangential) to a circle (not shown) about centerline 1989. Directions of polarization of outer radial boost magnets 3572a and 3572b are shown as being from south ("S") to north ("N"), directed outwardly away from centerline 3589. In view of, for example, the polarization directions of magnets 3582a and 3582b, and of other magnets, a space behind the surface of boost magnet 3577a is configured to provide a north magnet pole and a space behind the surface of region 3576b is configured to provide a south magnet pole.

Figure 35D:
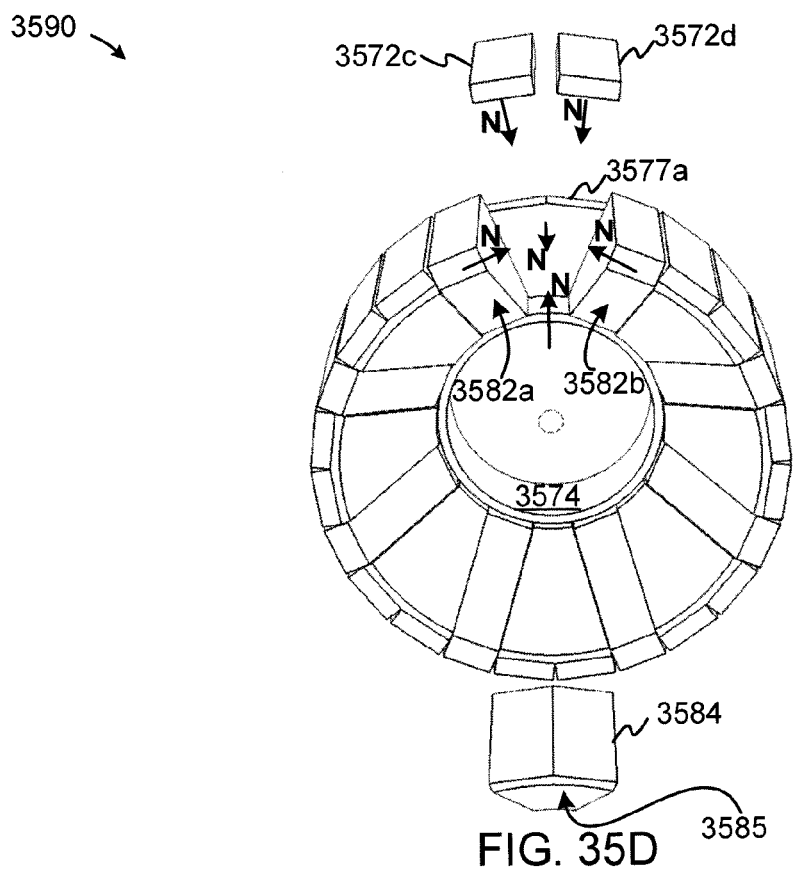

FIG. 35D a front, perspective view of an example of an outer rotor assembly 1990 illustrating directions of polarization to form and/or enhance a magnetic region, according to some embodiments. FIG. 35D depicts the directions of polarization for forming flux paths (or flux path portions) as well as other flux paths (or other flux path portions) configured to enhance the flux associated with the flux paths. For example, magnets 3582a and 3582b include directions of polarization such that magnets 3582a and 3582b magnetically cooperate to form a north ("N") magnet pole. As such, confronting surface 3585 of magnetically permeable material 3584 forms a magnetic region (or a portion thereof) as a north magnet pole. Outer radial boost magnets 3572c and 3572d can generate flux directed along a north ("N") direction of polarization into magnetically permeable material 3584 at or approximate to an outer radial dimension. Inner radial boost magnet 3574 can generate flux directed along a north ("N") direction of polarization into magnetically permeable material 3584. Axial boost magnet 3577a can generate flux directed along a north ("N") direction of polarization into magnetically permeable material 3584 at or approximate to an inner radial dimension. Therefore, magnetic material associated with outer radial boost magnets 3572c and 3572d, inner radial boost magnet 1974, and axial boost magnet 1977a can produce flux to enhance the flux passing on flux paths or flux path portions in a manner that flux per unit surface area of confronting surface 1985 is enhanced.

Figure 36:
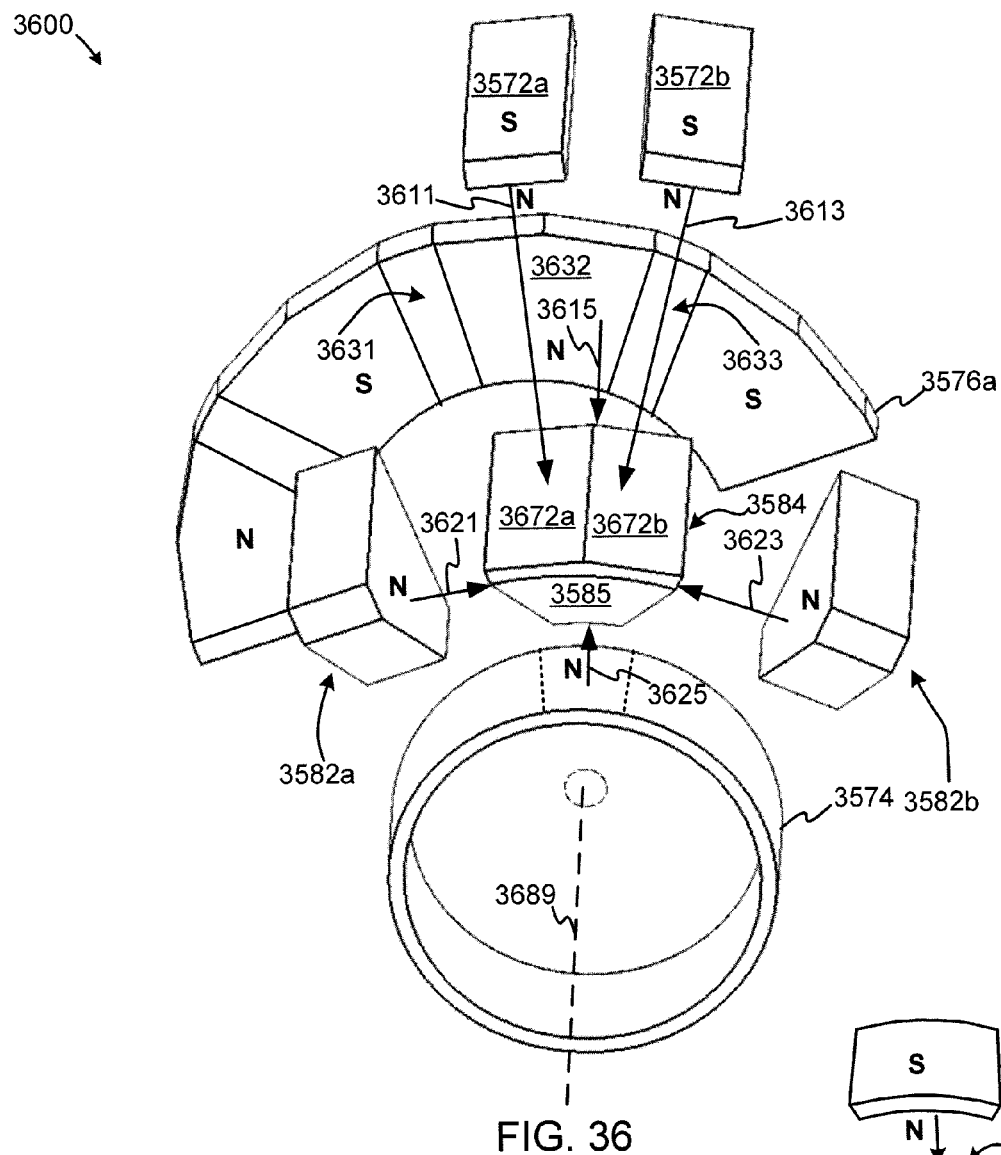
FIG. 36 depicts an exploded, front perspective view of a portion of an outer rotor assembly, according to some embodiments.

FIG. 36 depicts an exploded, front perspective view of a portion of an outer rotor assembly, according to some embodiments. Outer rotor assembly 3600 is shown to include flux paths or flux path portions contributing to the flux passing through magnetic regions that include, for example, magnets 3582a and 3582b and magnetically permeable material 3584 arranged about a centerline 3689. Magnets 3582a and 3582b are shown to generate flux path portions 3621 and 3623, respectively, to magnetically couple with non-confronting surfaces of magnetically permeable material 3584 that are on a flux path (e.g., a principal flux path) passing through the air gaps (not shown). Magnets 3582a and 3582b include surfaces that are disposed adjacent portions 3631 and 3633, respectively, of axial boost magnet structure 3576a when assembled. Outer boost magnets 3572a and 3572b can generate flux path portions 3611 and 3613 to magnetically couple with surfaces 2072a and 2072b, respectively, of magnetically permeable material 3584. Inner boost magnet 3574 is configured to generate flux path portion 3625 to magnetically couple with a surface of magnetically permeable material 3584. Further, axial boost magnet structure 3576a includes a surface area 3632 of magnetic material having a direction of polarization configured to generate a flux path portion 2015 to magnetically couple with a rear non-confronting surface of magnetically permeable material 3584. In various embodiments, flux path portions 3611, 3613, 3615, and 3625 intersect, but lie external to (or off of), flux paths or flux path portions that pass through magnets 3582a and 3582b. The flux associated with flux path portions 3611, 3613, 3615, and 3625 is provided to enhance the flux passing through confronting surfaces 3585.

Note that flux in magnetically permeable material 3584 from the one or more boost magnets can be additive through superposition. In some embodiments, the boost magnets are configured to reduce flux leakage. Outer radial boost magnets 3572a and 3572b can generate magnetic field potentials vectorially directed as shown by rays 3611 and 3613 in FIG. 36 to magnetically couple with surfaces 3672a and 3672b, respectively, of magnetically permeable material 3584. Inner radial boost magnet(s) 3574 can be configured to generate magnetic field potential vectorially directed as shown by ray 3625 to magnetically couple with a surface of magnetically permeable material 3584. Further, axial boost magnet structure 3576a includes a surface area 3632 of magnetic material that can generate magnetic field potential vectorially directed as shown by ray 3615 to magnetically couple with a rear non-confronting surface of magnetically permeable material 3584. In various embodiments, the magnetic field potentials illustrated by rays 3611, 3613, 3615 and 3625 can facilitate the restriction of flux path portions 3621 and 3623 in magnetically permeable material 3584 to the principal flux path passing through the air gaps. Such magnetic field potentials are disposed outside the principal flux paths but do enhance the flux passing through confronting surfaces 3585. In view of the foregoing, the boost magnets can operate to enhance flux by providing optimal magnetic return paths than otherwise might be the case. For example, boost magnets can provide a magnetic return path that has a lower reluctance than otherwise might be the case (e.g., through air, a motor case, or any other external entity). A reduction in reluctance improves the amount of available flux.

Figure 37:
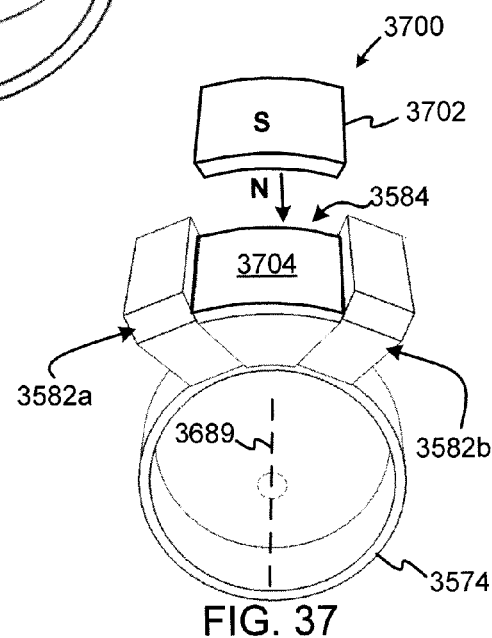
FIG. 37 depicts a portion of an exploded, front perspective view of another outer rotor assembly, according to some embodiments.

FIG. 37 depicts a portion of an exploded, front perspective view of another outer rotor assembly, according to some embodiments. Outer rotor assembly 3700 is shown to include another implementation of a radial boost magnet. As shown, radial boost magnet 3702 includes one or more surfaces that are curved, such as, a curved surface polarized as a south ("S") magnet pole and another curved surface polarized as a north ("N") magnet pole. One or more of these surfaces can be coextensive with an arc or a circle (not shown) centered on centerline 3689. Magnetically permeable material 3584 is disposed between magnets 3582a and 3582b, and radially from inner boost magnet structure 3574. In this example, a non-confronting surface 3704 of magnetically permeable material 3584 is configured to be coextensive with a surface of radial boost magnet 3702.

Figure 38A:
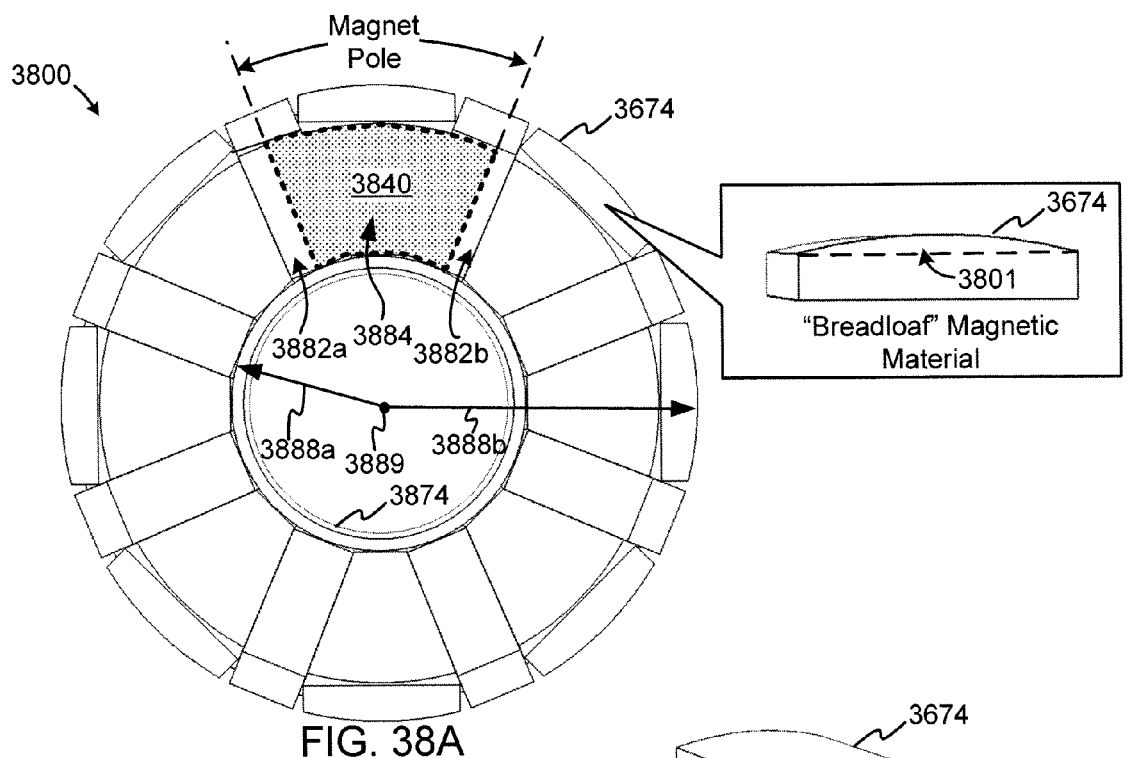
FIGS. 38A to 38D depict various views of another example of an outer rotor assembly, according to some embodiments.

FIGS. 38A to 38D depict various views of another example of an outer rotor assembly, according to some embodiments. FIG. 38A is a front view of an outer rotor assembly 3800. Outer rotor assembly 3800 includes magnetic material 3882a and 3882b (or structures thereof, such as magnets) and magnetically permeable material 3884 arranged about a centerline 3889, the combination of which form magnetic regions, such as magnetic region 3840. Outer rotor assembly 3800 also includes boost magnets disposed adjacent to radial surfaces of magnetically permeable material 3884. As shown, outer rotor assembly 3800 includes boost magnets disposed radially at an outer radius (i.e., at or adjacent an outer radial dimension ("OR") 3888b) as outer radial boost magnets 3674. In this example, an outer radial boost magnet 3674 is a "breadloaf"-shaped magnetic structure (i.e., a breadloaf magnet). Breadloaf magnet 3674 includes a first surface that is flat (or relatively flat) and a second surface that is curved (or relatively curved), whereby the second surface is located at a greater radial distance from centerline 3889 than the first surface. In various examples, the second surface is coextensive with an arc or a circle (not shown) at a specific radial distance from centerline 3889, such as outer radial dimension ("OR") 3888b. Breadloaf magnet 3674 provides for fewer singular structures that may constitute a boost magnet (e.g., breadloaf magnet 3674 can replace two or more boost magnets having rectangular cross sections), thereby simplify manufacturing of outer rotor assembly 3800, among other things. Also, breadloaf magnet 3674 provides for additional magnetic material 3801 over a boost magnet having a rectangular cross-section, thereby providing for an increased capacity for producing more flux, among other things. Further to FIG. 38A, a boost magnet structure can be disposed at or adjacent an inner radial dimension ("IR") 3888a as an inner radial boost magnet 3874.

Figure 38B:
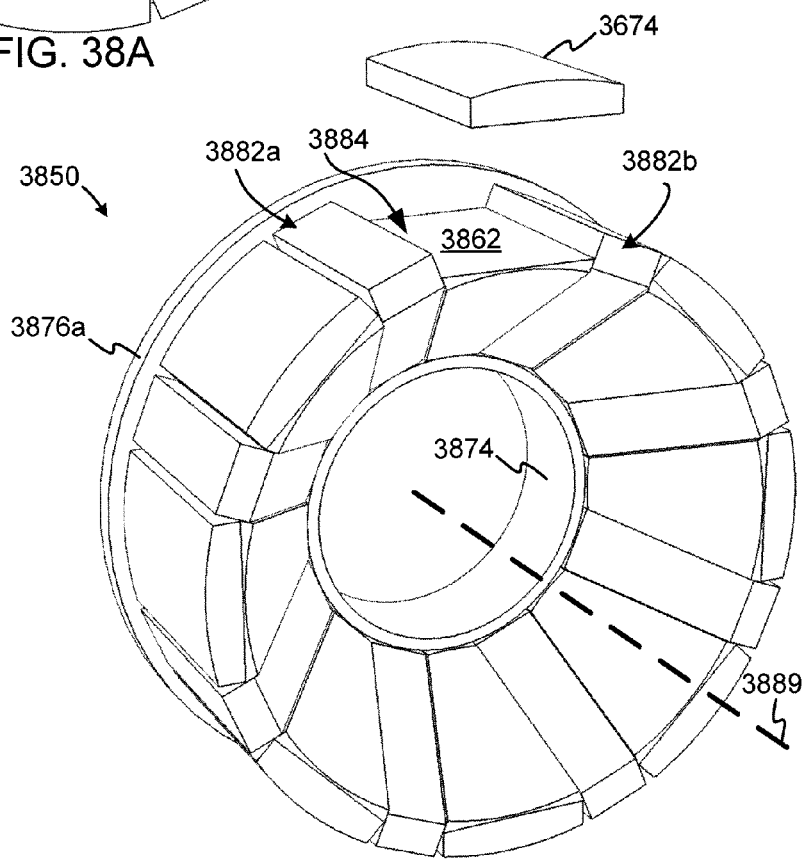

FIG. 38B is a front perspective view of an outer rotor assembly 3850 illustrating outer radial boost magnets and corresponding magnetically permeable structures, according to some embodiments. Outer rotor assembly 3850 includes magnetically permeable material, such as magnetically permeable structures 3884, and magnetic material, such as magnets 3882a and 3882b. Further, outer rotor assembly 3850 includes boost magnets, which can include one or more of outer radial boost magnets 3674, one or more inner boost magnets 3874, and/or one or more axial boost magnets, as represented by axial boost magnet structure 3876a. In the example shown, magnetically permeable structure 3884 includes a non-confronting surface 3862 shaped to coincide with a surface of breadloaf magnet 3674. For example, non-confronting surface 3862 is a radial non-confronting surface that is flat (or relatively flat) and can be oriented orthogonal to a ray (not shown) extending from centerline 3875.

Figure 38C:
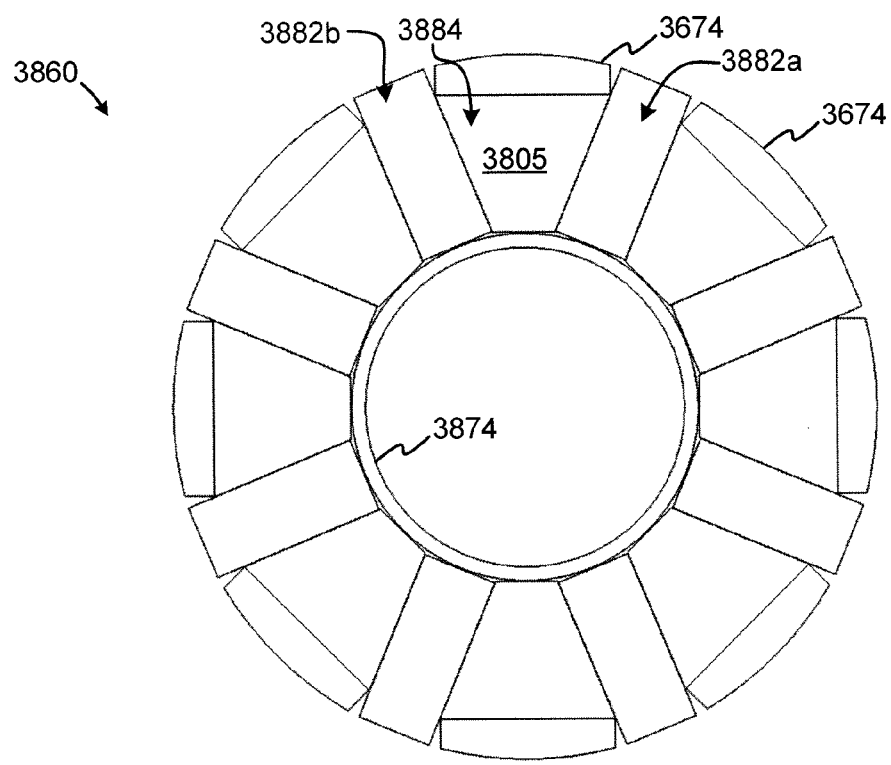

FIG. 38C is a rear view of an outer rotor assembly of FIG. 38B, according to some embodiments. In this figure, axial boost magnet structure 3876a is absent and outer rotor assembly 3860 includes boost magnets 3674 and an example of suitable magnetically permeable structures 884. Magnetically permeable structures 3884 each include an axial non-confronting surface 3805.

Figure 38D:
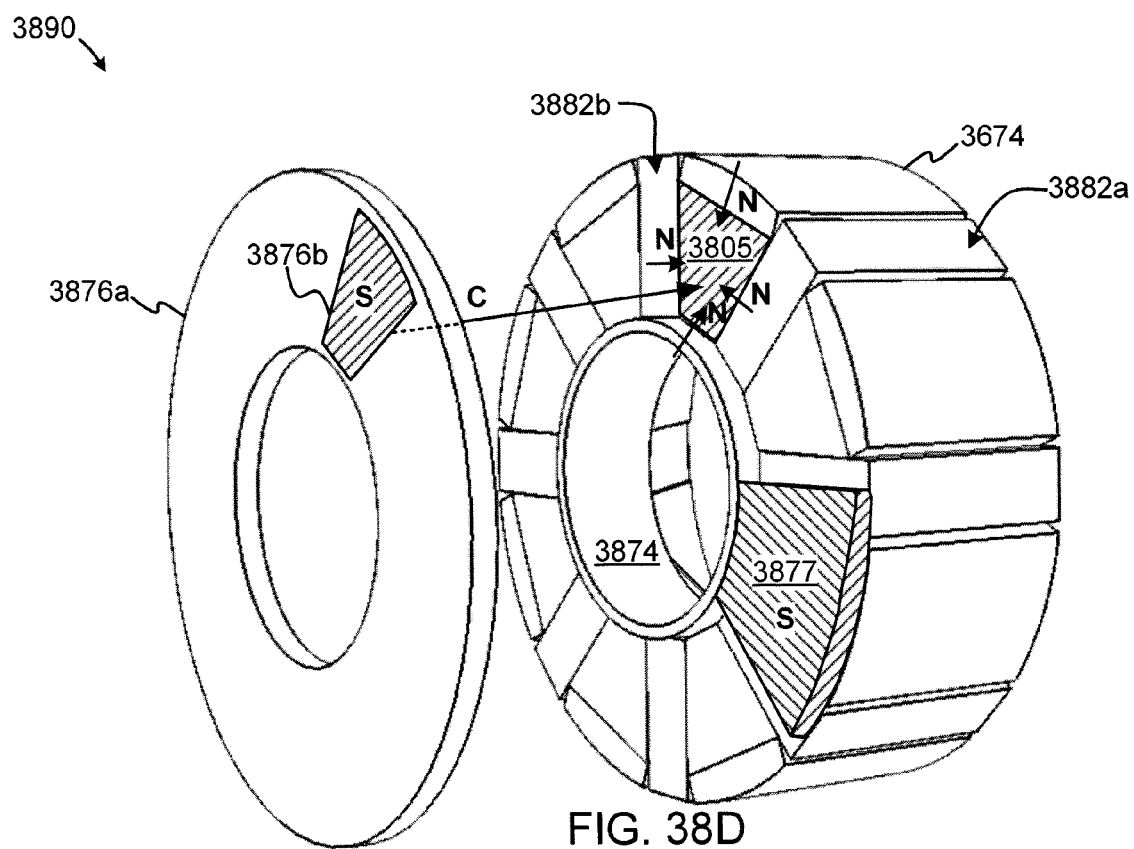

FIG. 38D is a perspective side view of an outer rotor assembly of FIG. 38C, according to some embodiments. In this figure, outer rotor assembly 3890 includes magnetically permeable material disposed between magnets 3882a and 3882b, which have directions of polarization arranged to configure the magnetically permeable material between magnets 3882a and 3882b as a north ("N") magnet pole. Note, too, that the magnetically permeable structures of FIG. 38D have axial non-confronting surfaces 3805. Further, outer boost magnets 3674 and inner boost magnets 3874 are included to boost flux in the magnetically permeable material. Axial boost magnet structure 3876a includes different regions of polarity, such as region 3876b, to provide flux in directions generally along the centerline. Region 3876b has a direction of polarization (e.g., a north pole) oriented to enter axial non-confronting surface 3805. Alternatively, axial boost magnet structure 3876a can be replaced with, or can include, discrete magnets, such as axial boost magnet 3877, that can be disposed adjacent axial non-confronting surfaces 3805. Axial boost magnet 3877 is representative of other axial boost magnets, too, but those other axial boost magnets not shown.

Figure 39A:
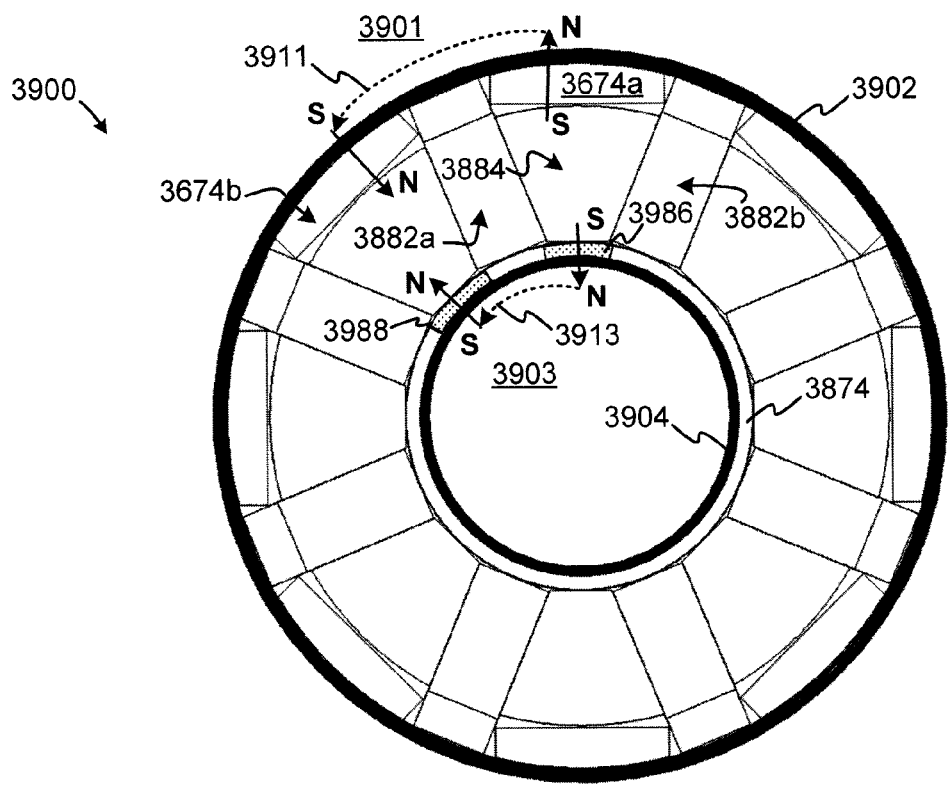
FIG. 39A is a front view of an outer rotor assembly including examples of flux conductor shields, according to some embodiments.

FIG. 39A is a front view of an outer rotor assembly 3900 including examples of flux conductor shields, according to some embodiments. Outer rotor assembly 3900 includes magnetic material 3882a and 3882b (or structures thereof, such as magnets) and magnetically permeable material 3884. Outer rotor assembly 3900 also can include outer radial boost magnets 3674a and 3674b, as well as an inner radial boost magnet structure 3874. Further, FIG. 39A depicts flux conductor shields configured to provide a return flux path (or a portion thereof) for one or more magnets, the return flux path portion residing in or traversing through a flux conductor shield. In some embodiments, a return flux path portion lies externally to a flux path or flux path portion that passes through magnetic material, such as magnetic material 3882a and 3882b, disposed between magnetically permeable material 3884. A flux conductor shield reduces or eliminates flux (e.g., stray flux) associated with magnets, such as boost magnets, that otherwise might extend externally from outer rotor assembly 3900 or its components. Therefore, the flux conductor shield can minimize or capture flux that otherwise might pass through external materials that might cause losses, such as eddy current losses or hysteresis losses. As such, a flux conductor shield can minimize or negate magnetic-related losses due to structures located external to outer rotor assembly 3900. In some examples, a flux conductor shield can operate to enhance flux by providing optimal magnetic return paths for boost magnets than otherwise might be the case. For example, a flux conductor shield can provide a magnetic return path that has a lower reluctance than otherwise might be the case (e.g., through air, a motor case, or any other external entity). A reduction in reluctance improves the amount of available flux (e.g., as generated by the boost magnets).

In the example shown, a flux conductor shield 3902 is configured to minimize or eliminate flux extending into an external region 3901 that might include magnetically permeable material, such as a motor housing. Thus, flux conductor shield 3902 includes a return flux path portion 3911 extending from outer radial boost magnet 3674*a* to outer radial boost magnet 3674*b*, both of which have directions of polarization as depicted in FIG. 39A. Another flux conductor shield 3904 is configured to minimize or negate flux that otherwise might extend into an external region 3903 (i.e., a space defined by an inner radial dimension), which might include magnetically permeable material (e.g., a shaft). Thus, flux conductor shield 3904 includes a return flux path portion 3913 extending from a portion 3986 of inner radial boost magnet structure 3874 to another portion 3988 of inner radial boost magnet structure 3874, with portions 3986 and 3988 having directions of polarization as depicted in FIG. 39A.

According to some embodiments, a flux conductor shield can be composed of one or more constituent structures, which can include one or more structures of magnetically permeable material or other materials. A flux conductor shield can be formed from a strip of magnetically permeable material that is wound about itself a number of times to form, for example, flux conductor shield 3902 or flux conductor shield 3904, according to some embodiments. For example, flux conductor shield 3902 and flux conductor shield 3904 can be formed from, for example, grain-oriented material (e.g., from a grain-oriented steel lamination), with the grain being oriented circumferentially or along a circumference. Thus, the grain can be oriented to facilitate flux passage (e.g., reduce losses) along the predominant parts of return flux path portions 3911 and 3913. In specific embodiments, a flux conductor shield can be composed with multiple structures, such as concentric circular structures of magnetically permeable material. But note that a flux conductor shield can include non-magnetically permeable material, such as plastic, to increase a distance between a boost magnet and magnetically permeable material in either region 3901 or 3903, according to some embodiments. Such a plastic structure is configured as a spacer to increase the distance, thereby decreasing the strength of the flux at magnetically permeable structures in either regions 3901 or 3903. Decreasing the strength of the flux can reduce magnetic losses.

Figure 39B:
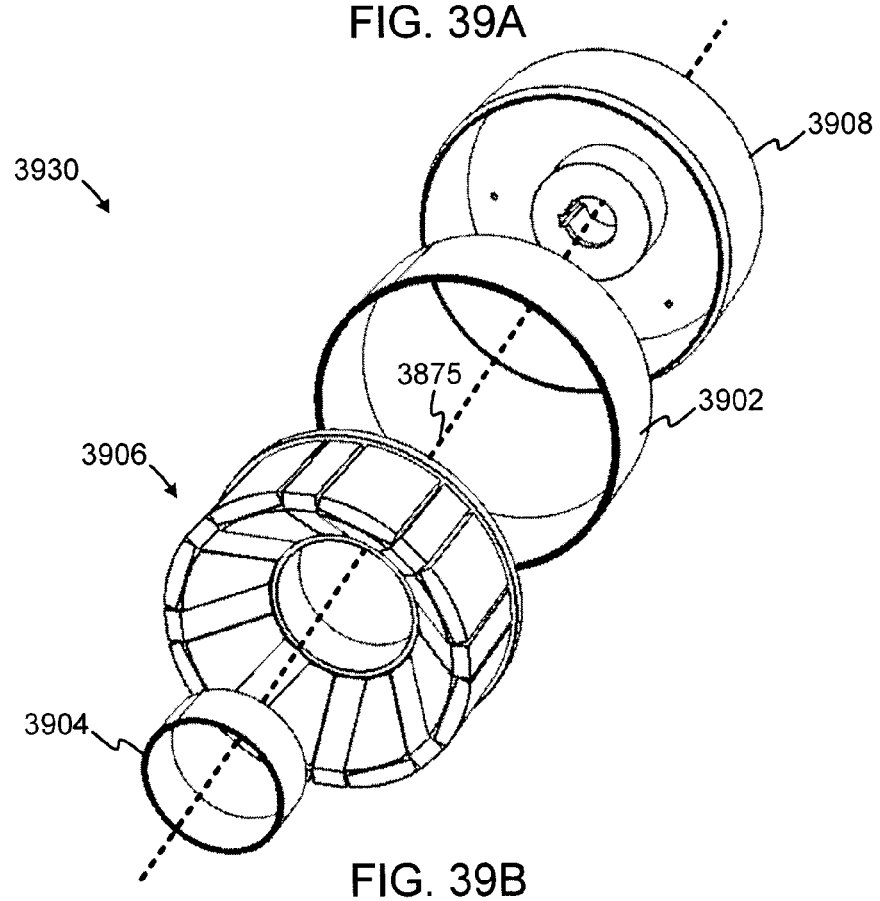
FIG. 39B is an exploded, front perspective view of an outer rotor assembly including examples of flux conductor shields, according to some embodiments.

FIG. 39B is an exploded, front perspective view of an outer rotor assembly including examples of flux conductor shields, according to some embodiments. In diagram 3900, an outer rotor assembly 3906 includes an inner radial flux conductor shield 3904 disposed within inner radial boost magnets that are positioned at an inner radial dimension from centerline 3875. The outer rotor assembly 3906 also includes an outer radial flux conductor shield 3902 disposed externally from the outer radial boost magnets. A motor housing portion 3908 is configured to house outer rotor assembly 3906, whereby outer radial flux conductor shield 3902 is configured to reduce flux from passing between outer rotor assembly 2306 and motor housing portion 3908.

Figure 39C:
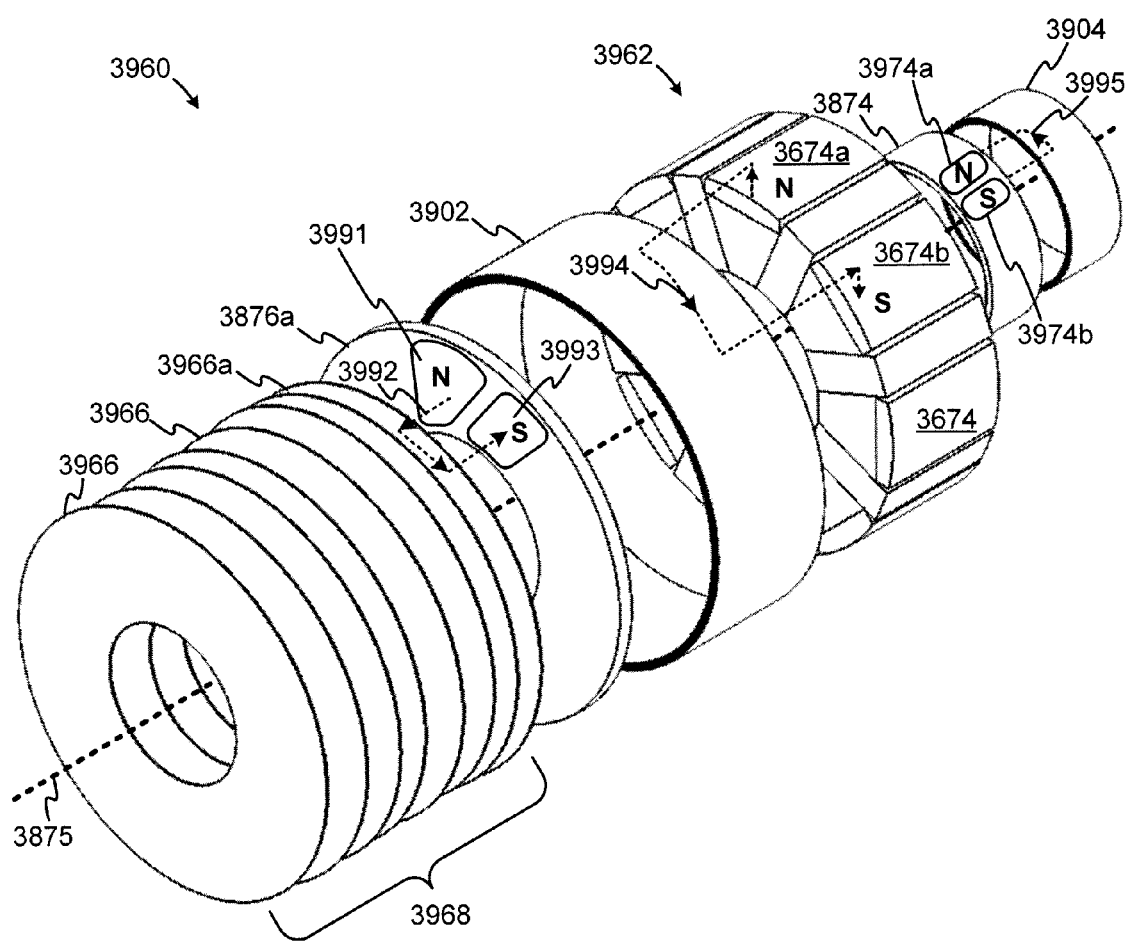
FIG. 39C is an exploded, rear perspective view of an outer rotor assembly including examples of flux conductor shields and return flux paths (and portions thereof), according to some embodiments.

FIG. 39C is an exploded, rear perspective view of an outer rotor assembly including examples of flux conductor shields and return flux path portions, according to some embodiments. Outer rotor assembly 3960 includes an inner radial flux conductor shield 3904 disposed within an inner radial boost magnet structure 3874 that includes regions 3974*a* and 3974*b* of magnetic material, whereby the directions of polarization of regions 3974*a* and 3974*b* of magnetic material establish a return flux path portion 3995 within inner radial flux conductor shield 3904. Outer rotor assembly 3960 also includes an outer radial flux conductor shield 3902 disposed externally to an arrangement 2362 of outer radial boost magnets 3674, including outer radial boost magnets 3674*a* and 3674*b*. The directions of polarization of outer radial boost magnets 3674*a* and 3674*b* establish a return flux path portion 3994 within outer radial flux conductor shield 3902. Further, outer rotor assembly 3960 also includes an axial flux conductor shield 3968 disposed adjacent to an axial boost magnet structure 3876*a* having different regions of polarity, such as regions 3991 and 3993. The directions of polarization of regions 3992 and 3993 establish a return flux path portion 3992 within one or more portions of axial flux conductor shield 3968, such as in axial shield 3966*a*. Note that while FIG. 39C depicts axial flux conductor shield 3968 as composed of a number of disc-like structures, axial flux conductor shield 3968 need not be so limited. In one example, axial flux conductor shield 3968 can be formed from a corkscrew-shaped piece of magnetically permeable material. In other examples, axial flux conductor shield 3968 can be composed of multiple pieces for each axial shield constitute component 3966. Therefore, for example, axial shield component 3966*a* can include multiple pieces, each being an arc-like shape (not shown) configured to provide a return flux path portion between regions 3991 and 3993. A piece can be implemented with grain-oriented material with the grain being oriented generally from one of regions 3991 and 3993 to the other. According to some embodiments, a return flux path can originate at a boost magnet of a first rotor assembly and traverse through magnetically permeable material into a field pole member. The return flux path then can exit the field pole member and pass through another magnetically permeable structure of a second rotor assembly. The return flux path then passes through another boost magnet, through a flux conductor shield, and into yet another boost magnet. Then the return flux path continues in a similar manner until reaching the point of origination at the boost magnet of the first rotor assembly. Consequently, the return flux path need not pass through magnetic material disposed between the magnetically permeable structures of a rotor assembly. In some embodiments, return flux path portions 3992, 3994 and 3995 lie off the principal flux paths, such as those flux paths passing circumferentially from one structure of magnetically permeable material through magnetic material and into another structure of magnetically permeable material.

Figure 40A:
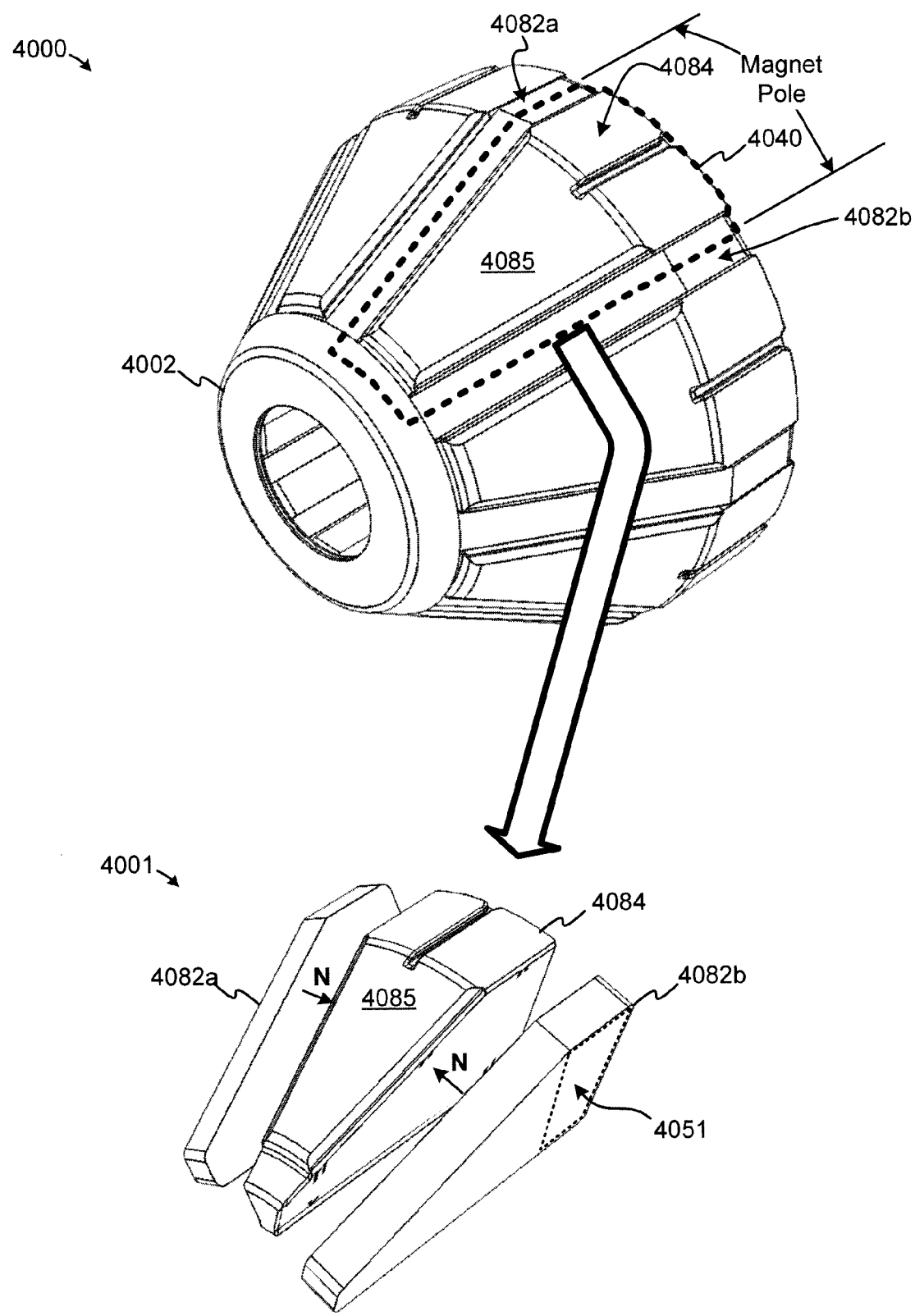
FIGS. 40A to 40C depict various views of an example of an inner rotor assembly, according to some embodiments.
Figure 40B:
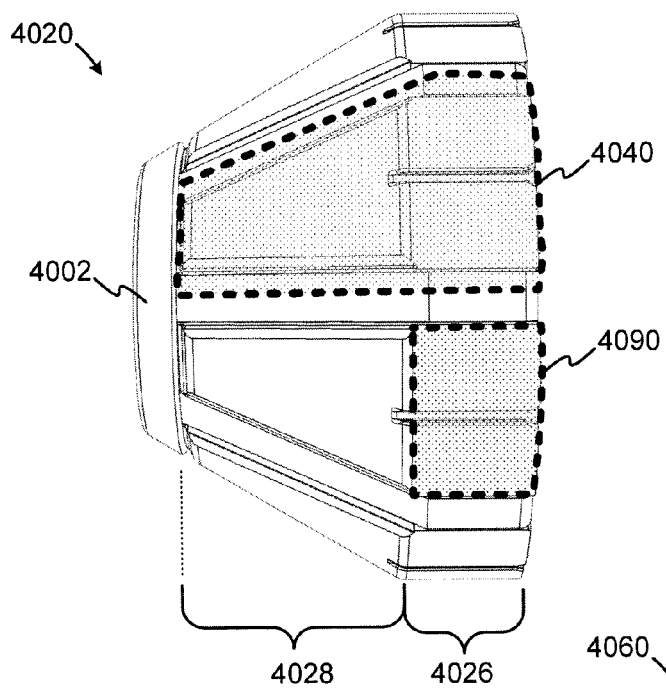
Figure 40C:
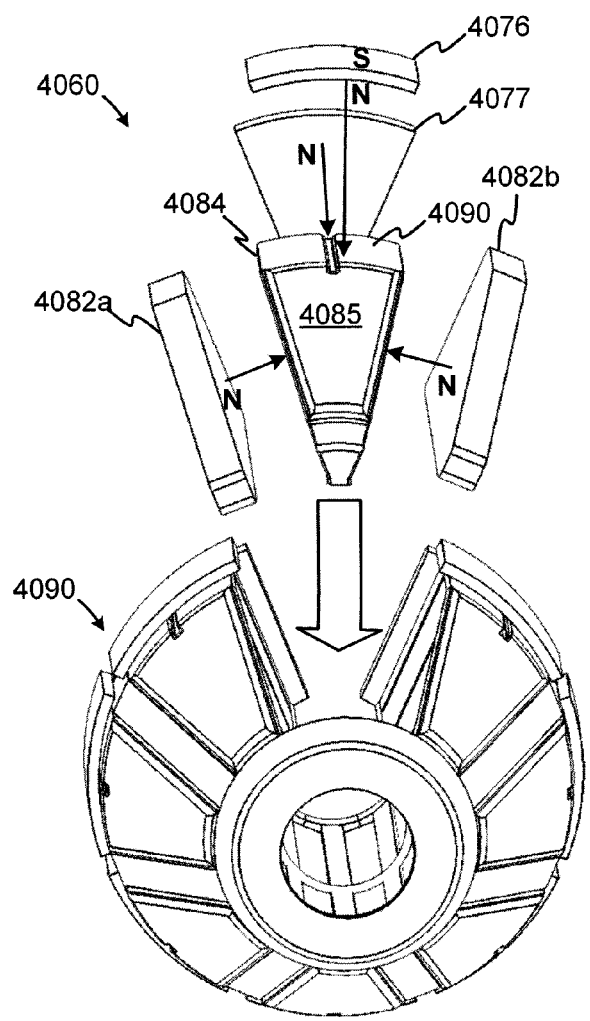

FIGS. 40A to 40C depict various views of an example of an inner rotor assembly, according to some embodiments. FIG. 40A is a front perspective view of an inner rotor assembly 4000 in accordance with a specific embodiment. Inner rotor assembly 4000 includes magnetic material 4082*a* and 4082*b* (or structures thereof, such as magnets) and magnetically permeable material 4084 arranged about a centerline, all of which form magnetic regions, such as magnetic region 4040. Further, magnetically permeable material 4084 includes a confronting surface 4085 configured to confront a pole face of a field pole member (not shown), confronting surface 4085 being oriented at an angle to a centerline or axis of rotation. An arrangement 4001 of magnet 4082*a*, magnetically permeable material 4084, and magnet 4082*b* is shown in an exploded view, with magnets 4082*a* and 4082*b* being oriented so that the north ("N") directions of polarization are directed into magnetically permeable material 4084. Note that magnets 4082*a* and 4082*b* can include an axial extension area 4051, which can provide, among other things, an enhanced surface area through which a greater amount of flux can pass. Inner rotor assembly 4000 optionally can include an end cap 4002 that can, among other things, provide support (e.g., compressive support) to immobilize magnetic material 4082*a* and 4082*b*, and magnetically permeable material 4084 against rotational forces as inner rotor assembly 4000 rotates at relatively high revolutions per unit time about an axis of rotation. End cap 4002, therefore, can be implemented to maintain air gap dimensions during various rotational speeds.

FIG. 40B is a side view of an inner rotor assembly 4020 in accordance with a specific embodiment. An outer radius dimension can vary in an angled surface portion (e.g., in an angled surface portion 4028) along the axis of rotation, and the outer radius dimension can be relatively constant in an extension portion (e.g., in an extension region 4026). Also shown is a radial non-confronting surface 4090 of magnetically permeable material 2484, adjacent which an outer radial boost magnet can be disposed. FIG. 40C is an exploded front view of structures of a magnetic region in an inner rotor assembly in accordance with a specific embodiment. A portion 4060 of an inner rotor assembly 4090 is shown to include magnet 4082a, magnetically permeable material 4084, and magnet 4082b, as well as an outer radial boost magnet 4076 and an axial boost magnet 4077. Outer radial boost magnet 4076 is disposed adjacent radial non-confronting surface 4090, and axial boost magnet 4077 is disposed adjacent an axial on-confronting surface (not shown). As shown, surfaces of magnet 4082a, magnet 4082b, outer radial boost magnet 4076, and axial boost magnet 4077 having a north ("N") direction of polarization are oriented toward non-confronting surfaces of magnetically permeable material 4084. Therefore, confronting surface 4085 is configured as a magnet pole polarized as a "north" pole.

Figure 41A:
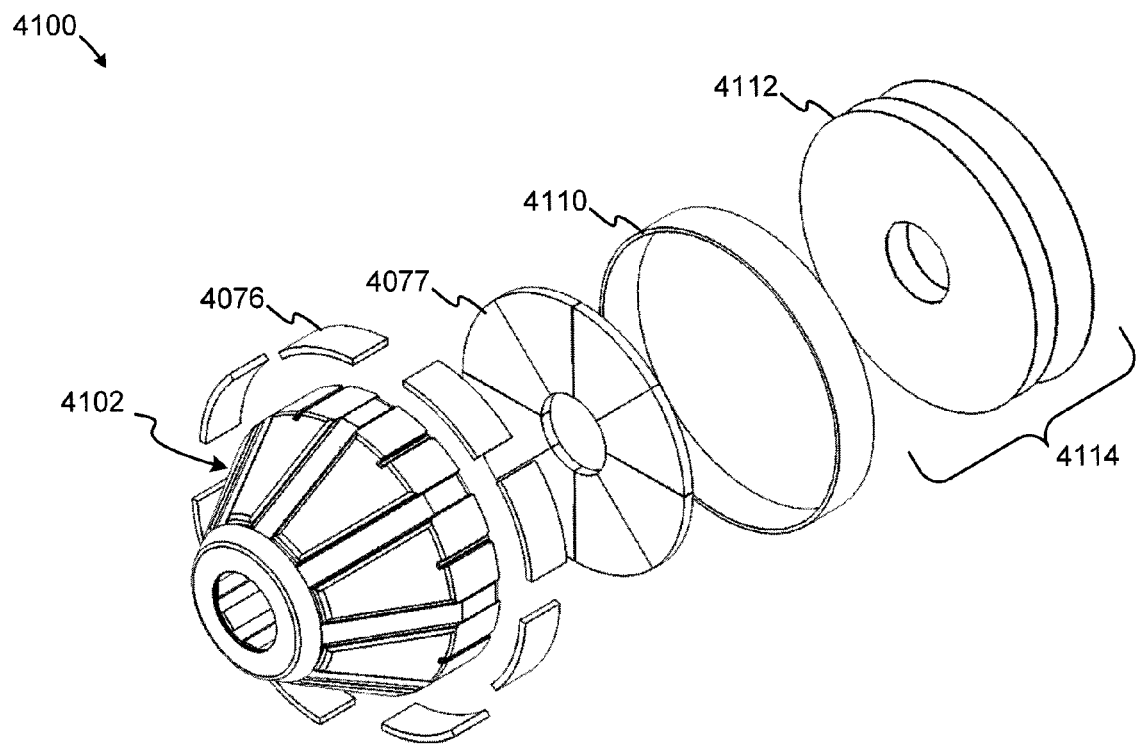
FIGS. 41A to 41B depict exploded views of an example of an inner rotor assembly, according to some embodiments.
Figure 41B:
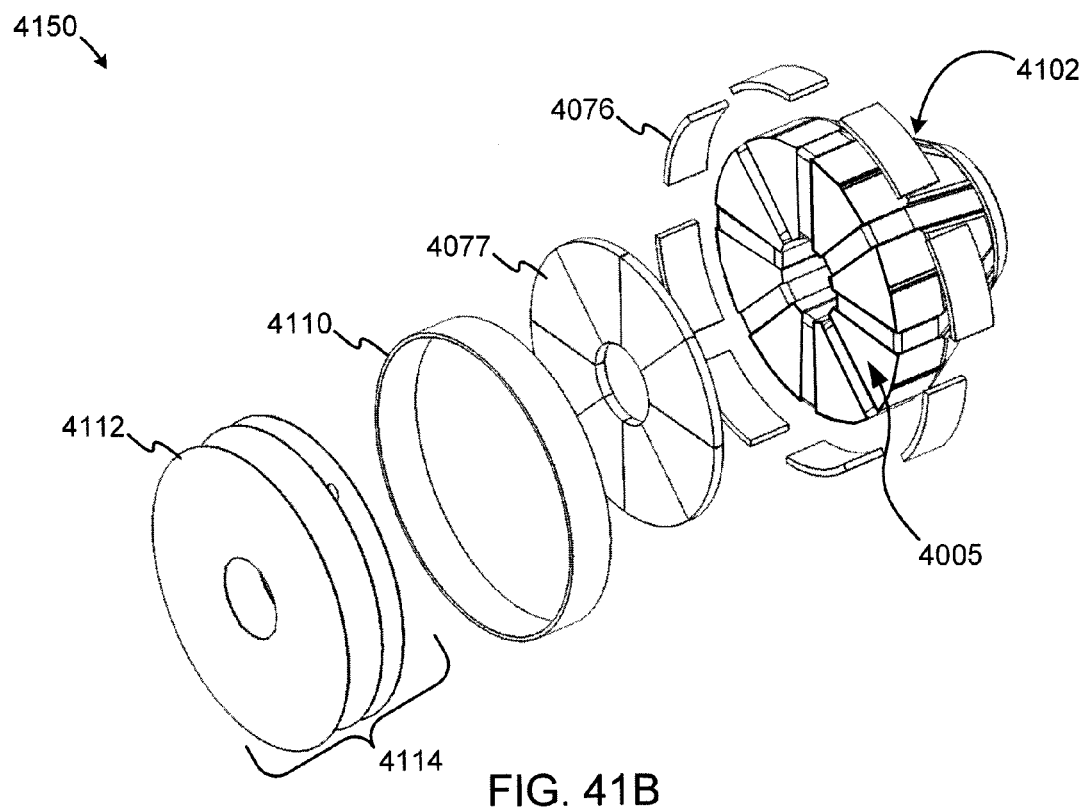

FIGS. 41A to 41B depict exploded views of an example of an inner rotor assembly, according to some embodiments. FIG. 41A is a front perspective view of an inner rotor assembly 4100 in accordance with a specific embodiment. Inner rotor assembly 4100 includes an inner rotor assembly as an arrangement 4102 of magnetic material (or structures thereof, such as magnets) and magnetically permeable material. Also shown are outer radial boost magnets 4076 disposed on and/or adjacent radial non-confronting surfaces (e.g., in the extension portion) of the magnetically permeable material. Axial boost magnets 4077 can include magnetic material having surfaces oriented toward the rear (or axial) non-confronting surfaces of the magnetically permeable material with alternating directions of polarization. An outer radial flux conductor shield 4110 is disposed over outer radial boost magnets 4076, and an axial flux conductor shield 4114 including one or more axial shield structures 4112 are disposed on and/or adjacent the axial boost magnets 4077. FIG. 41B is a rear perspective view of inner rotor assembly 4100 of FIG. 41A. As shown, axial boost magnets 4077 are disposed adjacent rear (or axial) non-confronting surfaces 4005 of the magnetically permeable material of inner rotor assembly 4150.

Figure 42:
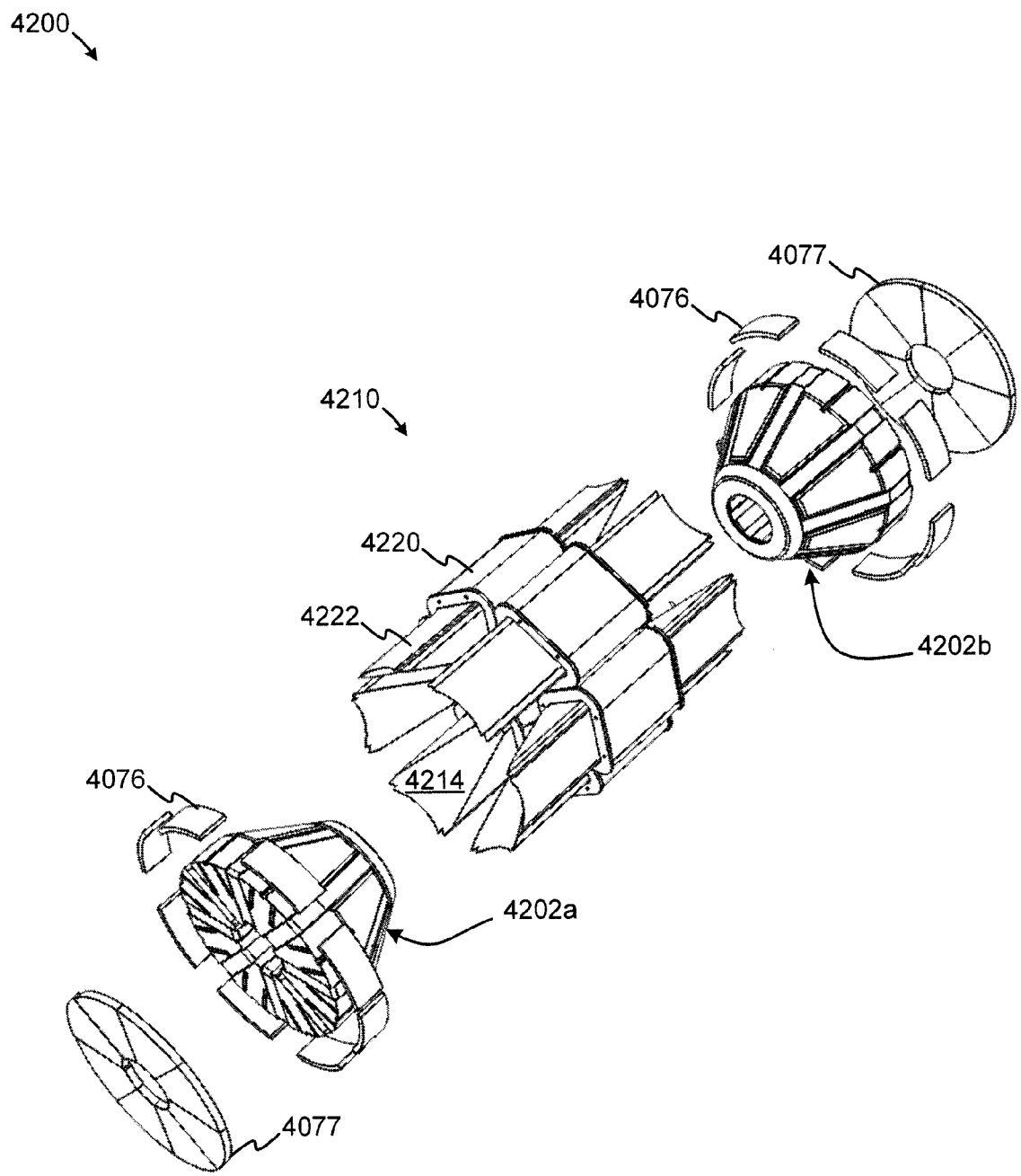
FIG. 42 is an exploded view of a rotor-stator structure including inner rotor assemblies in accordance with some embodiments.

FIG. 42 is an exploded view of a rotor-stator structure including inner rotor assemblies in accordance with some embodiments. Rotor-stator structure 4200 includes a stator assembly 4210 and inner rotor assemblies 4202a and 4202b. Stator assembly 4210 can include a number of field pole members 4222 having coils 4220 formed thereon, and a number of pole faces 4214 configured to confront the surfaces of inner rotor assemblies 4202a and 4202b. Inner rotor assemblies 4202a and 4202b can also include one or more of outer radial boost magnets 4076 and axial boost magnets 4077. In some examples, inner rotor assemblies 4202a and 4202b can include inner radial boost magnets (not shown). In other embodiments, inner rotor assemblies 4202a and 4202b can be replaced by rotor assemblies having cylindrical confronting surfaces, as well as outer radial boost magnets and axial boost magnets configured to enhance flux in flux paths formed through cylindrically-shaped rotor assemblies. Note that pole faces 4214 can include concave pole faces that are configured to confront convex-shaped portions of magnetic regions of inner rotor assemblies 4202a and 4202b. An example of a convex-shaped portion of a magnetic region if magnetic region 4040 of FIGS. 40A and 40B.

Various embodiments or examples of the invention may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples has been provided above along with accompanying figures. The detailed description is provided in connection with such examples, but is not limited to any particular example. The scope is limited only by the claims, and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

The description, for purposes of explanation, uses specific nomenclature to provide a thorough understanding of the various embodiments. However, it will be apparent that specific details are not required in order to practice the various embodiments. In fact, this description should not be read to limit any feature or aspect of to any embodiment; rather features and aspects of one example can readily be interchanged with other examples. Notably, not every benefit described herein need be realized by each example of the various embodiments; rather any specific example may provide one or more of the advantages discussed above. In the claims, elements and/or operations do not imply any particular order of operation, unless explicitly stated in the claims. It is intended that the following claims and their equivalents define the scope of the various embodiments. Embodiments of the invention can be implemented in numerous ways, including as a system, a process, an apparatus, or a series of program instructions on a computer readable medium such as a computer readable storage medium or a computer network where the program instructions are sent over optical or electronic communication links. In general, the steps of disclosed processes may be performed in an arbitrary order, unless otherwise provided in the claims.

The foregoing description, for purposes of explanation, used specific nomenclature to provide a thorough understanding of the various embodiments of the invention. However, it will be apparent to one skilled in the art that specific details are not required in order to practice embodiments of the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims.

Further, the embodiments were chosen and described in order to best explain the principles of the invention and its practical applications; they thereby enable others skilled in the art to best utilize the various embodiments with various modifications as are suited to the particular use contemplated. Notably, not every benefit described herein need be realized by each embodiment of the present invention; rather any specific embodiment can provide one or more of the advantages related to the various embodiments of the invention. In the claims, elements and/or operations do not imply any particular order of operation, unless explicitly stated in the claims. It is intended that the following claims and their equivalents define the scope of the invention.

The invention claimed is:

1. A field pole member for electrodynamic machines, the field pole member comprising:
   a plurality of magnetic flux conductors forming at least a field pole core, the plurality of magnetic flux conductors including laminations affixed to each other;
   a first sculpted pole face at a first end of said field pole member having an elongated shape, said field pole member including the field pole core; and
   a second sculpted pole face at a second end of said field pole member having said elongated shape, said first sculpted pole face and said second sculpted pole face being disposed at opposite ends of said field pole member in an axial direction extending lengthwise along said elongated shape, wherein the laminations extend from the first sculpted pole face to the second sculpted pole face and wherein said elongated shape has an axial length and a radial length, wherein the axial length is larger than the radial length.

2. The field pole member of claim 1 wherein each of said first sculpted pole face and said second sculpted pole face comprises a portion of a pole face that is substantially coextensive with an angle between 0° and 90° relative to a line parallel with an axis of rotation.

3. The field pole member of claim 1 wherein each of said first sculpted pole face and said second sculpted pole face are configured to confront either an inner rotor or an outer rotor.

4. The field pole member of claim 1 wherein said first sculpted pole face and said second sculpted pole face are coextensive with a first curved surface portion of a first cone and a second curved surface portion of a second cone, said first curved surface portion and said second surface curved portion are positioned radially from said axis of rotation such that a straight line passes through said first curved surface portion and said curved second surface portion, said straight line being parallel to said axis of rotation.

5. The field pole member of claim 1 wherein each of said first curved surface portion and said second curved surface portion is uniform.

6. The field pole member of claim 1 wherein said first and said second curved surface portions are configured to establish a first uniform distance between said first curved surface portion and a first curved rotor surface and a second uniform distance between said second curved surface portion and a second curved rotor surface.

* * * * *